(12) United States Patent
Naithani et al.

(10) Patent No.: US 11,767,016 B2
(45) Date of Patent: Sep. 26, 2023

(54) OPTICAL ROUTE EXAMINATION SYSTEM AND METHOD

(71) Applicant: Transportation IP Holdings, LLC, Norwalk, CT (US)

(72) Inventors: Nidhi Naithani, Dublin (IE); Dattaraj Jagdish Rao, Bangalore (IN); Anju Bind, Bangalore (IN); Sreyashi Dey Chaki, Bangalore (IN); James D. Brooks, Grove City, PA (US); Jeffrey Armstrong, Haslet, TX (US); Michael Scott Miner, Titusville, FL (US); Shannon Joseph Clouse, Erie, PA (US); Harry Kirk Mathews, Jr., Clifton Park, NY (US)

(73) Assignee: Transportation IP Holdings, LLC, Norwalk, CT (US)

(*) Notice: Subject to any disclaimer, the term of this patent is extended or adjusted under 35 U.S.C. 154(b) by 141 days.

(21) Appl. No.: 17/242,082

(22) Filed: Apr. 27, 2021

(65) Prior Publication Data
US 2021/0245747 A1    Aug. 12, 2021

Related U.S. Application Data

(60) Continuation-in-part of application No. 16/244,286, filed on Jan. 10, 2019, now Pat. No. 11,022,982,
(Continued)

(51) Int. Cl.
*B60W 30/16* (2020.01)
*B61C 17/12* (2006.01)
*B61L 3/12* (2006.01)

(52) U.S. Cl.
CPC ............ *B60W 30/16* (2013.01); *B61C 17/12* (2013.01); *B61L 3/127* (2013.01)

(58) Field of Classification Search
CPC .. B60W 2420/42; B60W 30/12; B60W 30/16; B61C 17/12; B61L 23/041;
(Continued)

(56) References Cited

U.S. PATENT DOCUMENTS

| | | | |
|---|---|---|---|
| 7,772,539 B2 * | 8/2010 | Kumar | G07C 5/0866 250/221 |
| 9,981,675 B2 * | 5/2018 | Cooper | G01S 19/13 |

(Continued)

*Primary Examiner* — Mohammad J Rahman
(74) *Attorney, Agent, or Firm* — THE SMALL PATENT LAW GROUP LLC; Mary D. Lawlor

(57) ABSTRACT

A method includes obtaining one or more images of a segment of a route from a camera while a vehicle is moving along the route. The segment of the route includes one or more guide lanes. The method also includes comparing, with one or more computer processors, the one or more images of the segment of the route with a benchmark visual profile of the route based at least in part on an overlay of the one or more images onto the benchmark visual profile or an overlay of the benchmark visual profile onto the one or more images. The one or more processors identify a misaligned segment of the route based on one or more differences between the one or more images and the benchmark visual profile and respond to the identification of the misaligned segment of the route by modifying an operating parameter of the vehicle.

18 Claims, 23 Drawing Sheets

Related U.S. Application Data which is a continuation-in-part of application No. 14/217,672, filed on Mar. 18, 2014, now Pat. No. 11,124,207, application No. 17/242,082 is a continuation-in-part of application No. 16/577,819, filed on Sep. 20, 2019, which is a continuation of application No. 15/412,692, filed on Jan. 23, 2017, now Pat. No. 10,457,281, application No. 17/242,082 is a continuation-in-part of application No. 16/450,024, filed on Jun. 24, 2019, now Pat. No. 11,203,365, which is a continuation of application No. 15/482,240, filed on Apr. 7, 2017, now Pat. No. 10,370,012, application No. 17/242,082 is a continuation-in-part of application No. 16/136,423, filed on Sep. 20, 2018, now Pat. No. 11,039,055, which is a division of application No. 14/541,370, filed on Nov. 14, 2014, now Pat. No. 10,110,795, which is a continuation-in-part of application No. 14/217,672, filed on Mar. 18, 2014, now Pat. No. 11,124,207, and a continuation-in-part of application No. 14/253,294, filed on Apr. 15, 2014, now Pat. No. 9,875,414, and a continuation-in-part of application No. 14/457,353, filed on Aug. 12, 2014, now abandoned, and a continuation-in-part of application No. 14/479,847, filed on Sep. 8, 2014, now abandoned, and a continuation-in-part of application No. 14/485,398, filed on Sep. 12, 2014, now Pat. No. 10,049,298, and a continuation-in-part of application No. 13/109,209, filed on May 17, 2011, now Pat. No. 8,913,131, which is a division of application No. 11/146,831, filed on Jun. 6, 2005, now Pat. No. 7,965,312, which is a continuation-in-part of application No. 10/361,968, filed on Feb. 10, 2003, now abandoned, said application No. 14/479,847 is a continuation-in-part of application No. 14/217,672, filed on Mar. 18, 2014, now Pat. No. 11,124,207.

(60) Provisional application No. 62/469,142, filed on Mar. 9, 2017, provisional application No. 61/940,813, filed on Feb. 17, 2014, provisional application No. 61/940,696, filed on Feb. 17, 2014, provisional application No. 61/940,610, filed on Feb. 17, 2014, provisional application No. 61/940,660, filed on Feb. 17, 2014, provisional application No. 60/626,573, filed on Nov. 10, 2004, provisional application No. 60/385,645, filed on Jun. 4, 2002.

(58) Field of Classification Search
CPC .... B61L 23/042; B61L 23/047; B61L 25/025; B61L 3/127; G06V 20/588
See application file for complete search history.

(56) References Cited

U.S. PATENT DOCUMENTS

| | | | | |
|---|---|---|---|---|
| 2007/0233343 | A1* | 10/2007 | Saito | B62D 15/025 701/41 |
| 2007/0273554 | A1* | 11/2007 | Sakakibara | B62D 15/028 348/148 |
| 2011/0064273 | A1* | 3/2011 | Zarembski | B61L 23/045 382/104 |
| 2012/0274772 | A1* | 11/2012 | Fosburgh | G01C 11/04 348/149 |
| 2015/0217807 | A1* | 8/2015 | Schumacher | B62D 15/025 701/41 |
| 2015/0235094 | A1* | 8/2015 | Kraeling | G06V 20/56 348/148 |
| 2015/0363934 | A1* | 12/2015 | Ko | G06T 7/73 701/431 |
| 2018/0218225 | A1* | 8/2018 | Thakkar | G06V 20/588 |
| 2019/0146520 | A1* | 5/2019 | Naithani | B60Q 9/00 701/28 |
| 2019/0176862 | A1* | 6/2019 | Kumar | B64D 47/08 |
| 2019/0180118 | A1* | 6/2019 | Kraeling | G06V 10/443 |
| 2019/0227543 | A1* | 7/2019 | Choe | G06T 11/206 |
| 2020/0041304 | A1* | 2/2020 | Arreaza | B60W 40/105 |
| 2021/0245747 | A1* | 8/2021 | Naithani | B60W 30/12 |

* cited by examiner

OPTICAL ROUTE EXAMINATION SYSTEM AND METHOD

CROSS-REFERENCE TO RELATED APPLICATIONS

This application is a continuation-in-part of U.S. patent application Ser. No. 16/244,286, filed Jan. 10, 2019, which is a continuation-in-part of U.S. patent application Ser. No. 14/217,672, filed Mar. 18, 2014. The entire disclosures of both applications are incorporated herein by reference.

This application is also a continuation-in-part of Ser. No. 16/577,819, filed Sep. 20, 2019, which is a continuation of U.S. patent application Ser. No. 15/412,692, filed Jan. 23, 2017 and issued as U.S. Pat. No. 10,457,281 on Oct. 29, 2019. The entire disclosures are incorporated herein by reference.

This application is also a continuation-in-part of Ser. No. 16/450,024, filed Jun. 24, 2019, which is a continuation of U.S. patent application Ser. No. 15/482,240, filed Apr. 7, 2017 and issued as U.S. Pat. No. 10,370,012 on Aug. 6, 2019, which claims priority to U.S. Provisional Application No. 62/469,142, filed Mar. 9, 2017. The entire disclosures are incorporated herein by reference.

This application is also a continuation-in-part of Ser. No. 16/136,423, filed Sep. 20, 2018, which is a divisional of U.S. patent application Ser. No. 14/541,370, filed Nov. 14, 2014 and issued as U.S. Pat. No. 10,110,795 on Oct. 23, 2018, which claims priority to U.S. Provisional Application Nos. 61/940,813; 61/940,660; 61/940,610; and 61/940,696, all of which were filed Feb. 17, 2014, and the entire disclosures of which are incorporated herein by reference.

The '370 application also is a continuation-in-part of U.S. patent application Ser. No. 14/217,672, which was filed Mar. 18, 2014 (the "'672 application"); U.S. patent application Ser. No. 14/253,294, filed Apr. 15, 2014 (the "'294 application") and issued as U.S. Pat. No. 9,875,414 on Jan. 23, 2018; U.S. patent application Ser. No. 14/457,353, filed Aug. 12, 2014 (the "'353 application") and is now abandoned; U.S. patent application Ser. No. 14/479,847, filed Sep. 8, 2014 (the "'847 application") and is now abandoned; U.S. patent application Ser. No. 14/485,398 (the "'398 application"), filed Sep. 12, 2014 and issued as U.S. Pat. No. 10,049,298 on Aug. 14, 2018; and U.S. patent application Ser. No. 13/109,209, filed May 17, 2011 (the "'209 application") and issued as U.S. Pat. No. 8,913,131 on Dec. 16, 2014. The entire disclosures of which are incorporated herein by reference.

The '209 application is a divisional application of U.S. patent application Ser. No. 11/146,831, filed Jun. 6, 2005 and is now U.S. Pat. No. 7,965,312 (the "'831 Application"), which claims priority to U.S. Provisional Application No. 60/626,573, filed Nov. 10, 2004 (the "'573 application"). The entire disclosures of which are incorporated herein by reference.

The '831 application also is a continuation-in-part of U.S. patent application Ser. No. 10/361,968, filed Feb. 10, 2003 (the "'968 application") and is now abandoned, and which claims priority to U.S. Provisional Application No. 60/385,645, filed Jun. 4, 2002 (the "'645 application"). The entire disclosures of which are incorporated herein by reference.

The '847 application is a continuation-in-part of the '672 application. The entire disclosures of these applications (e.g., the '672 application, the '294 application, the '353 Application, the '847 application, the '398 application, the '209 application, the '831 Application, the '573 application, the '968 application, and the '645 application) are incorporated herein by reference.

The '353 application and the '398 application each claim priority to U.S. Provisional Application Nos. 61/940,813; 61/940,660; 61/940,610; and 61/940,696.

BACKGROUND

Field

Embodiments of the subject matter disclosed herein relate to examining routes traveled by vehicles for damage to the routes.

Discussion of Art

Routes that are traveled by vehicles may become damaged or worn over time and with extended use. For example, roads on which cars travel may have shoulders that shift or wear. Tracks on which rail vehicles travel may become misaligned due to shifting of underlying ballast material, side-to-side rocking of the rail vehicles, and the like. The tracks may slightly bend or otherwise move out of the original alignment of the tracks. While the distance between the rails of the track (i.e., the gauge) may remain the same, the bending of the tracks from the original locations of the tracks can cause the tracks to shift out of alignment with the original locations. This shifting can pose threats to the safety of the rail vehicles, the passengers located thereon, and nearby persons and property. For example, the risks of derailment of the rail vehicles can increase when the tracks become misaligned. In another example, guide lanes of a route on which non-rail vehicles travel may be positioned incorrectly, may have reduced visibility, or the like. The distance between the guide lanes may change causing one lane of the route to be too large or too small relative to the other lane of the route. Decreased visibility of the guide lanes may also cause the non-rail vehicle to shift out of the respective lane threatening the safety of the vehicles, passengers located thereon, and nearby persons and property.

Some known systems and methods that inspect the route involve emitting visible markers on the tracks or guide lanes and optically monitoring these markers to determine if the route has become misaligned. These visible markers may be created using laser light, for example. But these systems and methods can require additional hardware in the form of a light emitting apparatus, such as a laser light source. This additional hardware increases the cost and complexity of the systems and can require specialized vehicles that are not used for the conveyance of passengers or cargo. Additionally, these systems and methods require the vehicle to slowly travel over the route so that the visible markers can be examined.

Some vehicles include collision avoidance systems that seek to warn operators of the vehicles of foreign objects on the route ahead of the vehicles. These systems, however, may only include a camera that provides a video feed to an onboard operator. This operator manually inspects the video for any foreign objects and responds accordingly when a foreign object is identified by the operator. These types of systems are prone to human error.

Some vehicles can operate according to automated safety systems that stop or slow down the vehicles in certain locations. These systems may rely on databases that associate different locations of routes being traveled upon by the vehicles with different speed limits. If the vehicles travel in excess of these limits, then the systems may communicate signals to the vehicles that slow or stop the vehicles. Some known systems rely on human operators to generate and/or update the databases, which can be prone to error. As a result, the systems may not have correct information, which can permit vehicles to travel in excess of the limits in some locations.

These systems may include crossing warnings that block concurrent crossings of vehicles through an intersection between routes. For example, rail vehicle can travel on tracks that cross routes being traveled by other vehicles, such as automobiles. The safety systems can include gates, signals, or the like, at intersections between the tracks and the routes being traveled by the automobiles. Some of these systems may be unable to determine when the gates, signals, or the like, are not performing properly to stop or warn the other vehicles of an approaching rail vehicle at a crossing in certain situation, such as during power outages. It may be desirable to have systems and methods that differ from those that are currently available.

BRIEF DESCRIPTION

In one or more embodiments, a method includes obtaining one or more images of a segment of a route from a camera while a vehicle is moving along the route. The segment of the route includes one or more guide lanes. The method also includes comparing, with one or more computer processors, the one or more images of the segment of the route with a benchmark visual profile of the route based at least in part on an overlay of the one or more images onto the benchmark visual profile or an overlay of the benchmark visual profile onto the one or more images. The one or more processors identify a misaligned segment of the route based on one or more differences between the one or more images and the benchmark visual profile and respond to the identification of the misaligned segment of the route by modifying an operating parameter of the vehicle.

In one or more embodiments, a system includes a camera configured to be mounted to a vehicle and to obtain one or more images of a segment of a route while the vehicle is moving along the route. The segment of the route includes one or more guide lanes. The system also includes one or more computer processors configured to compare the one or more images of the segment of the route with a benchmark visual profile of the route based at least in part on an overlay of the one or more images onto the benchmark visual profile or an overlay of the benchmark visual profile onto the one or more images of the segment of the route to identify a misaligned segment of the route based on one or more differences between the one or more images and the benchmark visual profile. The one or more computer processors respond to the identification of the misaligned segment of the route by modifying an operating parameter of the vehicle.

In one or more embodiments of the subject matter described herein, a method includes obtaining one or more route segment images of a route segment while a vehicle is moving along a route. The route segment includes one or more vehicle guides. The method also includes comparing, with one or more computer processors, the one or more route segment images with a benchmark visual route profile. The benchmark visual route profile includes a designated area of the route segment. The one or more computer processors compare the one or more route segment images with the benchmark visual profile by at least one of overlaying the one or more route segment images onto the designated area of the benchmark visual profile or by overlaying the designated area of the benchmark visual profile onto the one or more route segment images. The one or more computer processors identify a misalignment of the route segment based at least in part on one or more differences between the one or more route segment images and the benchmark visual profile. The method also includes responding to an identification of the misalignment of the route segment by controlling at least one operating parameter of the vehicle.

BRIEF DESCRIPTION OF THE DRAWINGS

Reference is made to the accompanying drawings in which embodiments of the invention are illustrated as described in more detail in the description below, in which.

DETAILED DESCRIPTION

Figure 1:
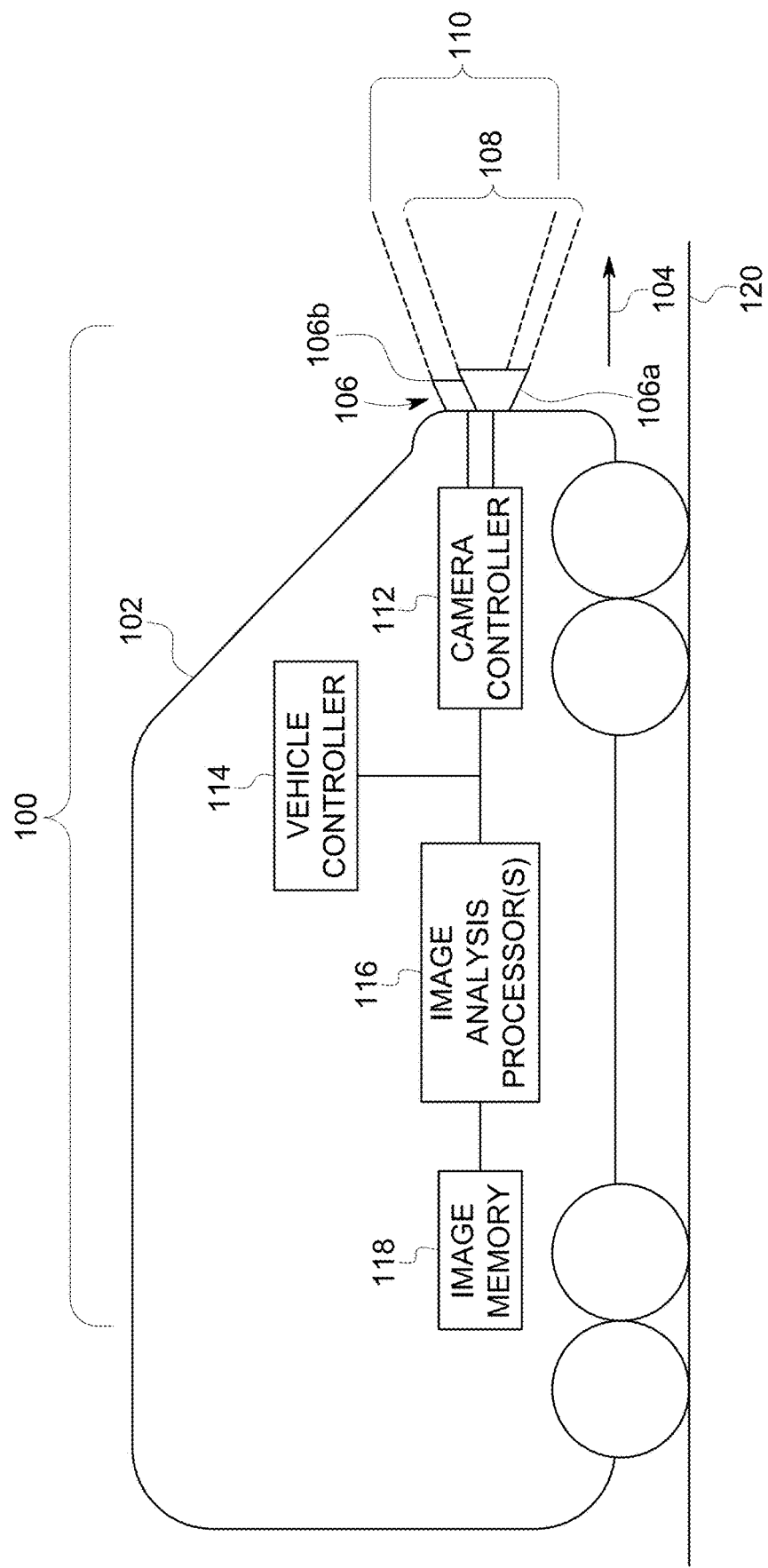
FIG. 1 is a schematic illustration of an optical route examination system in accordance with one example of the inventive subject matter described herein.

One or more examples of the inventive subject matter described herein include a system and method for detecting misalignment of guide lanes traveled by a vehicle. The systems and methods can analyze images of the route that are collected from a camera on the vehicle to detect this misalignment. Based on the detected misalignment, one or more operating parameters of the vehicle can be modified. For example, an operator of the vehicle can be alerted or the vehicle can be slowed down and/or stopped. The vehicle controller may notify proximate other vehicles that the misaligned segment was identified. Other information may be provided, such as the location, the type or degree of misalignment, the date, and the like.

In one embodiment, a method includes obtaining one or more images of a route while a vehicle is moving along the route. The route may include a first guide lane. A position of the vehicle relative to the first guide lane may be determined by measuring a first distance between the vehicle and the first guide lane. Next, it may be determined whether the position of the vehicle is to be changed based at least in part on the first distance. An operating parameter of the vehicle may be changed to affect a change in the position of the vehicle relative to the first guide lane responsive to determining that the position of the vehicle is desired to be changed.

Suitable guide lanes can be items that run along at least a portion of the route over which the vehicle travels. For example, a guide lane can be a rail of the track, a painted stripe on a road, a curb, a shoulder, a wall, a dock, or any item that can be expected to maintain a determined orientation and/or relationship with the vehicle while the vehicle travels along the route. In underground mining, the guide lane may be a cave wall face. For a marine vessel, it may be a shoreline or a dock's edge. For an aerial drone, it may be a stretch of track, a tree line or a ridge line.

The images of the route, including the guide lane, can be captured by at least one camera. The camera can be mounted on the vehicle. The camera can be oriented toward (e.g., pointing toward) the route in the direction of motion of the vehicle. The camera can periodically (or otherwise) capture images of the route that are analyzed for misalignment. In one embodiment, the camera can take still pictures and/or video of a route and compare these pictures and/or video to baseline image data. No laser light is used to mark or otherwise examine the route in at least one embodiment. Suitable cameras may include charge coupled devices (CCD) and complementary metal oxide semiconductor (CMOS) devices.

The guide lane may be misaligned when it is not in the same location as a determined and/or previous location due to shifting or movement of the route (or the guide lane). For example, instead of breaks, corrosion, or the like, in the track, misalignment of the track can result from lateral movement of the track and/or vertical movement of the track from a previous position, such as the positions of the track when the track was installed or previously examined. Misalignment may be caused by erosion of a road, flooding or other obstructions that obscure or damage the guide lanes. If the two rails of the track or the guide lanes of the route are misaligned, the track can derail the rail vehicle. Misalignment can cause non-rail vehicles to move or drift into undesirable locations or positions.

Some of the systems and methods described herein detect route misalignment in advance (e.g., before the vehicle reaches the misaligned route) and prevent derailment or a collision with another vehicle by warning the operator of the vehicle. Additionally or alternatively, when the misaligned section of the route is identified, one or more other responsive actions may be initiated. For example, a warning signal may be communicated (e.g., transmitted or broadcast) to one or more other vehicles to warn the other vehicles of the misalignment, a warning signal may be communicated to one or more wayside devices disposed at or near the route so that the wayside devices can communicate the warning signals to one or more other vehicles systems, a warning signal can be communicated to an off-board facility that can arrange for the repair and/or further examination of the misaligned segment of the route, or the like. In an unmanned vehicle (e.g., one that operates automatically), the systems and methods may automatically slow or stop movement of the vehicle in response to identifying misaligned tracks and/or guide lanes, or even from the obscuration of the guide lanes. Obscuration may be a result of the guide lane itself being damaged, material (dust, fog, e.g.) in the visual path, or from the sensor/camera being damaged or dirty.

FIG. 1 is a schematic illustration of an optical route examination system 100 in accordance with one example of the inventive subject matter described herein. The system is disposed onboard a vehicle 102. During operation, the vehicle may have a direction of travel or movement 104. Suitable vehicles may include a passenger vehicle, a rail vehicle, a mining vehicle, or even a marine vessel or aircraft. An aircraft may use beacons to define a flight corridor as the guide lane in one embodiment and may use roads (and road markings) as guide lanes in another embodiment. Suitable mining, agriculture and construction equipment may include an off-highway vehicle (e.g., a vehicle that is not designed or is not permitted to travel on public roadways). An agricultural vehicle may use field edges, fence lines, or furrows as a guide lane.

The system may include one or more cameras 106 (e.g., cameras 106a, 106b) mounted or otherwise connected with the vehicle so that the cameras move with the vehicle. The cameras may be forward facing cameras in that the cameras are oriented toward the direction of travel or movement of the vehicle. For example, fields of view 108, 110 of the cameras represent the space that is captured on images obtained by the cameras. In the illustrated example, the cameras are forward facing in that the fields of view capture images and/or video of the space in front of the moving vehicle. The cameras can obtain static (e.g., still) images and/or moving images (e.g., video). The images and/or video may be compressed in some embodiments.

The cameras operate based on signals received from a camera controller 112. The camera controller may include or represents one or more hardware circuits or circuitry that may include and/or is coupled with one or more computer processors (e.g., microprocessors) or other electronic logic-based devices. The camera controller activates the cameras to cause the cameras to obtain image data. This image data represents images of the fields of view of the cameras, such as images of one or more portions or segments of a route 120 in relation to the vehicle direction. The camera controller can change the frame rate of the cameras (e.g., the speed or frequency at which the cameras obtain images).

One or more image analysis processors 116 of the system examine the images obtained by one or more of the cameras. The processors can include or represent one or more hardware circuits or circuitry that may include and/or is coupled with one or more computer processors (e.g., microprocessors) or other electronic logic-based devices. In one aspect, the processor examines the images by identifying which portions of the images represent the route and comparing these portions to one or more benchmark images. Based on similarities or differences between one or more camera-obtained images and the benchmark image(s), the processor can determine if the segment of the route that is shown in the camera images is misaligned.

The cameras may obtain the images of the route while the vehicle is moving. The camera may capture images while the vehicle is not moving, naturally, but this is not as useful for vehicle navigation purposes. The movement may be at relatively fast speeds. For example, the images may be obtained while the vehicle is moving at or near an upper speed limit of the route. In one embodiment, the limit is such that it is the track speed of the route when maintenance is not being performed on the route or the upper speed limit of the route has not been reduced. In one embodiment, the camera is not vehicle mounted, but is mounted on another vehicle or alongside the route, possibly in a static location. The image from that camera can be transmitted to a controller (on or off-board the subject vehicle) to make the determination for changing an operating parameter of the vehicle. The change to the operating parameter, at least to instantiate, may be done by a vehicle controller in communication with any other controller or processor making the determination to change the operating parameter. For example, if a static wayside mounted camera observes a vehicle heading towards an object with which it will collide, the controller may make a determination to communicate to the vehicle to change its steering (to avoid the obstacle) or to stop propulsion and bring the vehicle to a halt (prior to collision with the obstacle). This may be done with plural obstacles within the camera's field of view, too.

The vehicle can be coupled with one or more other vehicles. The coupling may be mechanical in some embodiments and may be logical or communicative in other embodiments. Coupled vehicles are referred to as a consist. An example of mechanical coupling in the rail segment involves two rail vehicles that are physically secured to each other in order to share propulsion or motive force. Another example may include the on-road industry where a tractor rig pulls one or more trailers. An example of a logical or communicative coupling may include a lead vehicle that controls a trailing vehicle to speed up, slow down, and turn wirelessly as by remote piloting to allow the trailing vehicle to follow along the lead vehicle. Another example may include a plurality of drones that are not physically coupled but move as a group. The spacing and arrangement of the drones in the group may be static (relative to each other) or dynamic (as they change places relative to each other) as the group moves as a single block. Note that cameras mounted on or coupled to one vehicle in the group may be useful for making determinations for operating changes for another vehicle in the group.

Figure 2A:
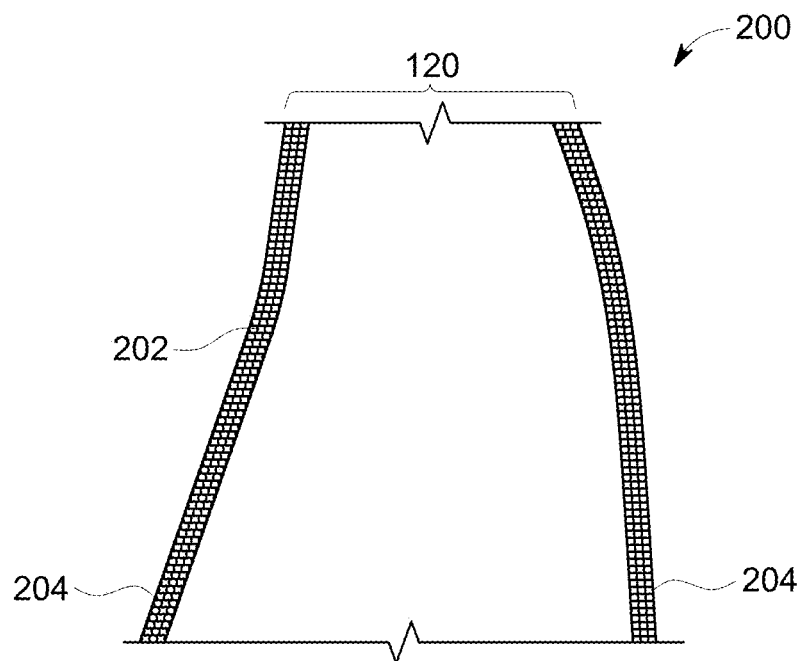
FIGS. 2A and 2B illustrate one example of a camera-obtained image of a segment of the route shown in FIG. 1.
Figure 2B:
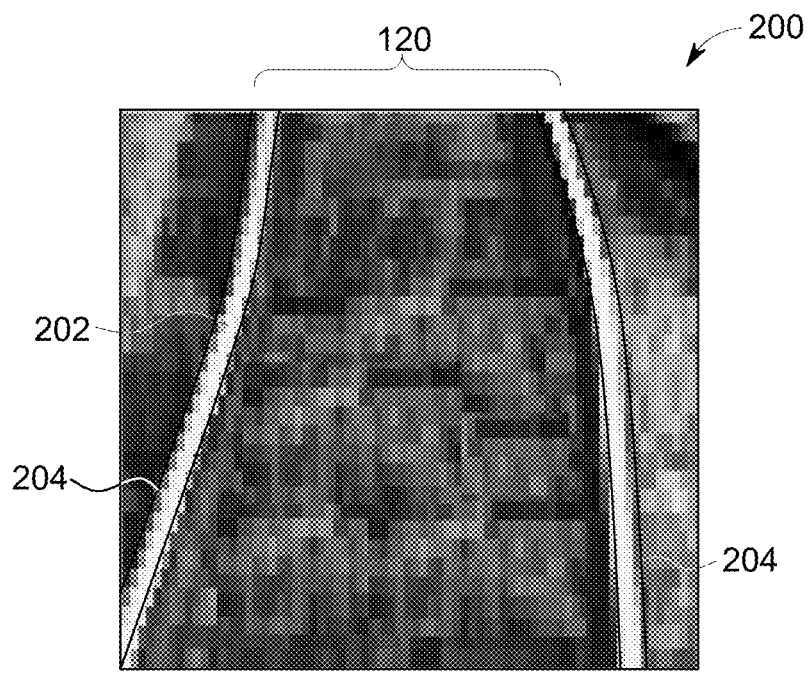

FIGS. 2A and 2B illustrate one example of a camera-obtained image 200 of a segment of the route. As shown in FIGS. 2A and 2B, the image may be a digital image formed from several pixels 202. The pixels may have differing levels of color, brightness and/or intensity. Pixels with greater intensities may be lighter in color (e.g., more white or whiter) while pixels with lesser intensities may be darker in color. In one aspect, the image analysis processor (shown in FIG. 1) examines the intensities of the pixels to determine which portions of the image represent the route (e.g., rails 204 of the track). For example, the processor may select those pixels having intensities that are greater than a designated threshold, the pixels having intensities that are greater than an average or median of several or all pixels in the image, or other pixels as representing locations of the route (e.g., the rails of a track). Alternatively, the processor may use another technique to identify the rails in the image.

Returning to the description of the system shown in FIG. 1, the image analysis processor can select one or more benchmark visual profiles from among several such profiles stored in a computer readable memory, such as an image memory 118. The memory may include or represents one or more memory devices, such as a computer hard drive, a CD-ROM, DVD ROM, a removable flash memory card, a magnetic tape, or the like. The memory can store the images (shown in FIGS. 2A and 2B) obtained by the cameras and the benchmark visual profiles associated with a trip of the vehicle.

The benchmark visual profiles represent designated layouts of the route that the route is to have at different locations. For example, the benchmark visual profiles can represent the positions, arrangements, relative locations, of rails of the route when the rails were installed, repaired, last passed an inspection, or otherwise. Other aspects in the visual profile may include curves, grades, and other features and aspects of the route.

In one aspect, a benchmark visual profile is a designated gauge (e.g., distance between rails of a track) of the route. Alternatively, a benchmark visual profile can be a previous image of the route at a selected location. In another example, a benchmark visual profile can define where the route (e.g., the rails of a track) are expected to be located in an image of the route. For example, different benchmark visual profiles can represent different shapes of the rails (shown in FIGS. 2A and 2B) of a track at different locations along a trip of the vehicle from one location to another. Where the route is a road, the benchmark visual profile can be selected from previous images of the same location, from a stock expected image representative of the location, and the like.

The processor can determine which benchmark visual profile to select in the memory based on a location of the vehicle when the image is obtained. A vehicle controller 114 is used to control movement of the vehicle. The controller may function manually and/or autonomously. The controller may determine where the vehicle is located when the images are obtained. For example, the vehicle controller can include and/or be connected with a positioning system, such as a global positioning system, cellular triangulation system, or the like, to determine where the vehicle is located. Optionally, there are other suitable methods by which vehicle controller can determine where the vehicle is located. The location may be based at least in part on how fast the vehicle is traveling, how long the vehicle has traveled on the route, how long the vehicle has been moving, and/or the known layout of the route. For example, the vehicle controller can calculate how far the vehicle has moved from a known location (e.g., a starting location or other location).

The processor can select the benchmark visual profile from the memory that is associated with and represents a designated layout or arrangement of the route at the location of the vehicle when the image is obtained. This designated layout or arrangement can represent the shape, spacing, arrangement, or the like, that the route is to have for safe travel of the vehicle. For example, the benchmark visual profile can represent the gauge and alignment of the rails of the track when the track was installed or last inspected.

Figure 3A:
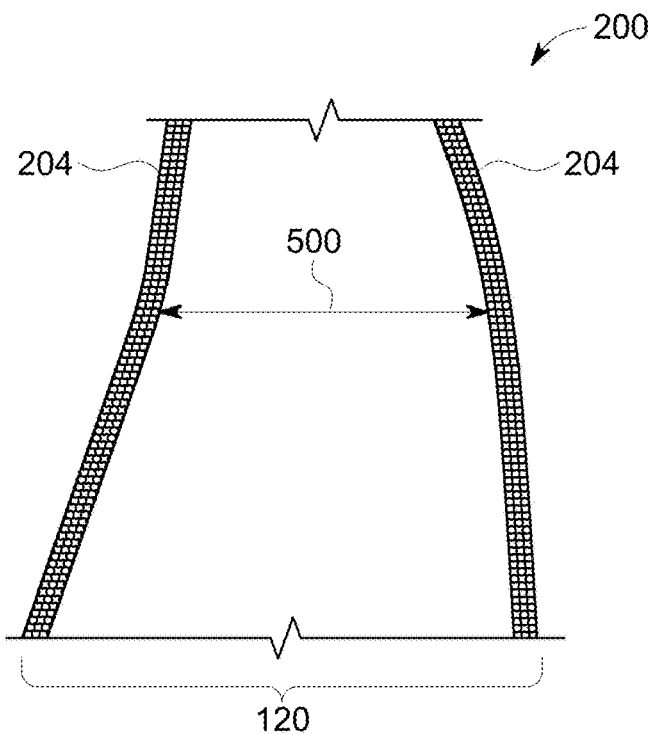
FIGS. 3A and 3B illustrate another example of the image of the route shown in FIG. 1.
Figure 3B:
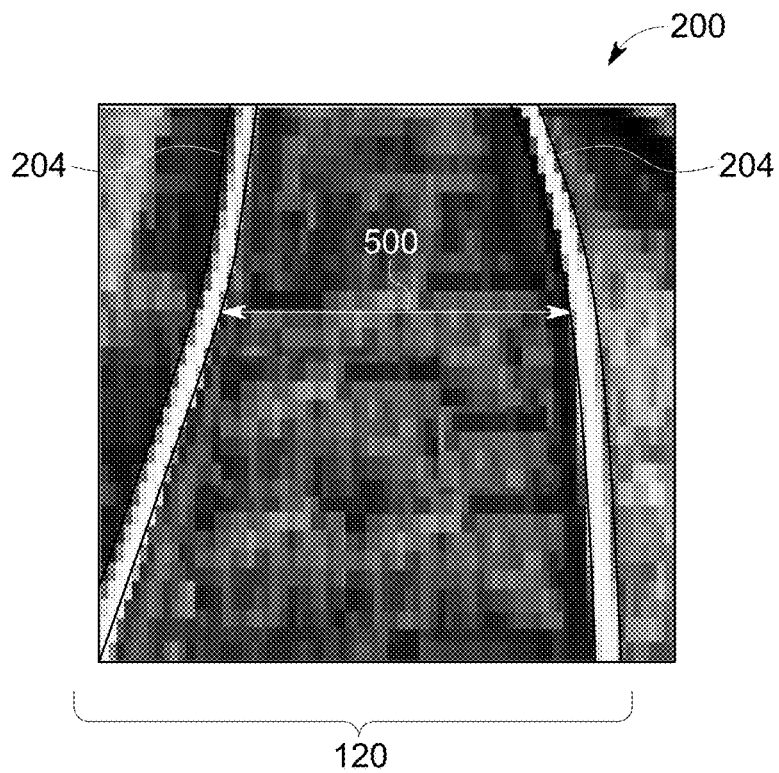

In one aspect, the image analysis processor can measure a gauge of the segment of the route shown in the image to determine if the route is misaligned. FIGS. 3A and 3B illustrate another example of the image of the route shown in FIG. 1. The image analysis processor can examine the image to measure a gauge distance 500 between the rails of the route. In one aspect, the analysis processor can measure a straight line or linear distance between one or more pixels identified as representing one rail to one or more other pixels identified as representing another rail, as shown in FIGS. 3A and 3B. This distance represents the gauge distance of the route. Alternatively, the distance between other pixels may be measured. The processor can determine the gauge distance by multiplying the number of pixels by a known distance that the width of each pixel represents in the image, by converting the number of pixels in the gauge distance to length (e.g., in centimeters, meters, or the like) using a known conversion factor, by modifying a scale of the gauge distance shown in the image by a scaling factor, or otherwise. In some embodiments the pixel count may be used to measure the distance from shoulder to shoulder on a road, or from curb to curb, and the like. For off-road examples, the distance may be the ruts in snow or dirt left from previous vehicles traversing the route. The left and right markers may be the same as each other or may be different. For road based examples, one guide lane may be yellow paint while the other may be white paint. Suitable paint may include retroreflective additives and/or other materials that affect the visibility or perception of the guide lane. In one embodiment, an additive may change the signature of the guide lane. For example, the signature may be set relative to background or ambient images. In one embodiment, the signature is selected to avoid being one that might occur naturally. Suitable additive/signature pairs may include florescent materials, infrared absorbers or emitters, ultraviolet absorbers or emitters, colors that are uncommon in nature (that is, they have a wavelength that is unlikely to occur in the selected location), scintillators, and the like. For agricultural based examples, the left and right markers may be furrows (such as made by a plow) and the furrows may have characteristic shapes (and distances therebetween that approximate a measured gauge).

The measured gauge distance can be compared to a designated gauge distance stored in the memory for the imaged section of the route (or stored elsewhere). The designated gauge distance can be a benchmark visual profile of the route, as this distance represents a designated arrangement or spacing of the rails of the route. If the measured gauge distance differs from the designated gauge distance by more than a designated threshold or tolerance, then the processor can determine that the segment of the route that is shown in the image is misaligned. For example, the designated gauge distance can represent the distance or gauge of the route when the rails were installed or last passed an inspection. If the measured gauge distance deviates too much from this designated gauge distance, then this deviation can represent a changing or modified gauge distance of the route. For aircraft, once altitude (or distance to ground) is known, the aircraft may use ground based markers as guide lanes. In one embodiment, the altitude may be calculated if the gauge distance is known from the captured image for an aligned and undamaged guide lane.

Optionally, the processor may measure the gauge distance several times as the vehicle travels and monitor the measured gauge distances for changes. If the gauge distances change by more than a designated amount, then the processor can identify the upcoming segment of the route as being potentially misaligned. As described below, however, the change in the measured gauge distance alternatively may represent a switch in the route that the vehicle is traveling toward.

Measuring the gauge distances of the route can allow the image analysis processor to determine when one or more of the rails in the route are misaligned, even when the segment of the route may include a curve. Because the gauge distance should be constant or substantially constant (e.g., within manufacturing tolerances), the gauge distance should not significantly change in curved or straight sections of the route, unless the route is misaligned.

If the image analysis processor determines from examination of one or more images that the upcoming segment of the route that the vehicle is traveling toward is misaligned, the image analysis processor can communicate a warning signal to the vehicle controller. This warning signal can indicate to the vehicle controller that an upcoming segment of the route is misaligned. In response to this warning signal, the vehicle controller may take one or more responsive actions. For example, the vehicle controller may include an output device, such as a display, speaker, or the like, that visually and/or audibly warns an operator of the vehicle of the upcoming misaligned segment of the route. The operator may then decide how to proceed. Or, the controller may respond by communicating with an off-board repair or inspection facility to request further inspection and/or maintenance of the misaligned segment of the route. In an autonomous system, the vehicle controller may act by slowing or stopping movement of the vehicle. A suitable response may be some other modification of an operating parameter of the vehicle—reducing engine speed, boosting propulsive power, engaging dynamic braking, and the like. That is, the vehicle controller may automatically implement the responsive action, such as by automatically slowing or stopping movement of the vehicle, controlling the vehicle to turn to the left or right, commanding the vehicle to move sideways, commanding the vehicle to gain height or decrease altitude, to control the propulsion system to resist rocking motions, and/or communicating with the off-board repair or inspection facility to request further inspection and/or maintenance of the misaligned segment of the route (and providing location information).

Figure 4:
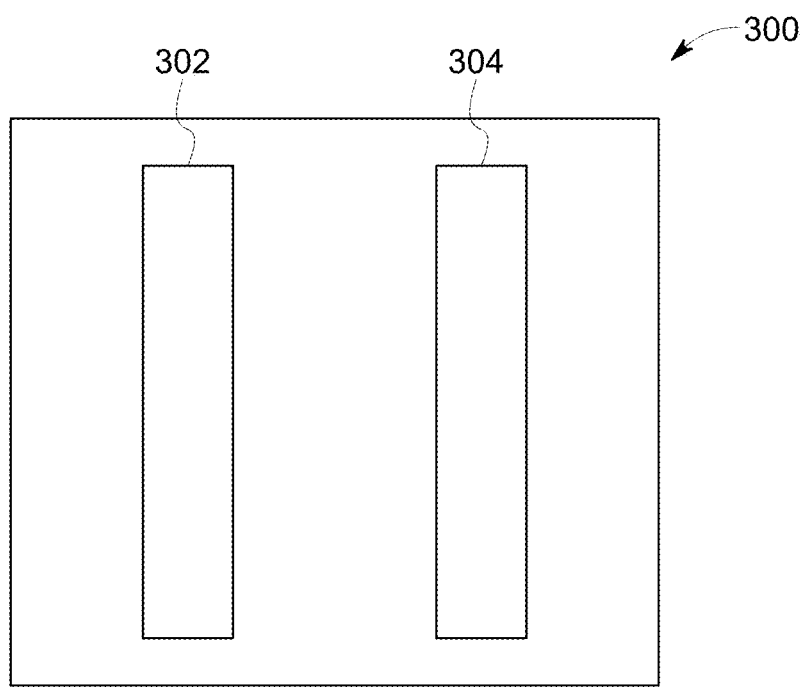
FIG. 4 illustrates another example of a benchmark visual profile.

FIG. 4 illustrates another example of a benchmark visual profile 300. The benchmark visual profile represents a designated layout of the route (shown in FIG. 1), such as where the route is expected to be in the images obtained by one or more of the cameras (shown in FIG. 1).

In the illustrated example, the benchmark visual profile may include designated areas 302, 304 that represent designated positions of rails of a track. The designated areas can represent where the pixels (shown in FIGS. 2A and 2B) of the image (shown in FIGS. 2A and 2B) that represent the rails (shown in FIGS. 2A and 2B) should be located if the rails are aligned properly. For example, the designated areas can represent expected locations of the rails prior to obtaining the image. The rails may be properly aligned when the rails are in the same locations as when the rails were installed or last passed an inspection of the locations of the rails, or at least within a designated tolerance. This designated tolerance can represent a range of locations that the rails may appear in the image due to rocking or other movements of the vehicle (shown in FIG. 1).

Optionally, the benchmark visual profile may represent a former image of the route obtained by a camera on the same or a different vehicle. The designated areas can represent the locations of the pixels in the former image that have been identified as representing the route (e.g., the rails).

In one aspect, the image analysis processor can map the pixels representative of the route (e.g., the rails) to the benchmark visual profile or can map the designated areas of the benchmark visual profile to the pixels representative of the route. This mapping may include determining if the locations of the pixels representative of the route (e.g., the rails) in the image are in the same locations as the designated areas of the benchmark visual profile.

Figure 5A:
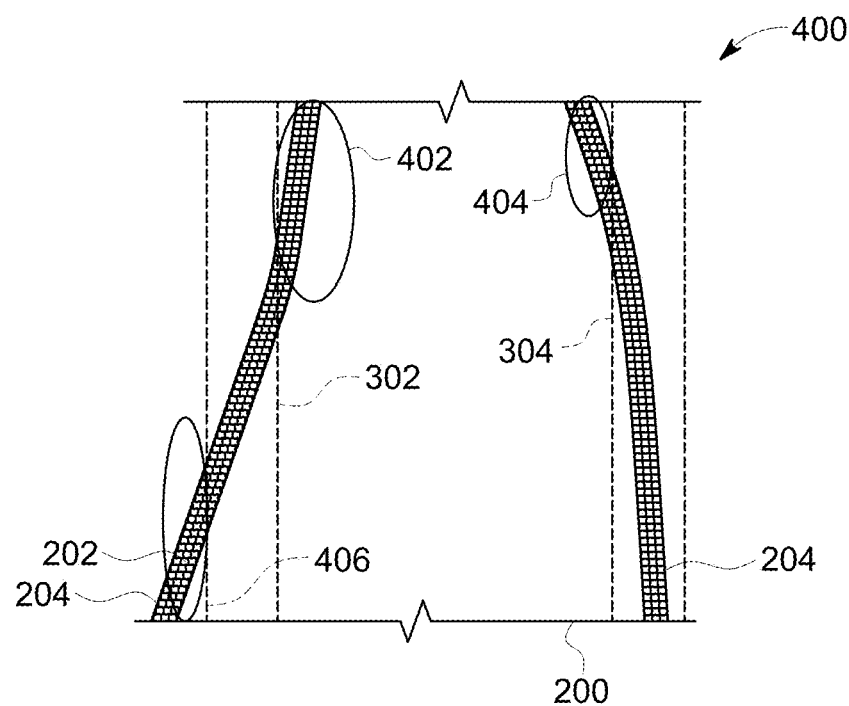
FIGS. 5A and 5B illustrate a visual mapping diagram of the image shown in FIGS. 2A and 2B and the benchmark visual profile shown in FIGS. 3A and 3B according to one example of the inventive subject matter described herein.
Figure 5B:
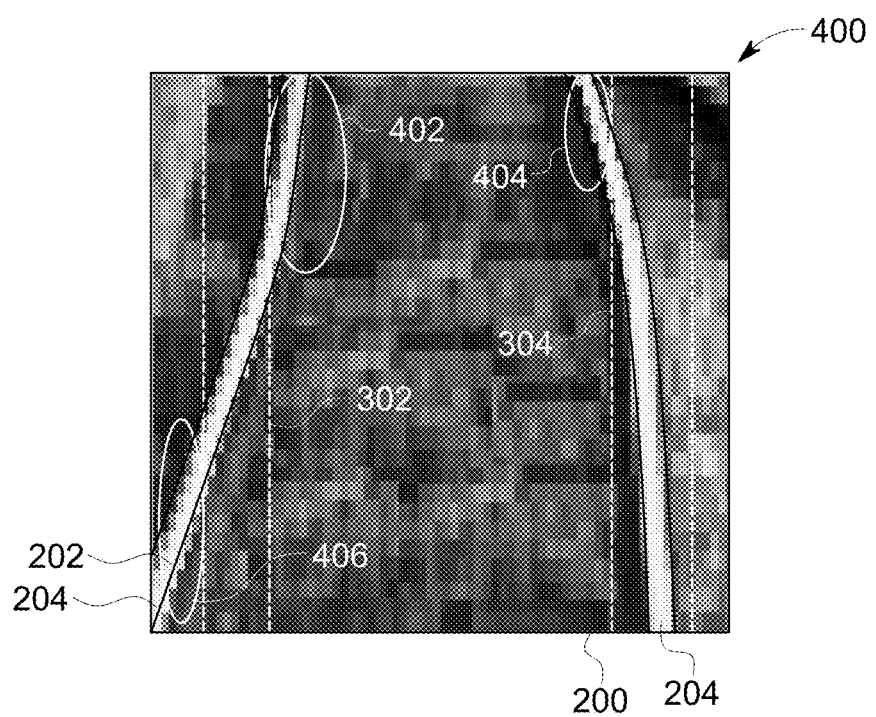

FIGS. 5A and 5B illustrate a visual mapping diagram 400 of the image and the benchmark visual profile according to one example of the inventive subject matter described herein. The mapping diagram represents one example of a comparison of the image with the benchmark visual profile that is performed by the image analysis processor (shown in FIG. 1). As shown in the mapping diagram, the designated areas of the benchmark visual profile can be overlaid onto the image. The processor can then identify differences between the image and the benchmark visual profile. For example, the processor can determine if the pixels representing the route (e.g., representing the rails) are disposed outside of the designated areas. Optionally, the processor can determine if locations of the pixels representing the route in the image (e.g., coordinates of these pixels) are not located within the designated areas (e.g., are not coordinates located within outer boundaries of the designated areas).

If the image analysis processor determines that at least a designated amount of the pixels representing the route are outside of the designated areas, then the processor can identify the segment of the route that is shown in the image as being misaligned. For example, the processor can identify groups 402, 404, 406 of the pixels that represent the route (e.g., the rails) as being outside of the designated areas. If the number, fraction, percentage, or other measurement of the pixels that are representative of the route and that are outside the designated areas exceeds a designated threshold (e.g., 10%, 20%, 30%, or another amount based on the use application), then the segment of the route shown in the image is identified as misaligned. On the other hand, if the number, fraction, percentage, or other measurement of the pixels that are representative of the route and that are outside the designated areas does not exceed the threshold, then the segment of the route shown in the image is not identified as misaligned.

During travel of the vehicle over various segments of the route, the vehicle may encounter (e.g., approach) an intersection between the segment of the route being traveled upon and another route segment. In terms of rail vehicles, such an intersection can include a switch between two or more routes. Due to the arrangement of the rails at a switch, the image analysis processor may adapt the examination of the images to determine if the rails are misaligned.

Figure 6:
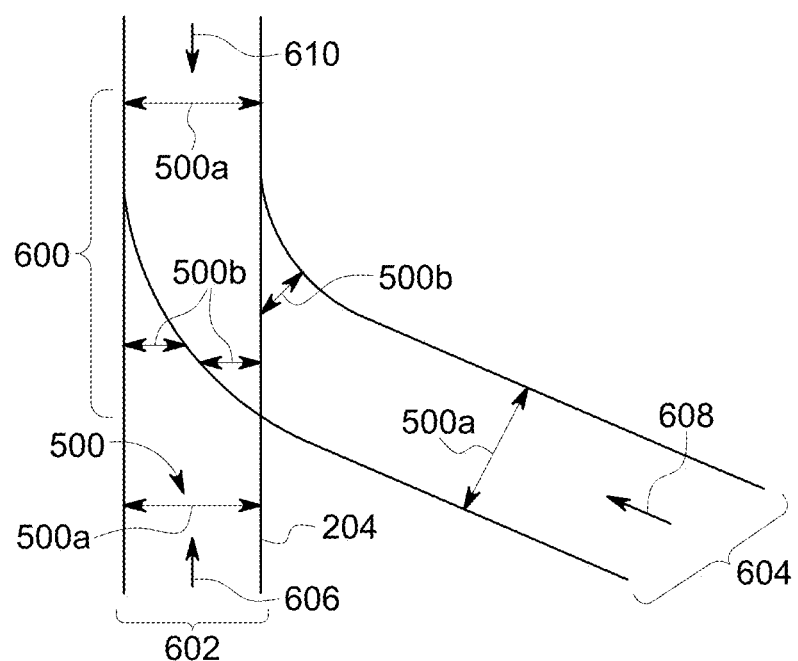
FIG. 6 is a schematic diagram of an intersection between two or more routes according to one example of the inventive subject matter described herein.

FIG. 6 is a schematic diagram of an intersection (e.g., switch) 600 between two or more routes 602, 604 according to one example of the inventive subject matter described herein. One or more, or each, of the routes may be the same as or similar to the route shown in FIG. 1.

If the image analysis processor is measuring gauge distances (shown in FIGS. 3A and 3B) to determine if the rails of the routes are misaligned, then the image analysis processor may identify decreasing gauge distances as the vehicle approaches the switch. For example, if the vehicle is traveling toward the switch on the route along a first direction of travel 606, or the vehicle is traveling toward the switch on the route along a second direction of travel 608, or the vehicle is traveling toward the switch on the route along a third direction of travel 610, then the image analysis processor may determine that the measured gauge distances are decreasing, such as from the distances "a" to the shorter distances "b", or to another distance based on the use application.

Without knowing that the vehicle is approaching the switch, the image analysis processor may incorrectly identify the rails as being misaligned based on this decrease in the gauge distances that are measured. In one aspect, however, the vehicle controller may determine when the vehicle is approaching the switch (e.g., based on the location of the vehicle as determined by the controller and the known locations of the switch, such as from a map or track database that provides switch locations) and notify the image analysis processor. The image analysis processor may then ignore the decreasing gauge distances until the vehicle has passed through or over the switch, such as by not implementing one or more responsive actions described above in response to the measured gauge distances decreasing.

Alternatively, the image analysis processor may obtain one or more benchmark visual profiles from the memory (shown in FIG. 1) that represent the routes at or near the switch. Instead of representing parallel rails, these benchmark visual profiles can represent the arrangement of the rails in the switch. The image analysis processor may then compare the images of the route approaching the switch to the benchmark visual profiles to determine if the route at or near the switch is misaligned.

Optionally, the image analysis processor may determine that the vehicle is approaching the switch based on the images obtained of the route approaching the switch. For example, the distances between the rails of different routes approaching the switch (e.g., the gauge distances "b") may be stored in the memory as benchmark visual profiles. When the image analysis processor determines that the gauge distances being measured from the images of the route that are the same or similar to the stored gauge distances, then the image analysis processor may determine that the vehicle is approaching the switch. The image analysis processor may be used to determine when the vehicle approaches a switch to confirm a location of the vehicle as determined by the vehicle controller, to assist in locating the vehicle when the controller cannot determine the location of the vehicle, and so on.

In one aspect, the image analysis processor may create a benchmark visual profile from the image data that is obtained from the camera. For example, the image analysis processor may not have access to a benchmark visual profile, the section of the route being examined may not be associated with a benchmark visual profile, or the like. The image analysis processor can use the image data to create a benchmark visual profile "on-the-fly," such as by creating the benchmark visual profile as the image data is obtained. The benchmark visual profile can then be used to examine the image data from which the benchmark visual profile was created to identify problems with the route.

Figure 10:
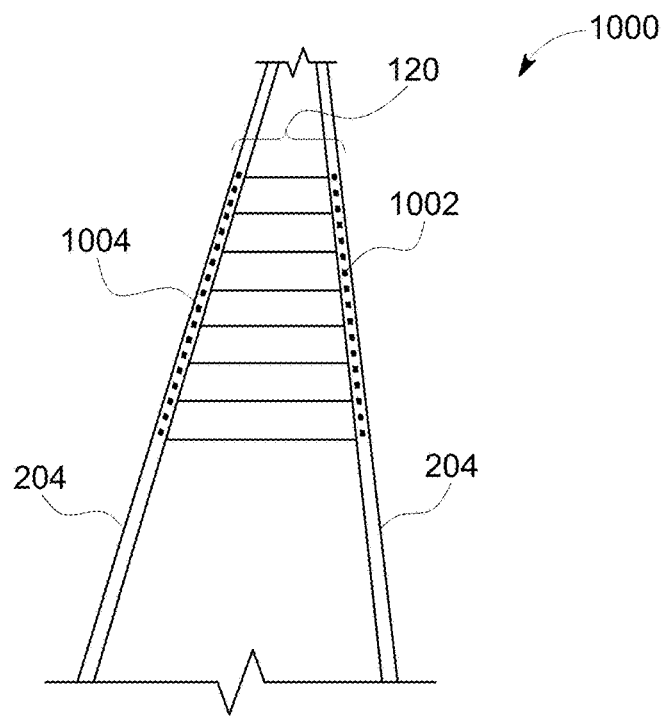
FIG. 10 illustrates a camera-obtained image with benchmark visual profiles of the route according to another example of the inventive subject matter described herein.

FIG. 10 illustrates a camera-obtained image 1000 with benchmark visual profiles 1002, 1004 of the route according to another example of the inventive subject matter described herein. The benchmark visual profiles are created by the image analysis processor (shown in FIG. 1) from the image data used to create the image. For example, the image analysis processor can examine intensities of the pixels to determine the location of the route, as described above. Within the location of the route, the image analysis processor can find two or more pixels having the same or similar (e.g., within a designated range of each other) intensities. Optionally, the image analysis processor may identify many more pixels with the same or similar intensities.

The image analysis processor then determines a relationship between these pixels. For example, the image analysis processor may identify a line between the pixels in the image for each rail. These lines represent the benchmark visual profiles. The image analysis processor can then determine if other pixels representative of the rails of the route are on or within the benchmark visual profiles (e.g., within a designated distance of the benchmark visual profiles, or if these pixels are outside of the benchmark visual profiles. In the illustrated example, most or all of the pixels representative of the rails of the route are on or within the benchmark visual profiles.

Figure 11:
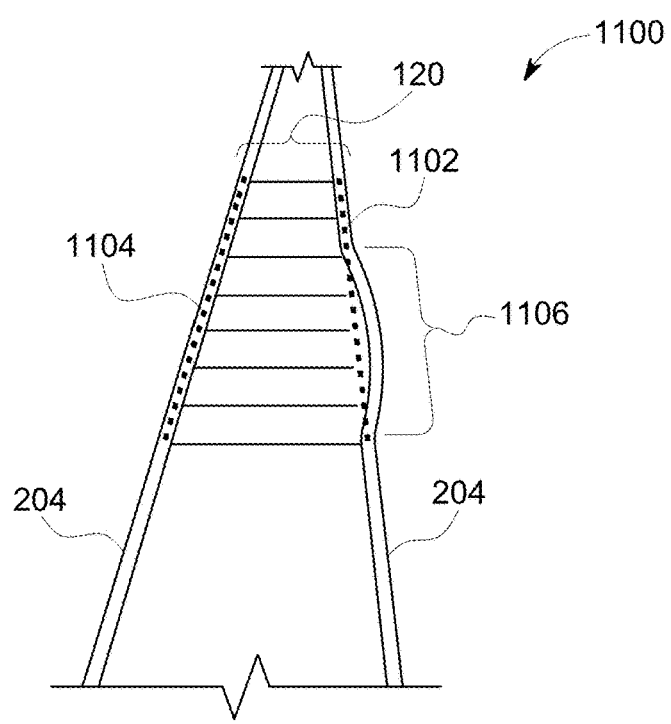
FIG. 11 illustrates another camera-obtained image with benchmark visual profiles of the route according to another example of the inventive subject matter described herein.
Figure 12:
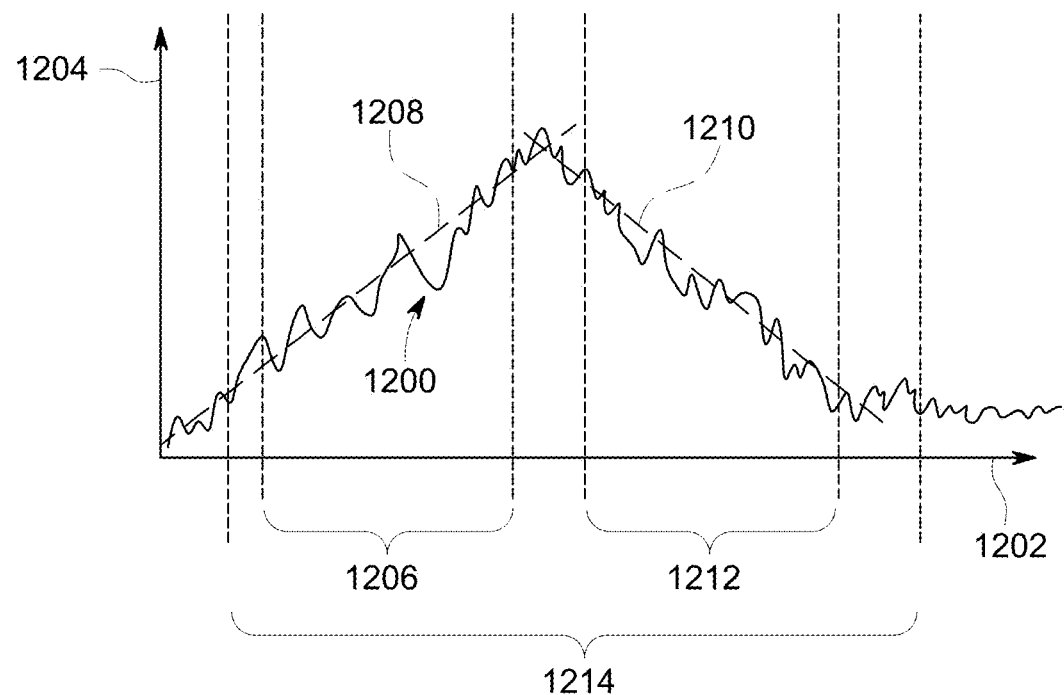
FIG. 12 illustrates one example of gauge distances determined by an image analysis processor.
Figure 13:
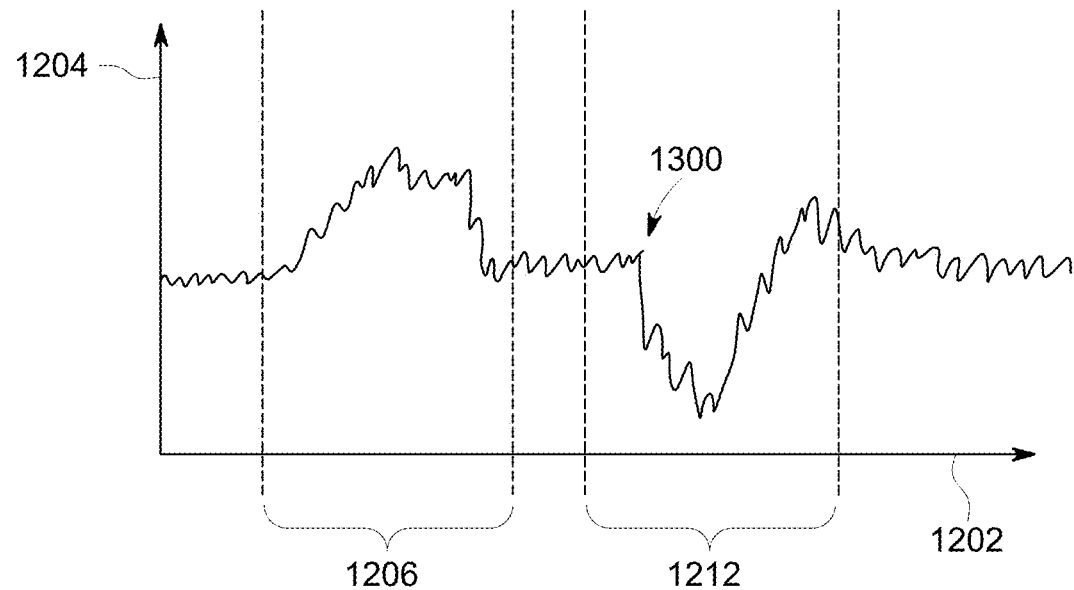
FIG. 13 illustrates another example of gauge distances determined by the image analysis processor shown in FIG. 1.
Figure 14:
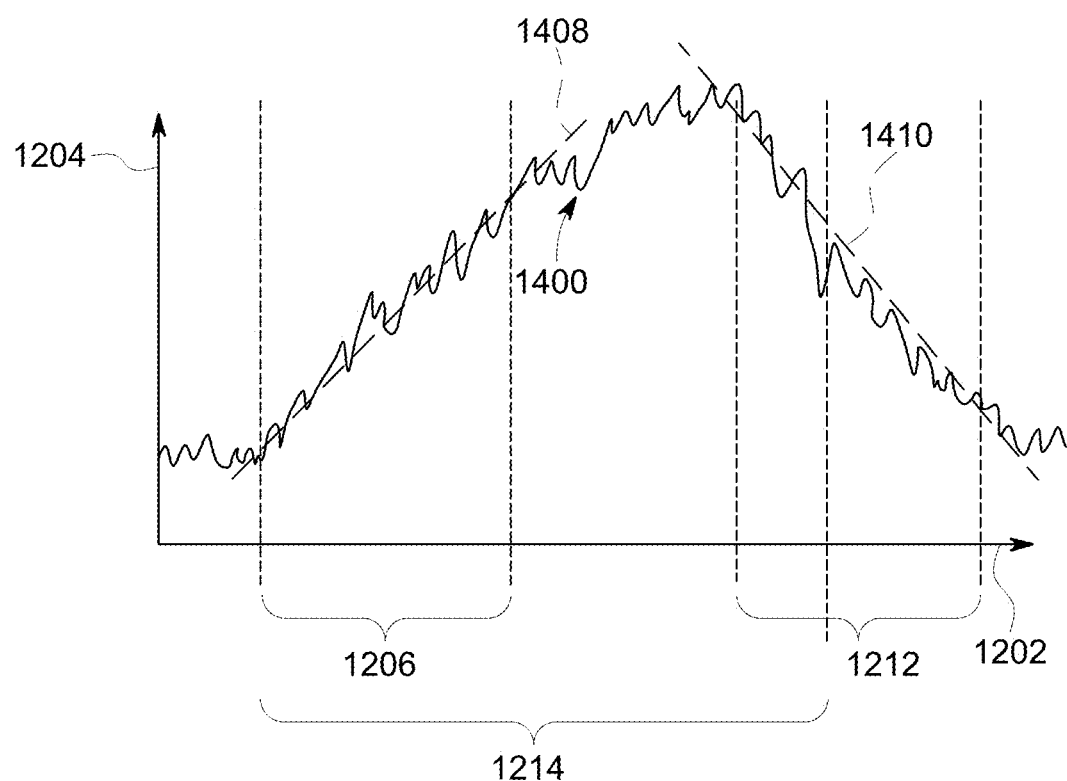
FIG. 14 illustrates another example of gauge distances determined by the image analysis processor shown in FIG. 1.
Figure 15A:
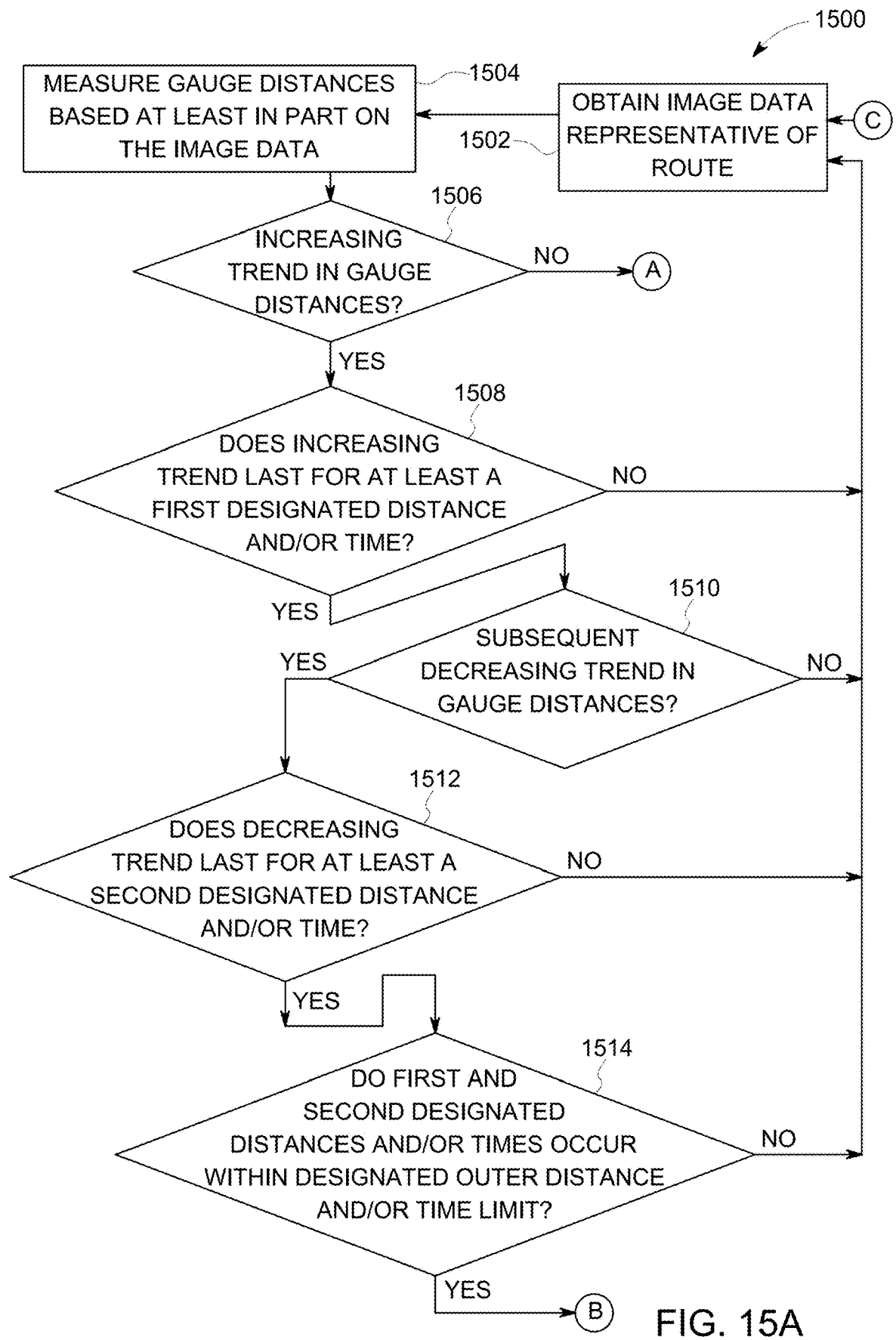
FIG. 15 (comprising parts 15A and 15B) illustrates a flowchart of a method for identifying damage to a route according to one embodiment.
Figure 15B:
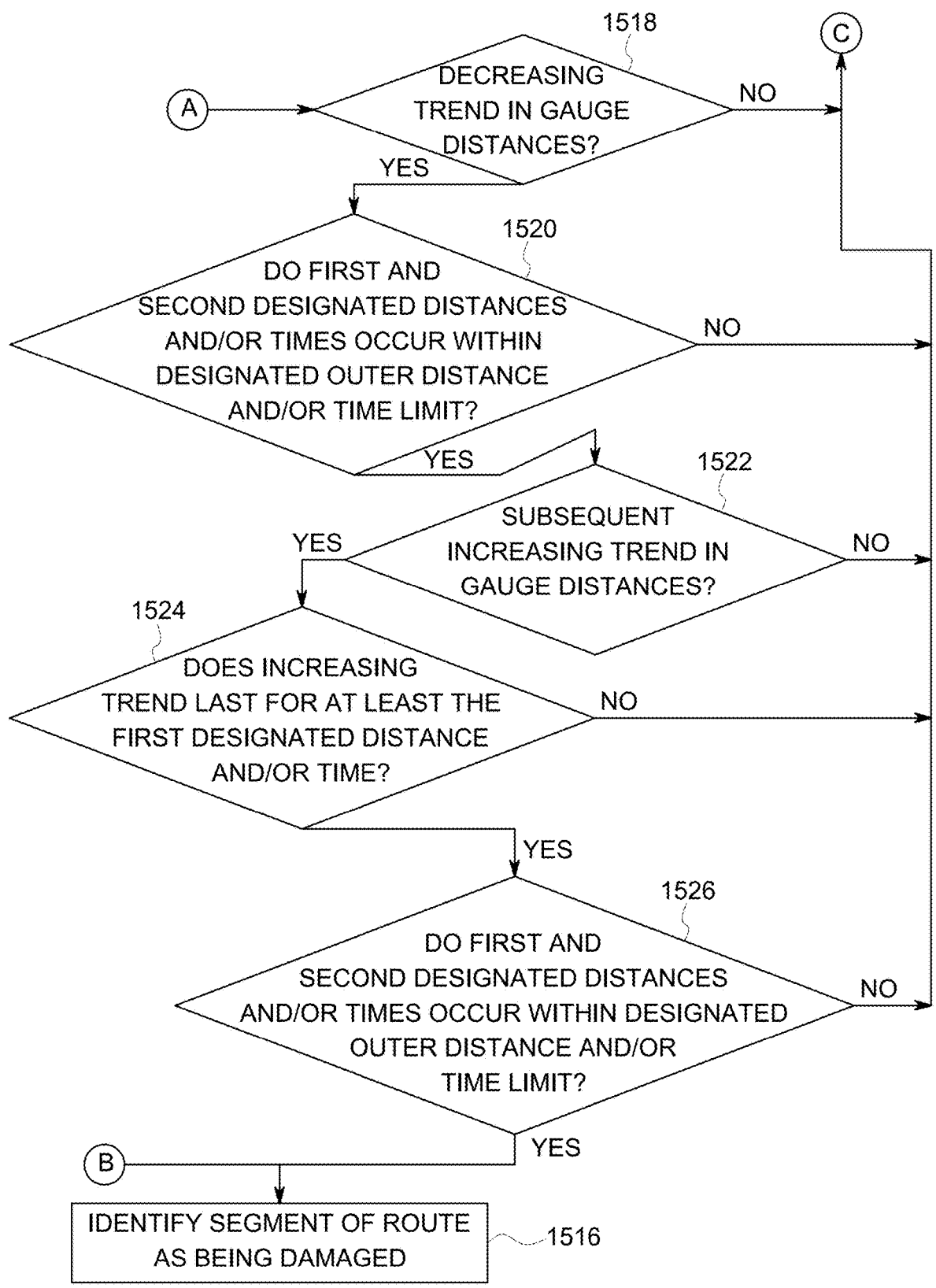

FIG. 11 illustrates another camera-obtained image 1100 with benchmark visual profiles of the route according to another example of the inventive subject matter described herein. The benchmark visual profiles may be created using the image data used to form the image, as described above in connection with FIG. 10. In contrast to the image shown in FIG. 10, however, a segment 1106 of the route does not fall on or within a benchmark visual profile 1104. This segment curves outward and away from the benchmark visual profile. The image analysis processor can identify this segment because the pixels having intensities that represent the rail are no longer on or in the benchmark visual profile. Therefore, the image analysis processor can identify the segment as a misaligned segment of the route.

In one aspect, the image analysis processor can use a combination of techniques described herein for examining the route. For example, if both rails of a route are bent or misaligned from previous positions, but are still parallel or substantially parallel to each other, then the gauge distance between the rails may remain the same or substantially the same, and/or may not substantially differ from the designated gauge distance of the route. As a result, only looking at the gauge distance in the image data may result in the image analysis processor failing to identify damage (e.g., bending) to the rails. To avoid this situation, the image analysis processor additionally can generate the benchmark visual profiles using the image data and compare these profiles to the image data of the rails, as described above in connection with FIGS. 10 and 11. Bending or other misalignment of the rails may then be identified when the bending in the rails deviates from the benchmark visual profile created from the image data.

Figure 7:
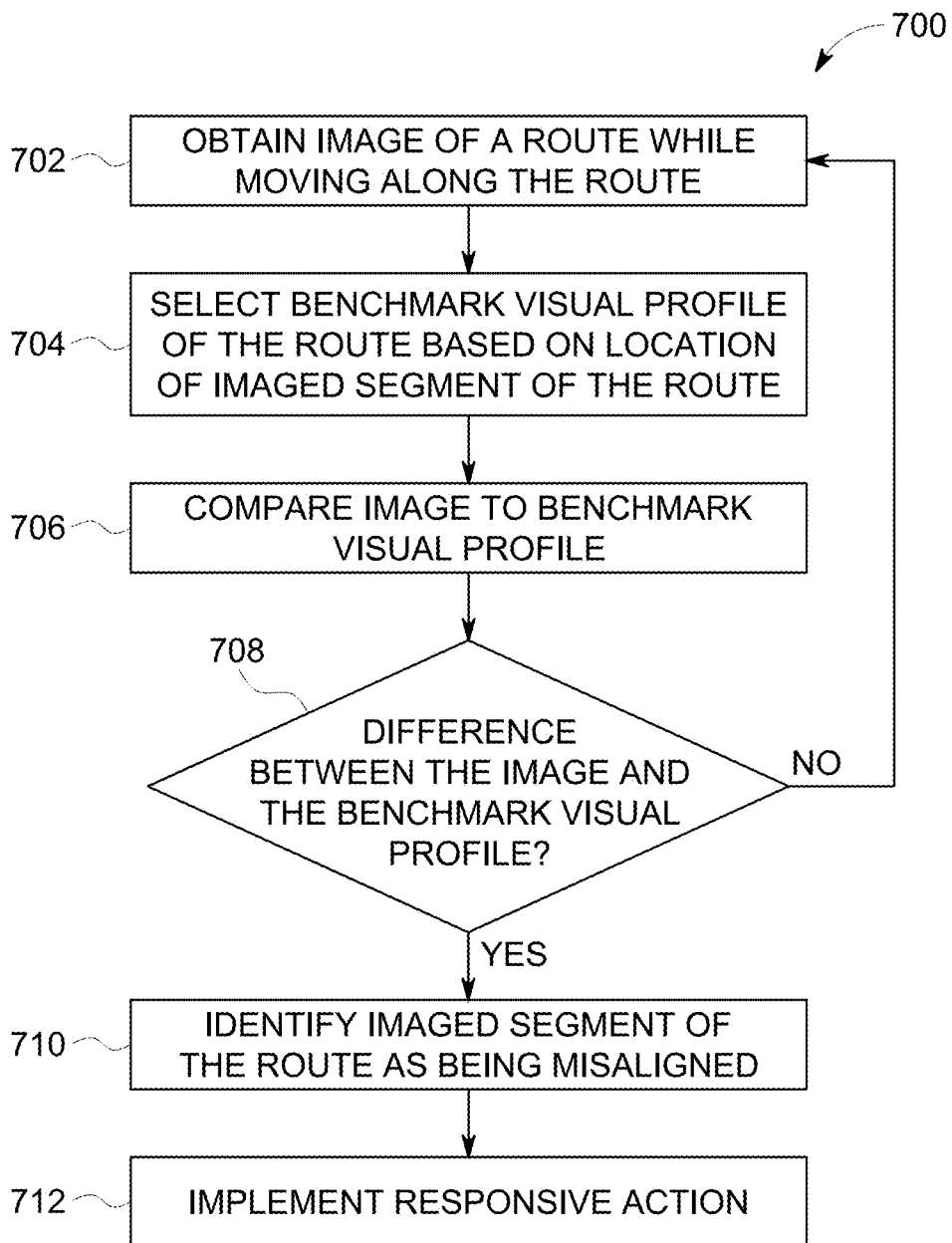
FIG. 7 illustrates a flowchart of a method for examining a route from a vehicle as the vehicle is moving along the route.

FIG. 7 illustrates a flowchart of a method 700 for examining a route from a vehicle as the vehicle is moving along the route. The method can be performed by one or more embodiments of the route examining system (shown in FIG. 1). At 702, an image of the route is obtained from one or more cameras of the vehicle. The image can be obtained of a segment of the route that is ahead of the vehicle along a direction of travel of the vehicle (e.g., the vehicle is moving toward the segment being imaged).

At step 704, a benchmark visual profile of the route is selected based on the location of the segment of the route that was imaged. As described above, the benchmark visual profile can represent a designated gauge distance of the route, a previous image of the route, a spatial representation of where the route is expected to be located or previously was located, or the like.

At step 706, the image is compared to the benchmark visual profile. For example, the gauge of the rail in an image of the route may be measured and compared to the designated gauge of the benchmark visual profile. Optionally, the location of rails in the image may be determined and compared to locations of rails in a previous image of the route. In one aspect, the location of rails in the image are determined and compared to designated areas of the benchmark visual profile.

At step 708, a determination is made as to whether there are differences between the image of the route and the benchmark visual image. For example, a determination may be made as to whether the gauge distance measured from the image is different from the designated gauge distance of the benchmark visual profile. Additionally or alternatively, a determination may be made as to whether the locations of the rails in the image are different from the locations of the rail in a previous image of the route. Optionally, a determination may be made as to whether the locations of the rails in the image are outside of designated areas in the benchmark visual profile. If one or more of these differences are identified, then the difference may indicate that the route (e.g., one or more of the rails) has become misaligned, such as by bending, moving relative to the ground or underlying ballast material, breaking, or the like.

If one or more differences between the image and the benchmark visual profile are identified, then the route may be misaligned from a previous or designated position. As a result, flow of the method can proceed to step 710. On the other hand, if no differences are identified, or if the differences are relatively small or minor, then the route may still be in the same alignment as a previous or designated position (or has moved a relatively small amount). As a result, the vehicle can continue traveling along the upcoming segment of the route, and the method can return to step 702.

At step 710, the segment of the route in the image is identified as being misaligned. At step 712, one or more responsive actions may be implemented, such as by communicating a warning signal to one or more other rail vehicles to warn the other vehicles of the misalignment, communicating a warning signal to one or more wayside devices disposed at or near the track so that the wayside devices can communicate the warning signals to one or more other rail vehicles systems, communicating a warning signal to an off-board facility, automatically slowing or stopping movement of the vehicle, notifying an onboard operator of the misalignment, or the like. Depending on whether the vehicle can continue moving along the route, flow of the method may return to step 702.

In another aspect of the inventive subject matter described herein, the optical route examining system and method may use plural cameras mounted in front of the vehicle and oriented toward (e.g., facing) the route being traveled on. The cameras capture images at a relatively high (e.g., fast) frame rate so as to give a static, stable image of the route. Using plural acquired images, the images are analyzed so that obstacles (e.g., pedestrians, cars, trees, and the like) are identified and/or highlighted. The system and method can warn or provide an indication to the operator of the vehicle of the obstacle to trigger a braking action (manually or autonomously). In the event that the operator does not take action to slow down or apply the brakes of the vehicle, then the brakes may be automatically applied without operator intervention.

The cameras can capture the images at a relatively high frame rate (e.g., at a relatively fast frequency) so as to give static, stable images of the upcoming portion of the route being traveled upon. There may be a temporal delay or lag (e.g., of a few milliseconds) between the capture times for the images obtained by the different cameras. In one aspect, the images captured from different cameras in same time frame (e.g., within the same relatively short time frame) are compared to identify foreign objects on or near the upcoming segment of the route. Feature detection algorithms can be used to identify significant features on the images, such as people, birds, cars, other vehicles (e.g., locomotives), and the like. In one aspect, the images are analyzed to identify a depth of a foreign object, which can be used to estimate a size of the foreign object and/or to identify the foreign object. Using a difference technique, non-stable obstacles like snow, rain, pebbles, and the like, can be eliminated or ignored. Major obstacles such as cars, pedestrians on the track, and the like, can be identified or highlighted, and used to alert the operator of the vehicle of the presence of the major obstacle.

Currently, train operators may not receive sufficiently early warnings or identifications of obstacles on an upcoming segment of the track in different weather conditions. Even the operators are able to see the obstacle, the obstacle may not be seen in time to allow the operator to apply the brakes and stop the train (or other vehicle) before collision with the obstacle. If the advanced image capture and analysis techniques descried herein can detect far-away obstacles early enough, collisions with the obstacles can be avoided.

Returning to the description of the route examining system shown in FIG. 1, one or more of the cameras can obtain several images of an upcoming segment of the route during movement of the vehicle along the route. The description below focuses on two or more cameras obtaining the images, but optionally, only one of the cameras may obtain the images. The image analysis processor may control the cameras to acquire the images at relatively fast frame rates, such as at least by obtaining three hundred images per second per camera or another rate determined at least in part by the application specific parameters.

The image analysis processor then compares the images obtained by one or more of the cameras to identify differences in the images. These differences can represent transitory foreign objects or persistent foreign objects on or near the segment of the route that the vehicle is traveling toward. A transitory foreign object is an object that is moving sufficiently fast that the object will not interfere or collide with the vehicle when the vehicle reaches the foreign object. A persistent foreign object is an object that is stationary or moving sufficiently slow that the vehicle will collide with the foreign object when the vehicle reaches the foreign object.

Figure 8:
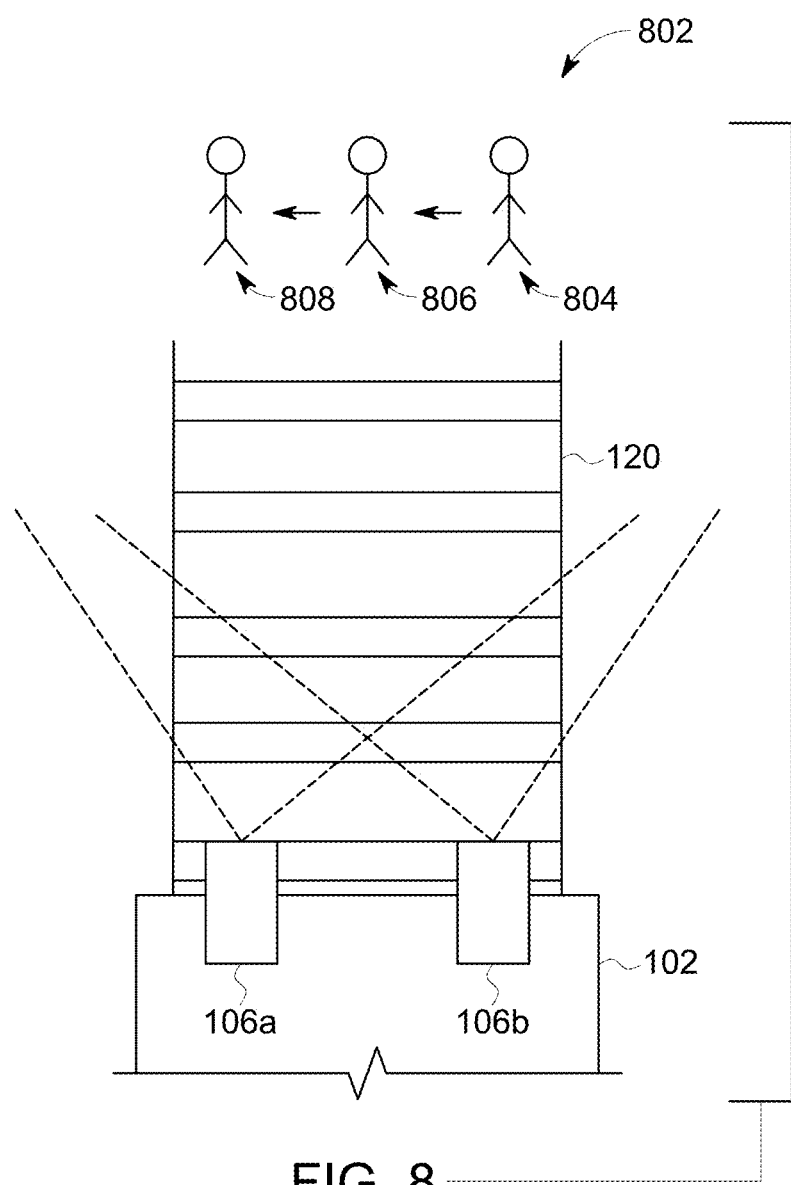
FIG. 8 is an overlay representation of three images acquired by one or more of the cameras shown in FIG. 1 and overlaid on each other according to one example of the inventive subject matter described herein.

FIG. 8 is an overlay representation 800 of three images acquired by one or more of the cameras and overlaid on each other according to one example of the inventive subject matter described herein. The overlay representation represents three images of the same segment of the route taken at different times by one or more of the cameras and combined with each other. The image analysis processor may or may not generate such an overlay representation when examining the images for a foreign object.

As shown in the representation, the route is a persistent object in that the route remains in the same or substantially same location in the images obtained at different times. This is because the route is not moving laterally relative to the direction of travel of the vehicle (shown in FIG. 1) as the vehicle travels along the route. The image analysis processor can identify the route by examining intensities of pixels in the images, as described above, or using another technique.

As shown in the representation, a foreign object 802 may appear in the images. The image analysis processor can identify the foreign object by examining intensities of the pixels in the images (or using another technique) and determining that one or more groups of pixels having the same or similar (e.g., within a designated range) of intensities appear in locations of the images that are close to each other. Optionally, the image analysis processor can compare one or more of the images acquired by the one or more cameras and compare the images to one or more benchmark visual profile, similar to as described above. If differences between the images and the benchmark visual images are identified, then the image analysis processor may identify these differences as being representative of the foreign object. For example, if a benchmark visual profile represents only the rails, but the rails and another object appear in an image, then the image analysis processor can identify the other object as the foreign object. In one aspect, the image analysis processor is able to distinguish between the route (e.g., the rails) and the foreign object due to the different shapes and/or sizes of the route and the foreign object.

Once the foreign object is identified, the image analysis processor can direct one or more of the cameras to zoom in on the foreign object and obtain one or more magnified images. For example, the initial identification of the foreign object may be confirmed by the image analysis processor directing the cameras to magnify the field of view of the cameras and to acquire magnified images of the foreign object. The image analysis processor may again examine the magnified images to confirm the presence of the foreign object, or to determine that no foreign object is present.

The image analysis processor may examine a sequence of two or more of the images (e.g., magnified images or images acquired prior to magnification) to determine if the foreign object is a persistent object or a transitory object. In one aspect, if the foreign object appears in and is identified by the processor in at least a designated number of images within a designated time period, then the foreign object is identified by the processor as a persistent object. The appearance of the foreign object in the designated number of images (or a greater amount of images) for at least the designated time period indicates that the foreign object is located on or near the upcoming segment of the route, and/or likely will remain on or near the route.

For example, a bird flying over the route, precipitation falling onto the route, and the like, may appear in one or more of the images acquired by the cameras. Because these foreign objects tend to move fairly fast, these foreign objects are less likely to be present in the images for more than the designated number of images during the designated period of time. As a result, the image analysis processor does not identify these types of foreign objects as persistent objects, and instead ignores these foreign objects or identifies the foreign objects as transient objects.

As another example, a person standing or walking over the route, a car parked or slowly moving over the route, and the like, may appear in images acquired by the cameras over a longer period of time than flying birds or falling precipitation. As a result, the person or car may appear in at least the designated number of images for at least the designated time period. The image analysis processor identifies such foreign objects as persistent objects.

In response to identifying a foreign object as a persistent object, the image analysis processor may implement one or more mitigating actions. For example, the image analysis processor can generate a warning signal that is communicated to the vehicle controller (shown in FIG. 1). This warning signal may cause one or more alarms to sound, such as an internal and/or external siren to generate an audible warning or alarm that the vehicle is approaching the persistent object. Optionally, the warning signal may generate a visual or other alarm to an operator of the vehicle to notify the operator of the persistent object. Additionally or alternatively, the warning signal may cause the vehicle controller to automatically apply brakes of the vehicle. In one aspect, the warning signal may cause the vehicle controller to communicate a signal to a switch or other wayside device that controls a switch, so that the switch is automatically changed to cause the vehicle to leave the currently traveled route (on which the persistent object is detected) and to move onto another, different route to avoid colliding with the persistent object.

In one example of the inventive subject matter described herein, the image analysis processor can determine a moving speed of the persistent object and determine which mitigating action, if any, to implement. In the example shown in FIG. 8, the foreign object appears in different locations of the images relative to the route. For example, in a first image, the foreign object appears at a first location 804, in a subsequent, second image, the foreign object appears at a different, second location 806, and in a subsequent, third image, the foreign object appears at a different, third location 808.

The image analysis processor can identify the changing positions of the foreign object and estimate a moving speed of the foreign object. For example, the image analysis processor can control the frame rate of the cameras, and therefore can know the length of time between when consecutive images were acquired. The image analysis processor can measure the changes in positions of the foreign object between the different locations, and so on, and scale these changes in positions to an estimated distance that the foreign object has moved between the images. For example, the image analysis processor can estimate the distance in a manner similar to measuring the gauge distance shown in FIGS. 3A and 3B. Instead of measuring the distance between rails, however, the image analysis processor is estimating the movement distance of the foreign object.

The image analysis processor can estimate the moving speed at which the foreign object is moving using the changes in positions divided by the time period between when the images showing the different positions of the foreign object were acquired. If the foreign object is moving slower than a designated speed, then the image analysis processor may determine that the foreign object is unlikely to clear the route before the vehicle reaches the foreign object. As a result, the image analysis processor may generate a warning signal for the vehicle controller that requests a more immediate response, such as by immediately actuating the brakes of the vehicle (e.g., to a full or sufficiently large extent to slow and stop movement of the vehicle). If the foreign object is moving at least as fast as the designated speed, then the image analysis processor may determine that the foreign object is more likely to clear the route before the vehicle reaches the foreign object. As a result, the image analysis processor may generate a warning signal for the vehicle controller that requests a less immediate response, such as by activating a warning siren, automatically reducing the throttle level, and/or automatically slowing (but not stopping) the vehicle by applying the brakes.

In one embodiment, the image analysis processor can use images obtained by two or more cameras to confirm or refute the potential identification of a persistent object on or near the route. For example, the processor can examine a first set of images from one camera "a" and examine a second set of images from another camera "b" to determine if the persistent object is identified in both the first set of images and the second set of images. If the persistent object is detected from both sets of images, then the image analysis processor may determine which mitigating action to implement, as described above.

The image analysis processor can examine the images obtained by the two or more cameras to estimate a depth of the foreign object. For example, the images acquired at the same time or approximately the same time by different, spaced apart cameras may provide a stereoscopic view of the foreign object. Due to the slightly different fields of view of the cameras, the images that are obtained at the same time or nearly the same time may have slight differences in the relative location of the foreign object, even if the foreign object is stationary. For example, the foreign object may appear slightly to one side of the image acquired by one camera "a" than in the image acquired by another camera "b". The image analysis processor can measure these differences (e.g., by measuring the distances between common pixels or portions of the foreign object) and estimate a depth of the foreign object (e.g., the distance between opposite sides of the foreign object along a direction that is parallel or coaxial with the direction of travel of the vehicle). For example, larger depths may be estimated when these differences are larger than when the differences are smaller.

The image analysis processor may use the estimated depth to determine which mitigating action to implement. For example, for larger estimated depths, the image analysis processor may determine that the foreign object is larger in size than for smaller estimated depths. The image analysis processor may request more severe mitigating actions for larger estimated depths and less severe mitigating actions for smaller estimated depths.

Additionally or alternatively, the image analysis processor may examine the two dimensional size of an identified foreign object in one or more of the images to determine which mitigating action to implement. For example, the image analysis processor can measure the surface area of an image that represents the foreign object in the image. The image analysis processor can combine this two dimensional size of the foreign object in the image with the estimated depth of the foreign object to determine a size index of the foreign object. The size index represents how large the foreign object is. Optionally, the size index may be based on the two dimensional size of the imaged foreign object, and not the estimated depth of the foreign object.

The image analysis processor may use the size index to determine which mitigating action to implement. The image analysis processor may request more severe mitigating actions for larger size indices and less severe mitigating actions for smaller size indices.

The image analysis processor can compare the two dimensional areas and/or estimated depths of the foreign object to one or more object templates to identify the foreign object. The object templates may be similar to designated areas 302, 304 shown in the benchmark visual image 300 in FIGS. 5A and 5B. As described above, the designated areas represent where properly aligned rails are expected to be located in an image. Similar designated areas can represent shapes of other objects, such as pedestrians, automobiles, livestock, or the like. The image analysis processor can compare the size and/or shape of the foreign object in one or more images with the size and/or shape of one or more designated areas (e.g., object templates) that represent one or more different foreign objects. If the size and/or shape of the foreign object is the same as or similar to (e.g., within a designated tolerance), then the image analysis processor can identify the foreign object in the image as the same foreign object represented by the object template.

The image analysis processor may use the identification of the foreign object to determine which mitigating action to implement. For example, if the foreign object is identified as an automobile or pedestrian, the image analysis processor may request more severe mitigating actions than if the foreign object is identified as something else, such as livestock.

In one aspect, the image analysis processor stores one or more of the images in the memory and/or communicates the images to an off-board location. The images may be retrieved from the memory and/or from the off-board location, and compared with one or more images of the same segments of the route obtained by the same vehicle at a different time and/or by one or more other vehicles at other times. Changes in the images of the route may be used to identify degradation of the route, such as by identifying wear and tear in the route, washing away of ballast material beneath the route, or the like, from changes in the route over time, as identified in the images.

Figure 9:
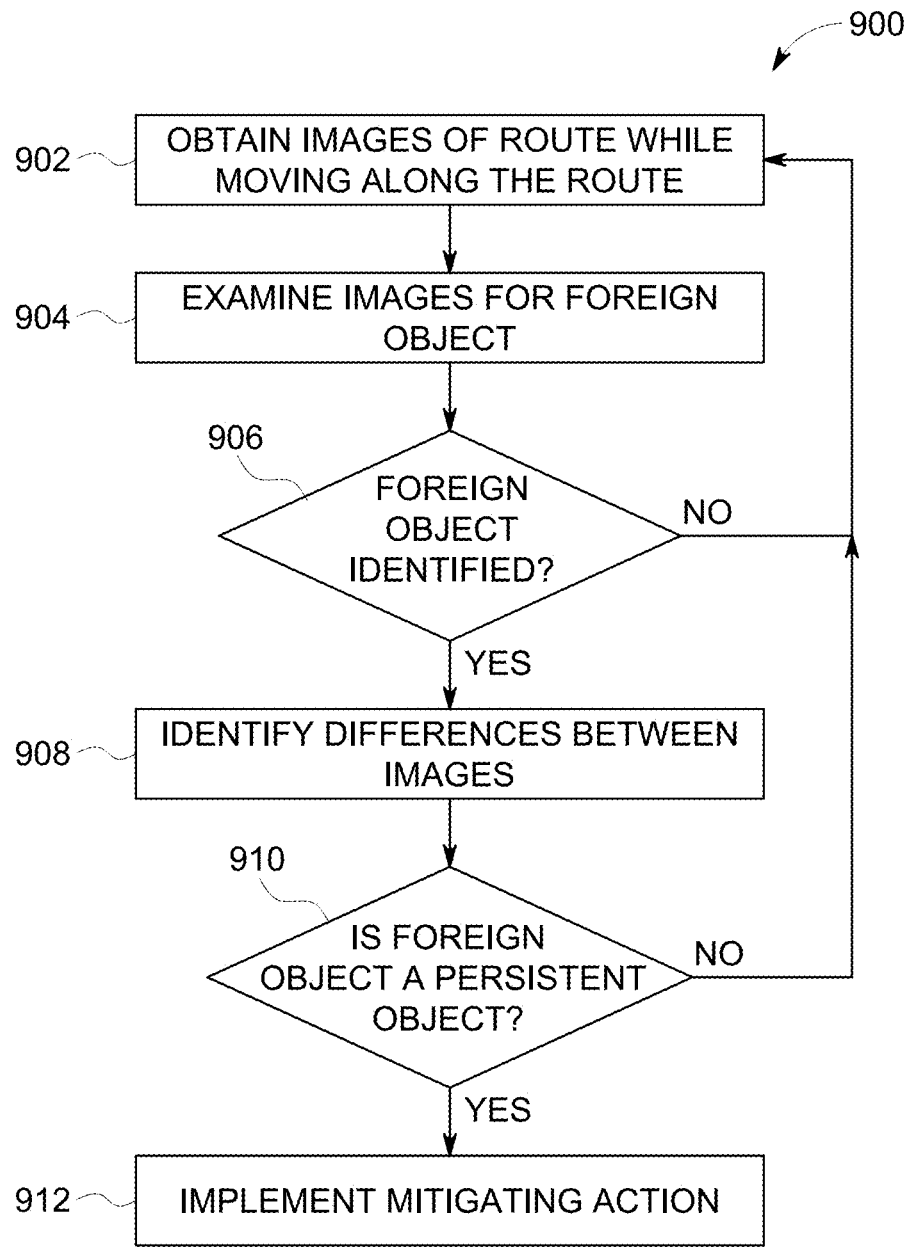
FIG. 9 illustrates a flowchart of a method for examining a route from a vehicle as the vehicle is moving along the route.

FIG. 9 illustrates a flowchart of a method 900 for examining a route from a vehicle as the vehicle is moving along the route. The method can be performed by one or more embodiments of the route examining system (shown in FIG. 1). At step 902, plural images of the route are obtained from one or more cameras of the vehicle. The images can be obtained of a segment of the route that is ahead of the vehicle along a direction of travel of the vehicle (e.g., the vehicle is moving toward the segment being imaged).

At step 904, the images are examined to determine if a foreign object is present in one or more of the images. For example, intensities of the pixels in the images can be examined to determine if a foreign object is on or near the segment of the route being approached by the vehicle.

At step 906, a determination is made as to whether a foreign object is identified in the image. For example, if the image is compared to a previous image or other benchmark visual profile, and the shape of an object appears in the current image, but not the previous image or the other benchmark visual profile, then the object may represent a foreign object. As a result, the foreign object is identified in the image, and flow of the method can proceed to step 908. On the other hand, if no foreign object is identified in the image, then flow of the method can return to step 902.

In one aspect, the presence of the foreign object may be determined by examining a first set of images acquired by a first camera and a second set of images acquired by a second camera. If the foreign object is identified in the first set of images and the foreign object is identified in the second set of images, then flow of the method can proceed to step 908. Otherwise, flow of the method can return to step 902.

In one aspect, the presence of the foreign object may be determined by examining different images acquired at different magnification levels. For example, if the foreign object is identified in one or more images obtained at a first magnification level, the camera may zoom into the foreign object and acquire one or more images at an increased second magnification level. The images at the increased magnification level can be examined to determine if the foreign object appears in the images. If the foreign object is identified in the magnified second, then flow of the method can proceed to step 908. Otherwise, flow of the method can return to step 902.

At step 910, a determination is made as to whether the foreign object is a persistent object or a transitory object. As described above, a sequential series of two or more images of the route can be examined to determine if the foreign object is present in the images. If the foreign object does appear in at least a designated number of the images for at least a designated time period, then the foreign object may be identified as a persistent object, as described above. As a result, one or more mitigating actions may need to be taken to avoid colliding with the foreign object, and flow of the method can proceed to step 912.

On the other hand, if the foreign object does not appear in at least the designated number of the images for at least the designated time period, then the foreign object may be a transitory object, and may not be identified as a persistent object, as described above. As a result, one or more mitigating actions may not need to be taken as the foreign object may not be present when the vehicle reaches the location of the foreign object. Flow of the method can then return to step 902.

At step 912, one or more mitigating actions may be taken. For example, the operator of the vehicle may be warned of the presence of the foreign object, an audible and/or visual alarm may be activated, the brakes of the vehicle may be automatically engaged, the throttle of the vehicle may be reduced, or the like. As described above, the size, depth, and/or identity of the foreign object may be determined and used to select which of the mitigating actions is implemented.

In one example of the inventive subject matter described herein, a method (e.g., for optically examining a route such as a track) may include obtaining one or more images of a segment of a track from a camera mounted to a rail vehicle while the rail vehicle is moving along the track and selecting (with one or more computer processors) a benchmark visual profile of the segment of the track. The benchmark visual profile represents a designated layout of the track. The method also can include comparing (with the one or more computer processors) the one or more images of the segment of the track with the benchmark visual profile of the track and identifying (with the one or more computer processors) one or more differences between the one or more images and the benchmark visual profile as a misaligned segment of the track.

In one aspect, the one or more images of the segment of the track are compared to the benchmark visual profile by mapping pixels of the one or more images to corresponding locations of the benchmark visual profile and determining if the pixels of the one or more images that represent the track are located in common locations as the track in the benchmark visual profile. In one aspect, the method also may include identifying portions of the one or more images that represent the track by measuring intensities of pixels in the one or more images and distinguishing the portions of the one or more images that represent the track from other portions of the one or more images based on the intensities of the pixels.

In one aspect, the benchmark visual profile visually represents locations where the track is located prior to obtaining the one or more images. In one aspect, the method also may include measuring a distance between rails of the track by determining a number of pixels disposed between the rails in the one or more images. In one aspect, the method also may include comparing the distance with a designated distance to identify a changing gauge of the segment of the track. In one aspect, the method also may include identifying a switch in the segment of the track by identifying a change in the number of pixels disposed between the rails in the one or more images. In one aspect, the method also may include creating the benchmark visual profile from at least one image of the one or more images that are compared to the benchmark visual profile to identify the one or more differences. In one aspect, the method also may include comparing the one or more images of the segment of the track with one or more additional images of the segment of the track obtained by one or more other rail vehicles at one or more other times in order to identify degradation of the segment of the track.

In one aspect, the one or more images of the segment of the track are obtained while the rail vehicle is traveling at an upper speed limit of the segment of the track (e.g., track speed). In another example of the inventive subject matter described herein, a system (e.g., an optical route examining system) may include a camera and one or more computer processors. The camera can be mounted to a rail vehicle and to obtain one or more images of a segment of a track while the rail vehicle is moving along the track. The one or more computer processors can select a benchmark visual profile of the segment of the track that represents a designated layout of the track. The one or more computer processors also can compare the one or more images of the segment of the track with the benchmark visual profile of the track to identify one or more differences between the one or more images and the benchmark visual profile as a misaligned segment of the track. In one aspect, the one or more computer processors can compare the one or more images of the segment of the track to the benchmark visual profile by mapping pixels of the one or more images to corresponding locations of the benchmark visual profile and determining if the pixels of the one or more images that represent the track are located in common locations as the track in the benchmark visual profile.

In one aspect, the one or more computer processors can identify portions of the one or more images that represent the track by measuring intensities of pixels in the one or more images and to distinguish the portions of the one or more images that represent the track from other portions of the one or more images based on the intensities of the pixels. In one aspect, the benchmark visual profile visually represents locations where the track is located prior to obtaining the one or more images. In one aspect, the one or more computer processors also can measure a distance between rails of the track by determining a number of pixels disposed between the rails in the one or more images. In one aspect, the one or more computer processors can compare the distance with a designated distance to identify a changing gauge of the segment of the track.

In one aspect, the one or more computer processors can identify a switch in the segment of the track by identifying a change in the number of pixels disposed between the rails in the one or more images. In one aspect, the one or more computer processors can create the benchmark visual profile from at least one image of the one or more images that are compared to the benchmark visual profile to identify the one or more differences. In one aspect, the one or more computer processors can compare the one or more images of the segment of the track with one or more additional images of the segment of the track obtained by one or more other rail vehicles at one or more other times in order to identify degradation of the segment of the track.

In one aspect, the camera can obtain the one or more images of the segment of the track and the one or more computer processors can identify the misaligned segment of the track while the rail vehicle is traveling at an upper speed limit of the segment of the track. In another example of the inventive subject matter described herein, a method (e.g., an optical route examining method) may include obtaining plural first images of an upcoming segment of a route with one or more cameras on a vehicle that is moving along the route, examining the first images with one or more computer processors to identify a foreign object on or near the upcoming segment of the route, identifying one or more differences between the first images with the one or more processors, determining if the foreign object is a transitory object or a persistent object based on the differences between the first images that are identified, and implementing one or more mitigating actions responsive to determining if the foreign object is the transitory object or the persistent object. In one aspect, the method also may include increasing a magnification level of the one or more cameras to zoom in on the foreign object and obtaining one or more second images of the foreign object. The foreign object can be determined to be the persistent object responsive to a comparison between the first images and the one or more second images. In one aspect, the first images are obtained at different times, and implementing the one or more mitigating actions may include prioritizing the one or more mitigating actions based on the differences in the first images obtained at the different times.

In one aspect, the method also may include calculating a depth of the foreign object and a distance from the vehicle to the foreign object based on comparisons of the first images and the second images. In one aspect, implementing the one or more mitigating actions is performed based on whether the foreign object is the persistent object or the transitory object, a depth of the foreign object that is calculated by the one or more computer processors from the differences between the first images, and a distance from the vehicle to the foreign object that is calculated by the one or more computer processors from the differences between the first images. In one aspect, the method also may include estimating a moving speed of the foreign object with the one or more computer processors from the differences between the first images.

In one aspect, the one or more cameras acquire the first images at a first frame rate and additional, second images at a different, second frame rate. The method can also include modifying at least one of the first frame rate or the second frame rate based on changes in a moving speed of the vehicle. In one aspect, the method also may include comparing the first images with plural additional images of the route obtained by plural other vehicles at one or more other times in order to identify degradation of the route.

In another example of the inventive subject matter described herein, a system (e.g., an optical route examining system) may include one or more cameras configured to be mounted on a vehicle and to obtain plural first images of an upcoming segment of a route while the vehicle is moving along the route. The system also may include one or more computer processors configured to compare the first images with each other to identify differences between the first images, to identify a foreign object on or near the upcoming segment of the route based on the differences between the first images that are identified, to determine if the foreign object is a transitory object or a persistent object based on the differences between the first images that are identified, and to implement one or more mitigating actions responsive to determining if the foreign object is the transitory object or the persistent object. In one aspect, the one or more computer processors also can direct the one or more cameras to increase a magnification level of the one or more cameras to zoom in on the foreign object and obtaining one or more second images of the foreign object. The foreign object can be determined to be the persistent object by the one or more computer processors responsive to a comparison between the first images and the one or more second images. In one aspect, the one or more computer processors direct the one or more cameras to obtain the first images at different times, and the one or more computer processors can implement the one or more mitigating actions by prioritizing the one or more mitigating actions based on the differences in the first images obtained at the different times.

In one aspect, the one or more computer processors also can calculate a depth of the foreign object and a distance from the vehicle to the foreign object based on comparisons of the first images. In one aspect, the one or more computer processors can implement the one or more mitigating actions based on whether the foreign object is the persistent object or the transitory object, a depth of the foreign object that is calculated by the one or more computer processors based on the differences between the first images, and a distance from the vehicle to the foreign object that is calculated by the one or more computer processors based on the differences between the first images. In one aspect, the one or more computer processors can estimate a moving speed of the foreign object from the differences between the first images.

In one aspect, the one or more cameras acquire the first images at a first frame rate and additional, second images at a different, second frame rate. The one or more computer processors also can be configured to modify at least one of the first frame rate or the second frame rate based on changes in a moving speed of the vehicle. In one aspect, the one or more computer processors also can compare the first images with plural additional images of the route obtained by plural other vehicles at one or more other times in order to identify degradation of the route. In another embodiment, an optical route examination system examines image data to detect signs alongside a route using an on-board camera of a vehicle. Certain signs (e.g., mileposts) can be detected and stored in a memory structure, such as a database, list, or the like. Using image analysis (e.g., optical character recognition), information on the signs (e.g., letters, numbers, symbols, or the like) can be determined. The memory structure can be built or created to include images of the signs, the information on the sign, and/or the location of the sign. The memory structure can then be used and/or updated for a variety of purposes, such as for automatic control of vehicles. For example, a positive train control (PTC) system, an onboard safety system, or the like can use the information in the memory structure to determine when to slow movement of vehicles in certain areas, when to allow the vehicles to travel faster, when to automatically apply brakes of the vehicles, or the like.

Figure 16:
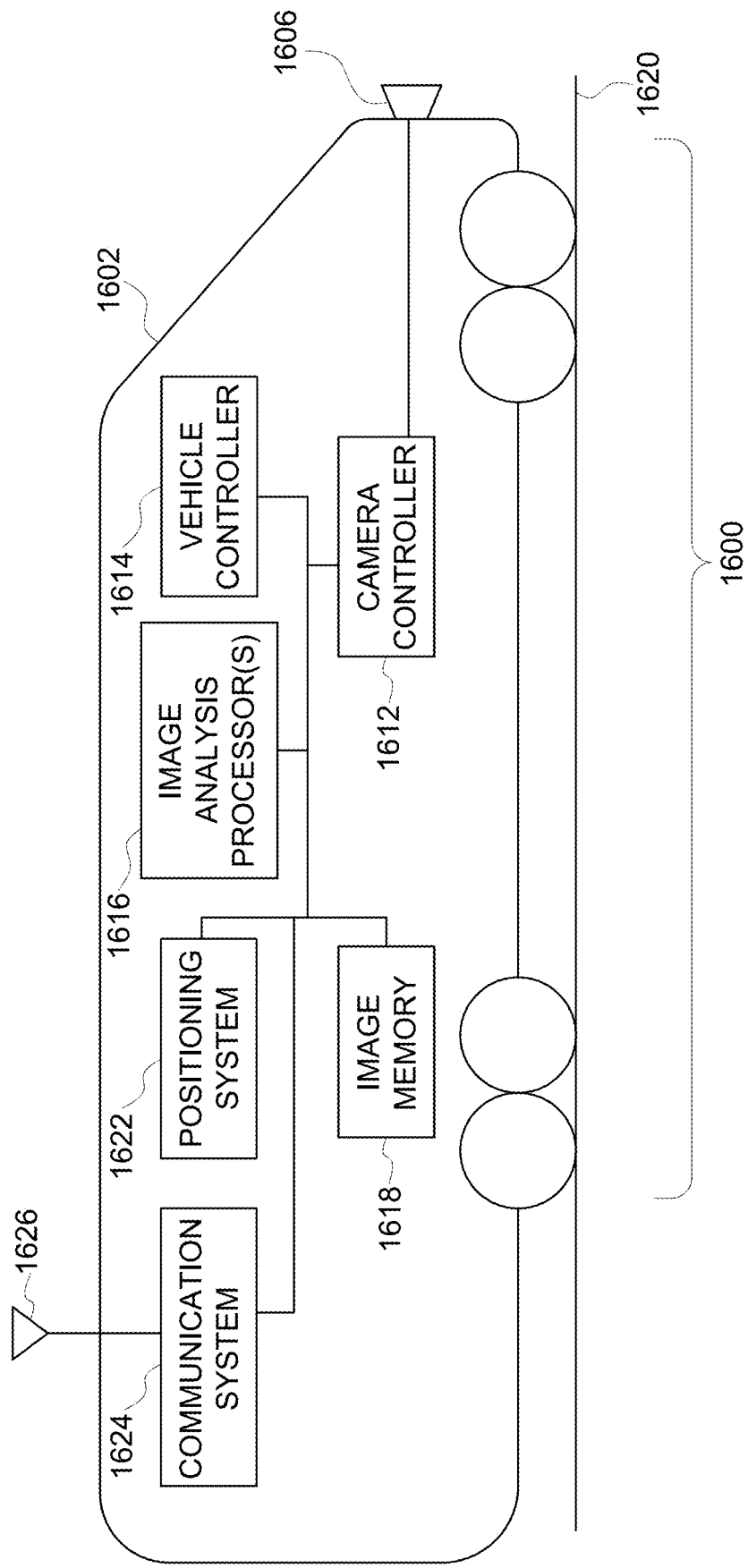
FIG. 16 is a schematic illustration of an optical route examination system in accordance with another embodiment.

FIG. 16 is a schematic illustration of an optical route examination system 1600 in accordance with another embodiment. The system 1600 is disposed onboard a vehicle 1602 that travels along a route 1620. The vehicle may be the same as or different from the vehicle shown in FIG. 1. For example, the vehicle may be an automobile. The vehicle can be coupled with one or more other vehicles to form a consist. The vehicles in consist may be logically or communicatively coupled, and/or may be mechanically coupled. Alternatively, the vehicle may be a marine vessel or an off-highway vehicle (e.g., a vehicle that is not designed or is not permitted to travel on public roadways). Off-highway vehicles may include mining equipment, construction equipment, military vehicles, and the like.

The system may include one or more cameras 1606, which may represent one or more of the cameras shown in FIG. 1. The camera can obtain static (e.g., still) images and/or moving images (e.g., video). Optionally, the camera may be disposed inside the vehicle. The camera may obtain images and/or videos of the route and/or signs disposed alongside the route while the vehicle is moving at relatively fast speeds. For example, the images may be obtained while the vehicle is moving at or near an upper speed limit of the route, such as the track speed of the route when maintenance is not being performed on the route or the upper speed limit of the route has not been reduced.

The system may include a camera controller 1612, which may represent the camera controller shown in FIG. 1. A vehicle controller 1614 can represent the vehicle controller shown in FIG. 1. The camera controller can control operations of the camera, similar to as described above in connection with the camera controller. The system also may include one or more image analysis processors 1616, which can represent one or more of the image analysis processors shown in FIG. 1. An image memory 1618 of the system may represent the image memory shown in FIG. 1. As described, the vehicle controller can include a positioning system that determines locations of the vehicle along the route. Optionally, a positioning system 1622 may be separate from the controller, but operably connected with the controllers (e.g., by one or more wired and/or wireless connections) so that the positioning system can communicate data representative of locations of the vehicle to the controllers. Examples of positioning systems include global positioning systems, cellular triangulation systems, radio frequency identification (RFID) interrogators or readers (e.g., that read roadside transponders to determine locations), computer microprocessors that calculate locations based on elapsed times since a previous location, speeds of the vehicle, and/or layouts of the route, or the like.

The system may include a communication device 1624 that represents transceiving circuitry and associated hardware (e.g., antenna 1626) that can wirelessly communicate information to and/or from the vehicle. In one aspect, the communication device is connected with one or more wires, cables, buses, or the like (e.g., a multiple unit cable, train line, etc.) for communicating information between the vehicle and another vehicle that is mechanically coupled with the vehicle (e.g., directly or by one or more other vehicles).

Figure 17:
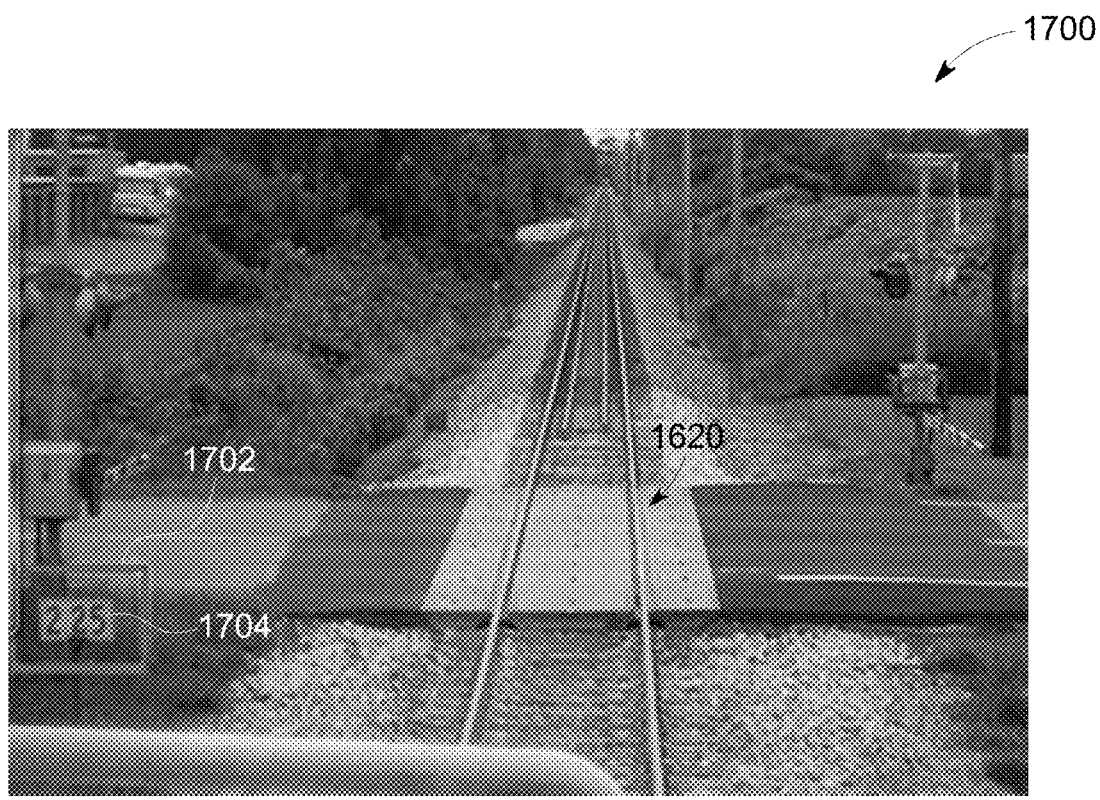
FIG. 17 illustrates image data obtained by the route examination system shown in FIG. 16 according to one example.

With continued reference to the system shown in FIG. 16, FIG. 17 illustrates image data 1700 obtained by the system according to one example. The camera can obtain or generate the image data as the vehicle moves along the route. Alternatively, the image data can be obtained or created while the vehicle is stationary. A portion of interest 1702 of the image data can represent a sign 1704 located alongside or near the route (e.g., within the field of view of the camera, within ten feet or three meters of the route, or another distance). The image analysis processor can examine the image data to identify the portions of interest that include signs as the vehicle moves and/or can identify the portions of interest when the vehicle is stationary.

In one aspect, the image analysis processor can detect the signs based on intensities of pixels in the image data, based on wireframe model data generated based on the image data, or the like. For example, the pixels representative of the sign may be more similar to each other in terms of intensities, color, or the like, than other pixels. The image analysis processor can identify the signs in the image data and store the image data and/or the portion of interest that may include the sign in the image memory. The image analysis processor can examine the portion of interest of the image data to determine what information is represented by the sign. For example, the image analysis processor can use optical character recognition to identify the letters, numbers, symbols, or the like, that are included in the sign. While the sign is shown as a printed sign having static numbers, alternatively, the sign may change which letters, numbers, symbols, or the like, are displayed over time. For example, the sign may be a display that can change the information that is displayed, the sign may have placeholders that allow for the letters, numbers, symbols, or the like, to be changed, etc. Alternatively, the image analysis processor can examine the portion of interest without first storing the image data and/or portion of interest in the memory.

Figure 18:
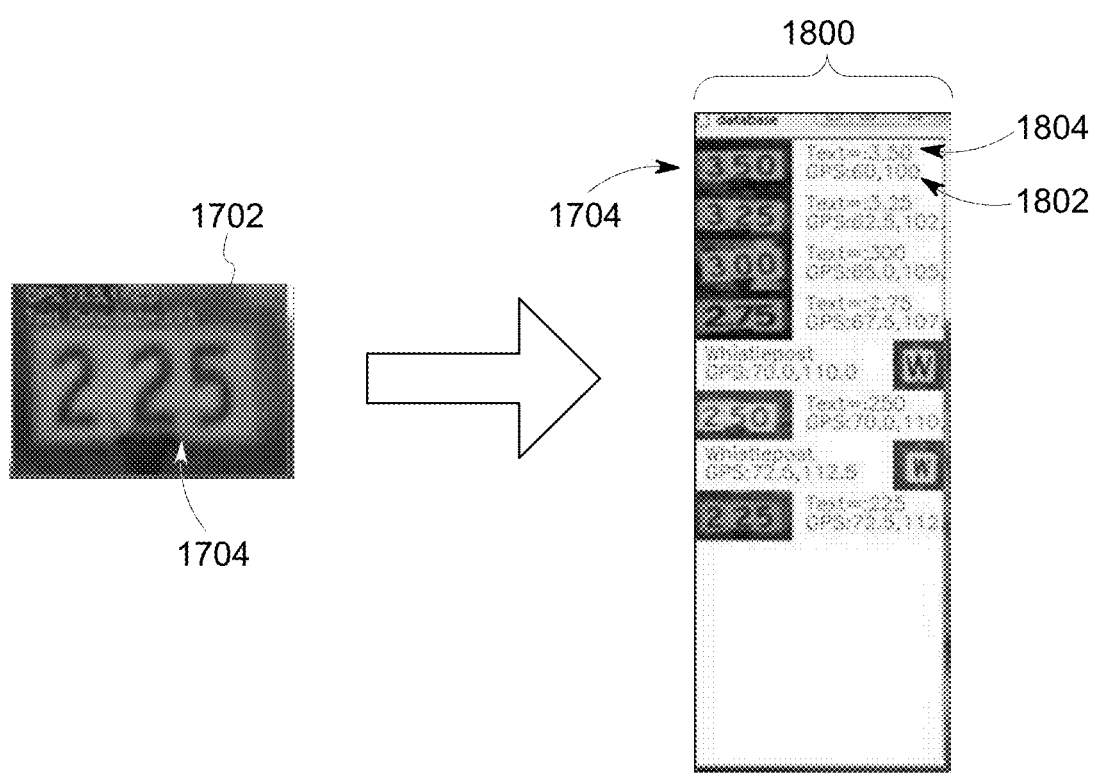
FIG. 18 schematically illustrates examination of a sign shown in image data of FIG. 17 and a memory structure created based at least in part on the examination of the sign according to one embodiment.

FIG. 18 schematically illustrates examination of the sign shown in the image data of FIG. 17 and a memory structure 1800 created based at least in part on the examination of the sign according to one embodiment. The image analysis processor shown in FIG. 16 can use optical character recognition or another technique to identify the information conveyed by the sign. In the illustrated example, the image analysis processor can examine the portion of interest of the image data to determine that the sign may include the numbers "225." The image analysis processor can communicate with the positioning system shown in FIG. 16 to determine the location of the vehicle at the time that the image data showing the sign was obtained.

The image analysis processor can store the information shown on the sign and the location of the vehicle as determined by the positioning system in the memory structure. Optionally, the portion of interest and/or the image data may be stored in the memory structure. The memory structure represents an organized list, table, database, or the like, of different types of information that are associated with each other. For example, the memory structure may store several different locations 1802 of different signs and information 1804 shown on the different signs.

The memory structure may be locally stored in the memory and/or may be remotely stored in a memory device that is off-board the vehicle. The information shown on the signs and the locations of the signs may be updated by systems on several vehicles. For example, communication devices of multiple vehicles can communicate the information shown on signs and the locations of the signs to a memory device on another vehicle (e.g., the image memory) or at another location, such as a dispatch facility or another location. The information and locations of the signs may be updated and/or verified as multiple vehicles travel near the signs.

The information and locations of the signs can be used by the system to determine if a sign is damaged or obscured. If the image analysis processor examines image data and does not identify a sign in the image data where the sign should be located, does not identify the same information written on the sign that should be written on the sign, or the like, then the image analysis processor can determine that the sign is missing, damaged, or otherwise unreadable. For example, the image analysis processor can examine the memory structure and determine that a sign previously was identified at a particular location. The image analysis processor can examine the image data acquired at that same location to determine if the sign is shown in the image data and/or if the information on the sign is the same as the information stored in the memory structure. If the sign is not identified from the image data, then the image analysis processor can determine that the sign has been removed. If the image analysis processor is unable to identify the information printed on the sign, then the image analysis processor can determine that the sign is damaged or at least partially obscured from view (e.g., by condensation, ice, vegetation, or the like). If the information shown on the sign does not match the information stored in the memory structure that is associated with the location of the sign, then the image analysis processor can determine that the sign is damaged, that the sign is at least partially obscured from view, and/or that the information stored in the memory structure and/or shown on the sign is incorrect.

Responsive to identifying one or more of these problems with the sign and/or the memory structure, the image analysis processor can communicate one or more warning signals. These signals can be communicated to another vehicle to request that the system onboard the other vehicle check the image data of the sign, to an off-board facility to request inspection, repair, or maintenance of the sign and/or information recorded in the memory structure, or the like.

In one embodiment, the information stored in the memory structure can be used by the vehicle controller to control operations of the vehicle. For example, some signs may display speed limits for the route, some signs can indicate that operators are working on or near the route, some signs can instruct operators of vehicles to stop, or the like. The information that is read from the signs and stored in the memory structure by the systems can be used to automatically control operations of the vehicles. The vehicle controller can monitor locations of the vehicle based on data communicated from the positioning system. Responsive to the vehicle approaching or reaching the location associated with a sign in the memory structure (e.g., coming within a designated distance of the sign), the vehicle controller can examine the memory structure to determine what information is shown on the sign. If the information represents a speed limit, instructions to stop, or the like, then the vehicle controller can automatically change the speed or stop the vehicle, and/or display instructions to the operator to change the speed or stop the vehicle, in accordance with the instructions displayed on the sign. Optionally, the memory structure can include information that is used as a positive train control system to automatically control movement of the vehicle.

Figure 19:
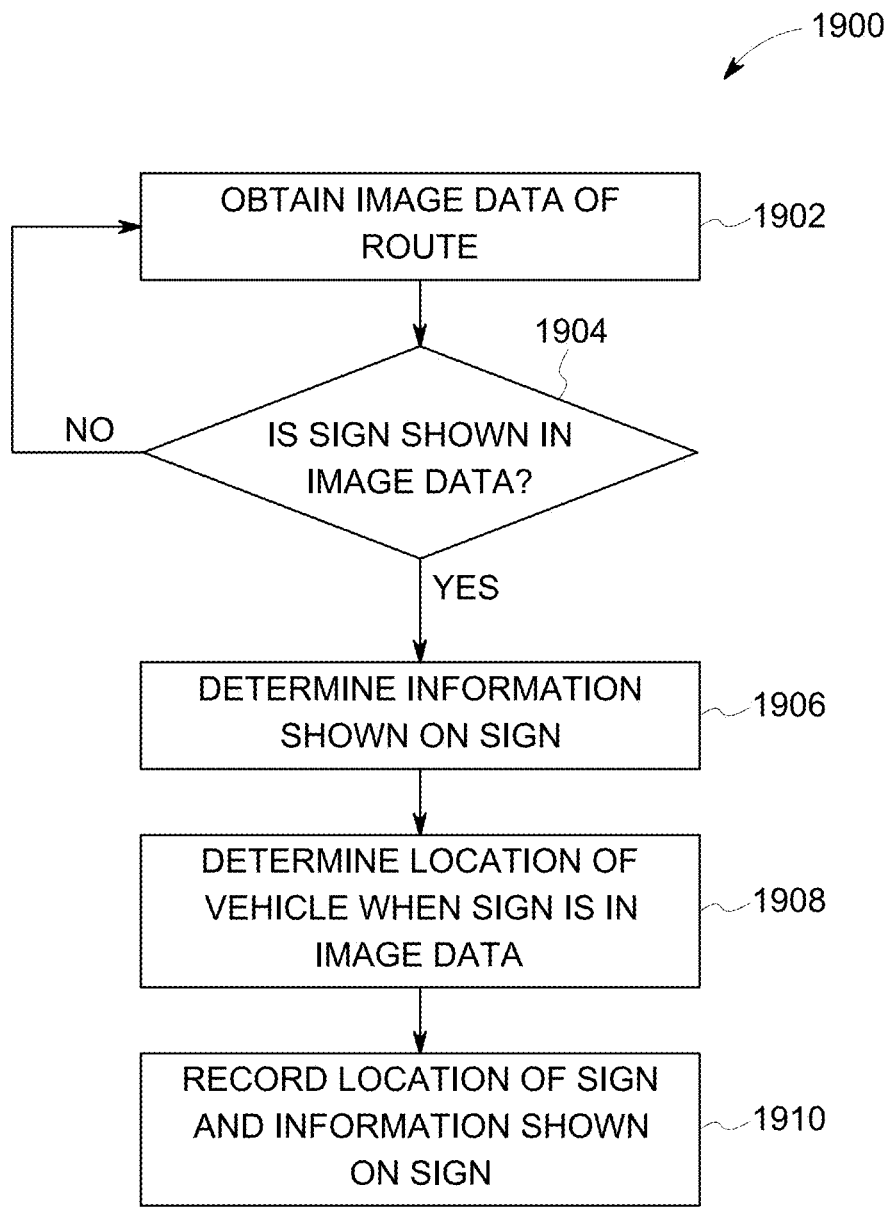
FIG. 19 illustrates a flowchart of a method for identifying information shown on signs from image data according to one embodiment.

FIG. 19 illustrates a flowchart of a method 1900 for identifying information shown on signs from image data according to one embodiment. The method may be performed by one or more embodiments of the route examination systems described herein. At step 1902, image data of a route is obtained during movement of a vehicle along a route. At step 1904, a determination is made as to whether the image data may include a sign. For example, the pixel intensities in the image data can be examined to determine if a sign is present. If a sign is shown in the image data, then flow of the method can proceed to step 1906. If no sign is visible in the image data, then flow of the method can return to step 1902 so that additional image data can be obtained.

At step 1906, the portion of the image data that represents the sign is examined to determine what information is shown on the sign. For example, optical character recognition or another technique (e.g., manual inspection) may be performed on the image data or the portion of the image data that represents the sign to determine what letters, numbers, symbols, or the like, are shown on the sign.

At step 1908, the location of the sign is determined. The location of the sign may be determined by determining the location of the vehicle when the image data showing the sign was obtained. Alternatively, the location of the sign may be manually input by an operator. At step 1910, the location of the sign and the information shown on the sign are recorded, such as in a memory structure. As described above, this memory structure can then be used to later check on the status or state of the sign, to automatically control operations of vehicles, to instruct operators how to control operations of the vehicles, or the like. Flow of the method can return to step 1902 so that additional image data is obtained.

Returning to the description of the route examination system shown in FIG. 16, the system optionally can examine the image data to ensure that notification equipment on the route is functioning as intended or designed. For example, the image analysis processor, can analyze image data that shows crossing equipment. The image analysis processor can examine this data to determine if the crossing equipment is functioning to notify other vehicles at a crossing (e.g., an intersection between the route and another route, such as a road for automobiles) of the passage of the vehicle through the crossing.

Figure 20:
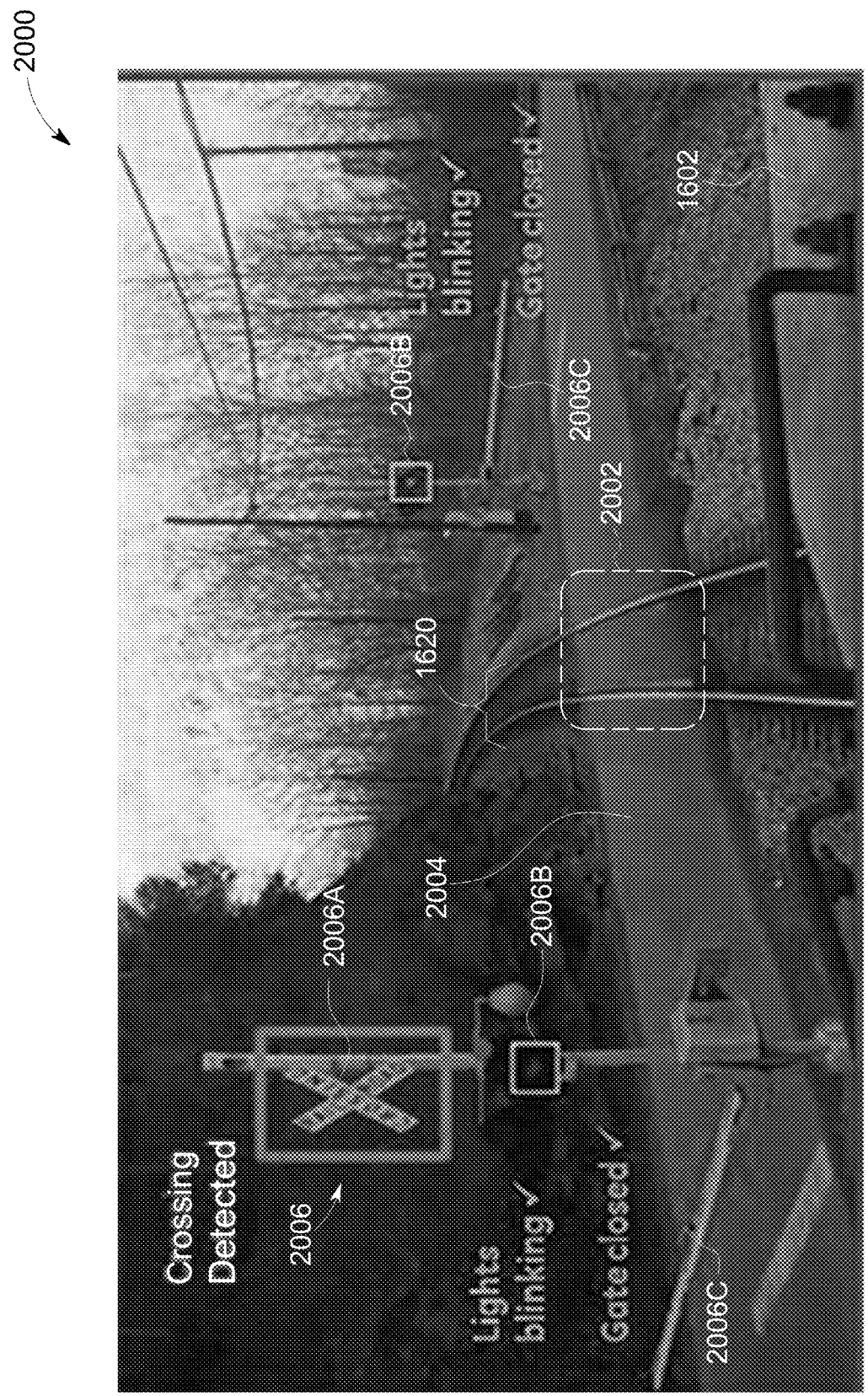
FIG. 20 illustrates image data representative of a crossing according to one example.

FIG. 20 illustrates image data 2000 representative of a crossing 2002 according to one example. The image data may be obtained or generated by the camera (shown in FIG. 16) as the vehicle is moving toward the crossing, which represents an intersection between the one route and another route 2004. An example may be an intersection between two roads for automobiles, or between a rail track and a road. The image analysis processor (shown in FIG. 16) of the route examination system (shown in FIG. 16) onboard the vehicle can determine a time period that image data obtained or generated by the camera may include or shows the crossing based on the location of the vehicle. For example, the image analysis processor can communicate with the positioning system (shown in FIG. 16) and determine when the vehicle is at or approaching the crossing (e.g., within a designated distance from the crossing, such as a quarter mile or 0.4 kilometers, or another distance). The location of the crossing may be programmed into the image analysis processor (e.g., by being hard wired into the hardware circuitry of the processor), stored in the memory (shown in FIG. 16), or otherwise accessible to the processor.

Responsive to determining that the vehicle is at or approaching the crossing 2002, the image analysis processor can examine the image data acquired or generated during the time period that the vehicle is at or approaching the crossing. The processor can examine the image data to determine if notification equipment 2006 (e.g., equipment 2006A-C) is present at or near the crossing (e.g., within a designated distance of the crossing, such as fifty feet or fifteen meters, or another distance), and/or if the notification equipment is operating.

In the illustrated example, the notification equipment 2006A represents a crossing sign. Similar to the sign shown in FIG. 17, the notification equipment can display letters, numbers, symbols, or the like, to warn operators of vehicles of the crossing. The notification equipment 2006B represents electronic signals, such as lights that are activated to generate light responsive to a vehicle traveling on the route toward the crossing and/or coming within a designated distance (e.g., a quarter mile or 0.4 kilometers, or another distance) of the crossing. These lights may be constant lights (e.g., lights that do not blink or repeatedly turn ON and OFF), blinking lights (e.g., lights that repeatedly alternate between turning ON and OFF), or a combination thereof. The notification equipment 2006C represents a crossing barrier, such as a gate, that is activated to move (e.g., lower) to block passage of vehicles on the route across the route through the crossing. The notification equipment 2006C can be activated (e.g., lowered) responsive to a vehicle on the route traveling on the route toward the crossing and/or coming within a designated distance (e.g., a quarter mile or 0.4 kilometers, or another distance) of the crossing.

In order to ensure that the notification equipment is present, not damaged, and/or operating properly, the image analysis processor can examine the image data. The processor can search through the image data to determine if groups of pixels having the same or similar intensities (e.g., within a designated range of each other, such as 1%, 5%, 10%, or the like) are at or near the locations in the image data where a corresponding notification equipment is located. In one aspect, the processor can compare baseline image data, such as object templates similar to as described above in connection with FIGS. 4, 5A, and 5B, to the image data to determine if the notification equipment is present in the image data. Alternatively, another technique may be used. With respect to the notification equipment 2006B, the processor can examine image data acquired or generated at different times to determine if the lights of the notification equipment 2006B are activated and/or blinking.

If the image analysis processor determines that one or more of the notification equipment is missing, damaged, or not operating based at least in part on examination of the image data, then the image analysis processor can generate one or more warning signals. These signals can be communicated to an operator of the vehicle (e.g., such as by being displayed on a display, monitor, or other output device of the vehicle or controller), to an off-board facility to request repair, inspection, and/or further examination of the notification equipment, to other vehicles (e.g., traveling on the route) to warn the other vehicles of the potentially malfunctioning or absent notification equipment, or the like.

Optionally, notification equipment may be located in places other than a crossing. The image analysis processor can examine the image data obtained or generated when the vehicle is positioned such that the field of view of the camera may include the notification equipment. The image analysis processor can examine this image data in a manner similar to as described above in order to determine if the notification equipment is present, damaged, or not functioning properly.

Additionally or alternatively, equipment other than notification equipment can be examined by the image analysis processor. The image analysis processor can examine image data that represents wayside assets, such as notification equipment or other equipment that is disposed alongside the route. The wayside assets can include equipment that is within a designated distance of the route, such as fifty feet or fifteen meters, or another distance.

Figure 21:
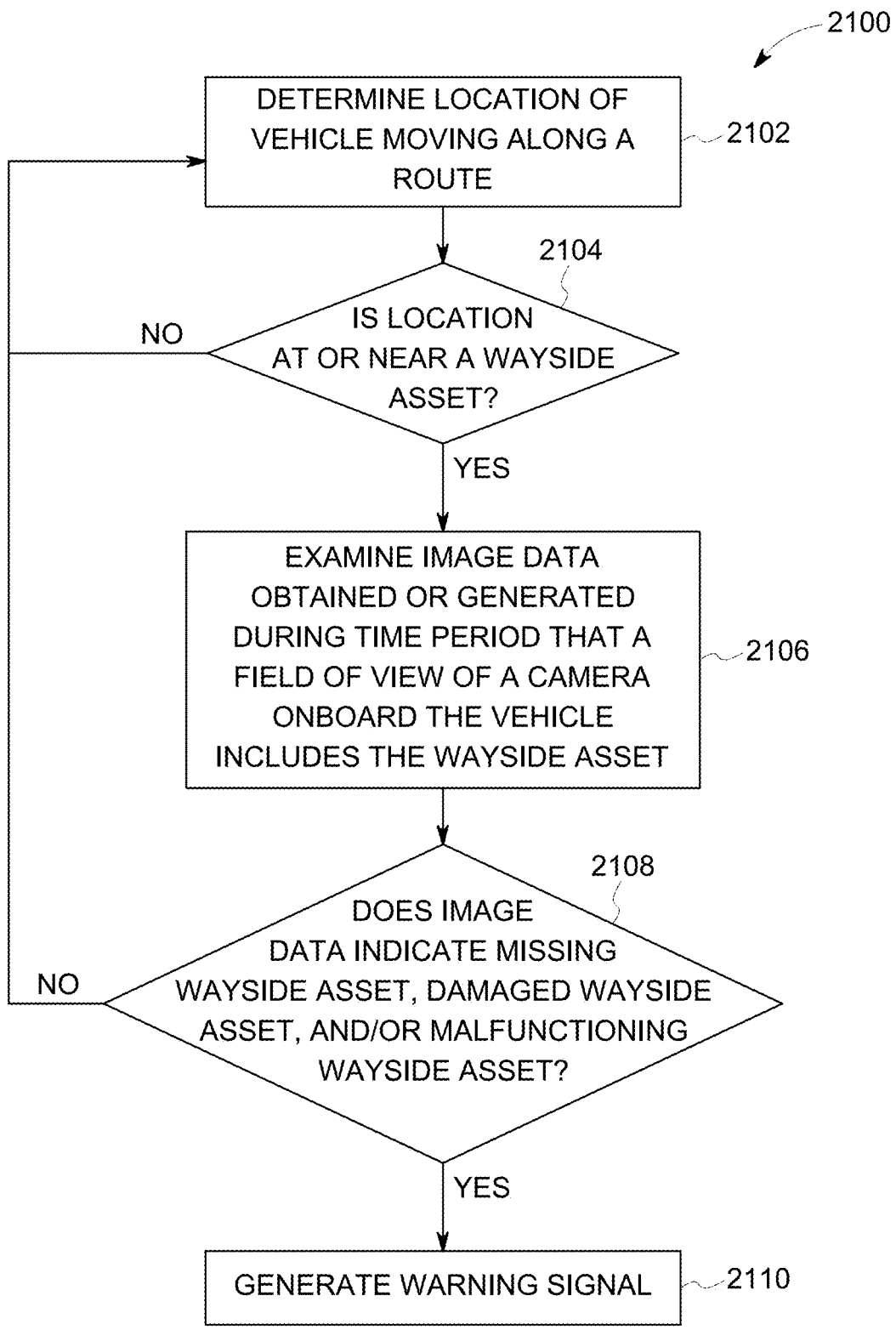
FIG. 21 illustrates a flowchart of a method for examining wayside assets using image data according to one embodiment.

FIG. 21 illustrates a flowchart of a method 2100 for examining wayside assets using image data according to one embodiment. The method may be performed by one or more embodiments of the route examination systems described herein. At step 2102, a location of a vehicle is determined during movement of the vehicle along a route. At step 2104, a determination is made as to whether the location of the vehicle is at or near a wayside asset. For example, the location of the vehicle may be compared to a memory structure (e.g., a list, table, database, or the like) having locations of different wayside assets (e.g., notification equipment, inspection equipment, switches in the route, or the like) stored therein. If the location of the vehicle is within a designated distance of a wayside asset (e.g., fifty feet or fifteen meters, or another distance), then flow of the method can proceed to step 2106. Alternatively, if the vehicle is not at or near a wayside asset, then flow of the method can return to step 2102. For example, additional locations of the vehicle can be identified and examined to determine when the vehicle is close to a wayside asset.

At step 2106, image data acquired or generated by a camera onboard the vehicle is examined. For example, when the vehicle is at or near the wayside asset, the field of view of an onboard camera may include the wayside asset. The image data acquired or generated by the camera during at least part of the time period that the field of view included the wayside asset may be examined. At step 2108, a determination is made as to whether the image data indicates that the wayside asset is damaged, missing, and/or not functioning properly. For example, if the wayside asset does not appear in the image data, then the wayside asset may be missing. If the wayside asset does not appear similar to an object template, a prior image, or the like, then the wayside asset may be damaged and/or malfunctioning. If the image data indicates that the asset is missing, damaged, and/or malfunctioning, then flow of the method can proceed to step 2110. Otherwise, flow of the method can return to step 2102 so that additional image data may be examined at other locations in order to inspect other wayside assets.

At step 2110, one or more warning signals are generated. For example, a signal may be generated and/or communicated to a display, monitor, or the like, to warn an operator onboard the vehicle of the missing, damaged, and/or malfunctioning wayside asset. As another example, a signal may be generated and/or communicated to an off-board facility in order to request inspection, repair, and/or replacement of the wayside asset. Optionally, the signal may be communicated to one or more other vehicles to warn of the damaged, missing, and/or malfunctioning wayside asset.

In one or more embodiments described herein, the image data may be examined by the image analysis processors as the vehicle is moving and/or the image data is output from the cameras. For example, instead of obtaining the image data and storing the image data for an extended period of time (e.g., until the vehicle has moved such that the fields of view of the cameras do not include any portion of the image data), the image analysis processors may examine the image data while the same objects, segments of the route, or the like, are within the field of view of the camera.

In one embodiment, a method (e.g., for examining a route) may include obtaining image data of a field of view of a camera disposed onboard a first vehicle as the first vehicle moves along a first route, and autonomously examining the image data onboard the first vehicle to identify one or more of a feature of interest or a designated object. In one aspect, the feature of interest is a gauge distance between two or more portions of the first route, and autonomously examining the image data may include determining one or more changes in the gauge distance. In one aspect, the method also may include identifying a segment of the first route as being damaged responsive to the one or more changes in the gauge distance indicating one or more of an increasing trend and a decreasing trend subsequent to the increasing trend, and/or the decreasing trend and the increasing trend subsequent to the decreasing trend.

In one aspect, the segment of the first route is identified as being damaged responsive to the increasing trend occurring over at least one or more of a first designated time or a first designated distance and the decreasing trend also occurring over at least one or more of a second designated time or a second designated distance. In one aspect, the segment of the first route is identified as being damaged responsive to the one or more of the first designated time or distance and the one or more of the second designated time or distance being within at least one of an outer designated time limit or an outer designated distance limit. In one aspect, the designated object is a sign, and the method also may include determining a location of the sign, and autonomously examining the image data to determine information displayed on the sign. In one aspect, the method also may include storing the location of the sign and the information displayed on the sign in a memory structure configured to be used by at least one of the first vehicle or one or more second vehicles to automatically control operations of the at least one of the first vehicle or the one or more second vehicles.

In one aspect, the designated object is a wayside asset, and autonomously examining the image data may include determining that the wayside asset is one or more of damaged, missing, or malfunctioning based at least in part on the image data. In one aspect, the designated object is notification equipment located at a crossing between the first route being traveled by the first vehicle and a second route, and autonomously examining the image data may include determining that one or more of a gate of the notification equipment has not moved to block movement of one or more second vehicles through the crossing along the second route, and/or a light signal of the notification equipment is not activated, and/or a sign of the notification equipment is at least one of missing or damaged. In another embodiment, a system (e.g., a route examination system) may include one or more image analysis processors configured to be disposed onboard a first vehicle as the first vehicle moves along a first route. The one or more image analysis processors also can obtain image data of a field of view of a camera disposed onboard the first vehicle and to autonomously examine the image data onboard the first vehicle to identify one or more of a feature of interest or a designated object.

In one aspect, the feature of interest is a gauge distance between two or more portions of the first route, and the one or more image analysis processors can autonomously determine one or more changes in the gauge distance. In one aspect, the one or more image analysis processors can identify a segment of the first route as being damaged responsive to the one or more changes in the gauge distance indicating one or more of an increasing trend and a decreasing trend subsequent to the increasing trend, and/or the decreasing trend and the increasing trend subsequent to the decreasing trend. In one aspect, the one or more image analysis processors can identify the segment of the first route as being damaged responsive to the increasing trend occurring over at least one or more of a first designated time or a first designated distance and the decreasing trend also occurring over at least one or more of a second designated time or a second designated distance.

In one aspect, the one or more image analysis processors can identify the segment of the first route as being damaged responsive to the one or more of the first designated time or distance and the one or more of the second designated time or distance being within at least one of an outer designated time limit or an outer designated distance limit. In one aspect, the designated object is a sign, and the one or more image analysis processors can determine a location of the sign, autonomously examine the image data to determine information displayed on the sign, and store the location of the sign and the information displayed on the sign in a memory structure configured to be used by at least one of the first vehicle or one or more second vehicles to automatically control operations of the at least one of the first vehicle or the one or more second vehicles. In one aspect, the designated object is a wayside asset, and the one or more image analysis processors can autonomously determine that the wayside asset is one or more of damaged, missing, or malfunctioning based at least in part on the image data.

In one aspect, the designated object is notification equipment located at a crossing between the first route being traveled by the first vehicle and a second route, and the one or more image analysis processors can autonomously determine that one or more of: a gate of the notification equipment has not moved to block movement of one or more second vehicles through the crossing along the second route, or a light signal of the notification equipment is not activated, or a sign of the notification equipment is at least one of missing or damaged. In another embodiment, another method (e.g., for examining a route) may include examining image data of a track having plural rails. The image data can be obtained from a camera onboard a vehicle moving along the track. The method also may include determining gauge distances of the track based at least in part on the image data, and identifying a segment of the track as having one or more damaged rails based on trends in the gauge distances of the track. In one aspect, identifying the segment of the track as having one or more damaged rails may include identifying a first trend in the gauge distances and an opposite second trend in the gauge distances subsequent to the first trend. In one aspect, identifying the segment of the track as having one or more damaged rails occurs responsive to determining that the first trend and the second trend each occur over at least one or more of a designated time or distance.

Figure 22:
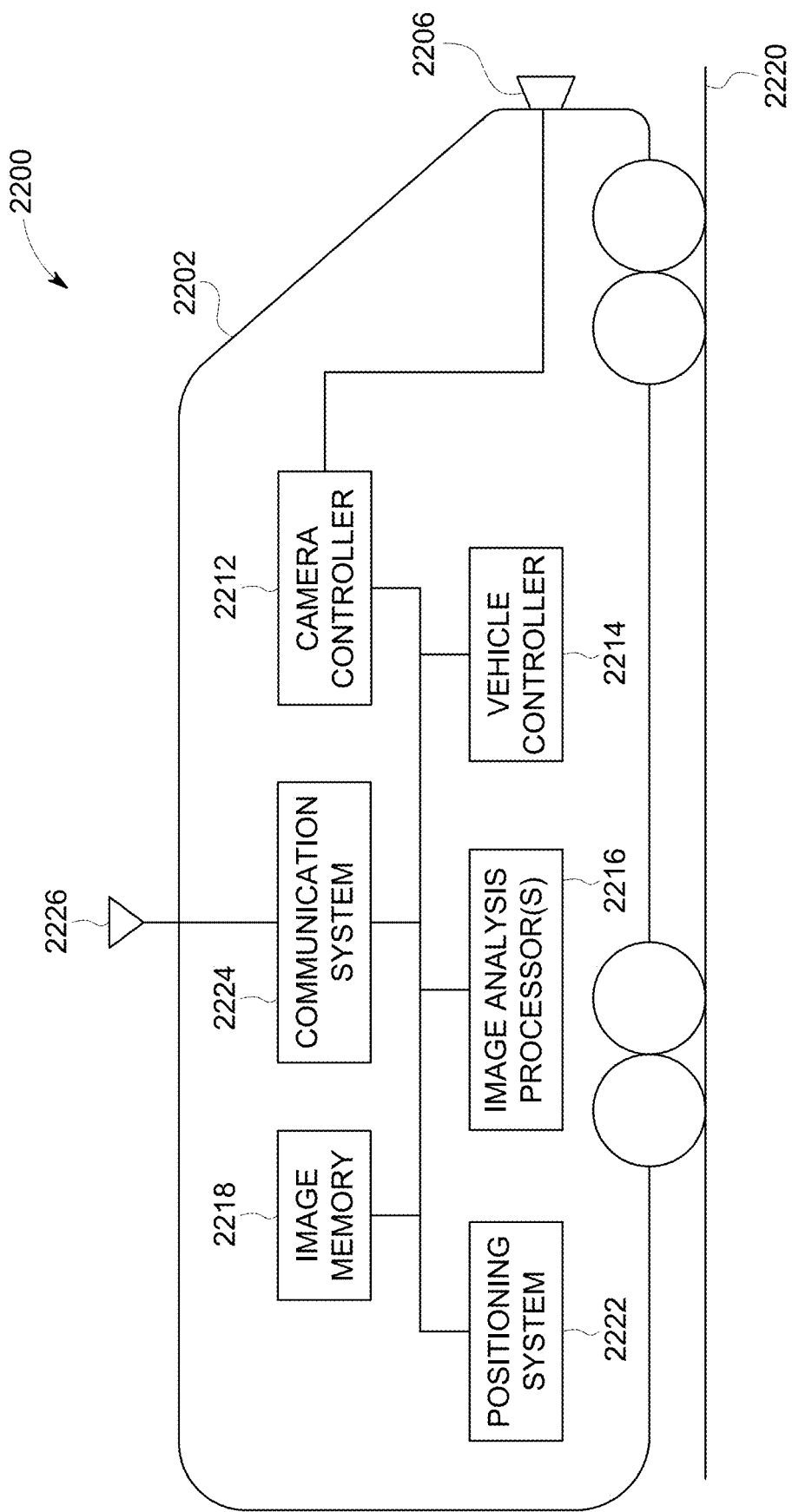
FIG. 22 illustrates a schematic illustration of an optical route examination system in accordance with another embodiment.

FIG. 22 is a schematic illustration of an optical route examination system 2200 in accordance with another embodiment. The system is disposed onboard a vehicle 2202. For example, the vehicle may be an automobile. In other embodiments, the vehicle may be a commercial non-rail vehicle such as a semi-truck towing a truck bed or another vehicle, may be a tractor trailer, may be a multi-passenger vehicle such as a bus or a van, may be farming equipment such as a tractor, a harvester combine, may be a bulldozer, or the like. The vehicle may be the same as or different from the vehicle shown in FIG. 1 or the vehicle shown in FIG. 16. The vehicle can be communicatively connected with one or more other vehicles to form a consist that travels together or cooperatively.

The system includes one or more cameras 2206, which may represent one or more of the cameras shown in FIG. 1. The camera can obtain static (e.g., still) images and/or moving images (e.g., video). Optionally, the camera may be disposed inside the vehicle, at a location off-board the vehicle, or the like. The camera may obtain images and/or videos of the route and/or signs disposed alongside the route while the vehicle is moving at relatively fast speeds. For example, the images may be obtained while the vehicle is moving at or near an upper speed limit of the route.

The system includes a camera controller 2212. The camera controller can control operations of the camera, similar to as described above. The system also includes a vehicle control 2214 that can represent the vehicle controller shown in FIG. 1. The system may include one or more image analysis processors 2216. An image memory 2218 of the system may represent the image memory shown in FIG. 1. As described above, the vehicle controller 2214 can include a positioning system that determines locations of the vehicle along a route 2220. Optionally, a positioning system 2222 may be coupled with the camera and/or vehicle controllers so that the positioning system can communicate data representative of locations of the vehicle to the controllers. Examples of positioning systems include global positioning systems, cellular triangulation systems, radio frequency identification (RFID) interrogators or readers (e.g., that read roadside transponders to determine locations), computer microprocessors that calculate locations based on elapsed times since a previous location, speeds of the vehicle, and/or layouts of the route, or the like.

The system 2200 may include a communication device 2224 that represents transceiving circuitry and associated hardware (e.g., antenna 2226) that can wirelessly communicate information to and/or from the vehicle. In one aspect, the communication device is connected with one or more wires, cables, buses, or the like (e.g., a multiple unit cable, etc.) for communicating information between the vehicle and another vehicle that is mechanically coupled with the vehicle (e.g., directly or by one or more other vehicles).

Figure 23:
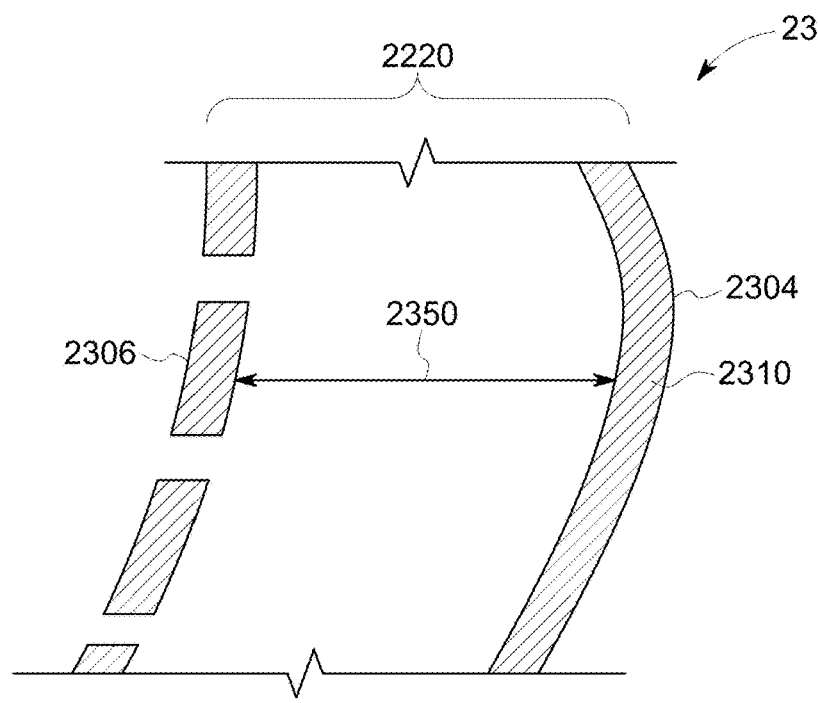
FIG. 23 illustrates an image of a segment of a route in accordance with one embodiment.

FIG. 23 illustrates an image 2300 of a segment of the route (e.g., a route segment image) in accordance with one embodiment. The image may be a digital image formed from several pixels 2310 of varying color and/or intensity. The route may be a road that includes one or more vehicle guides or guide lanes 2304, 2306. For example, the first guide lane 2306 may represent a center lane of the route and the second guide lane 2304 may represent an outer guide lane of the route such that the vehicle travels on the route between the center guide lane and the outer guide lane. Optionally, the route may be a single lane route and the center guide lane may represent a second outer lane of the route. The guide lanes are separated from each other by a gauge distance 2350.

Figure 24:
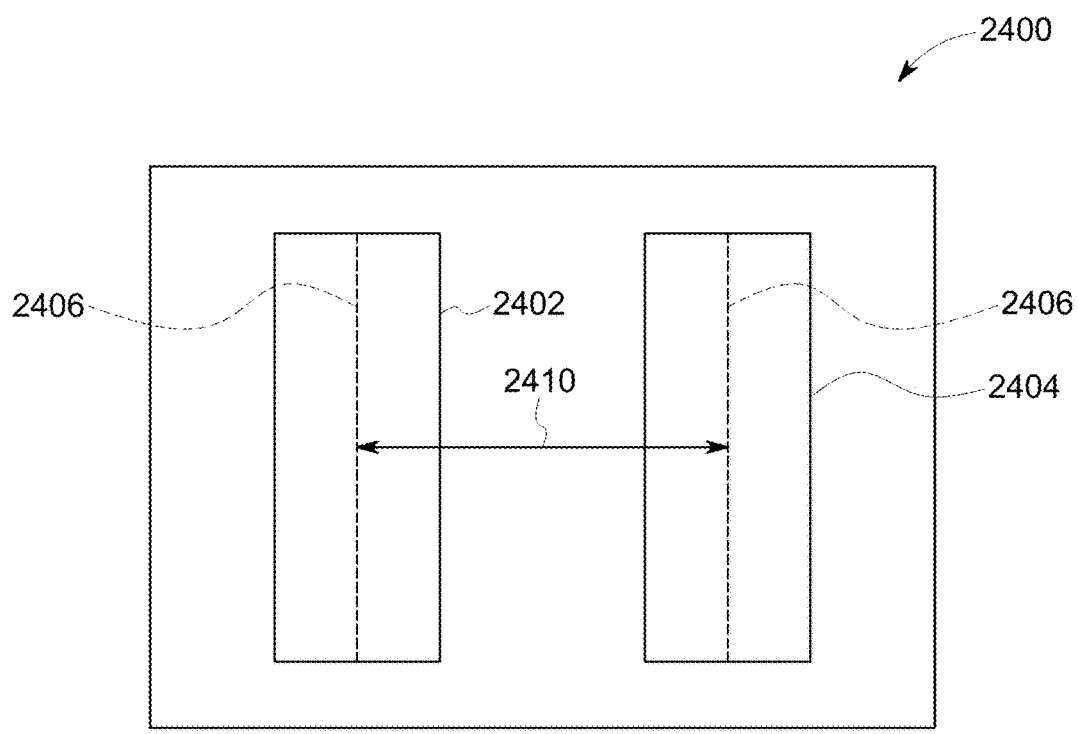
FIG. 24 illustrates a benchmark visual profile of the route of FIG. 23 according to one embodiment.

FIG. 24 illustrates a benchmark visual profile 2400 of the route according to one embodiment. In the illustrated example, the benchmark visual profile includes two designated areas 2402, 2404 that represent designated positions of the guide lanes of the route. The designated areas can represent where the pixels 2310 (shown in FIG. 23) of the image that represent the guide lanes should be located if the guide lanes are aligned properly. For example, the designated areas can represent expected locations of the guide lanes prior to obtaining the image. Optionally, the benchmark visual profile may represent a former image of the route obtained by a camera on the same or a different vehicle at a prior or earlier time. The designated areas can represent the locations of the pixels in the former image that have been identified as representing the route (e.g., the guide lanes).

Each of the designated areas also includes a center axis 2406 that extends substantially centered along a length of each of the designated areas.

Figure 25:
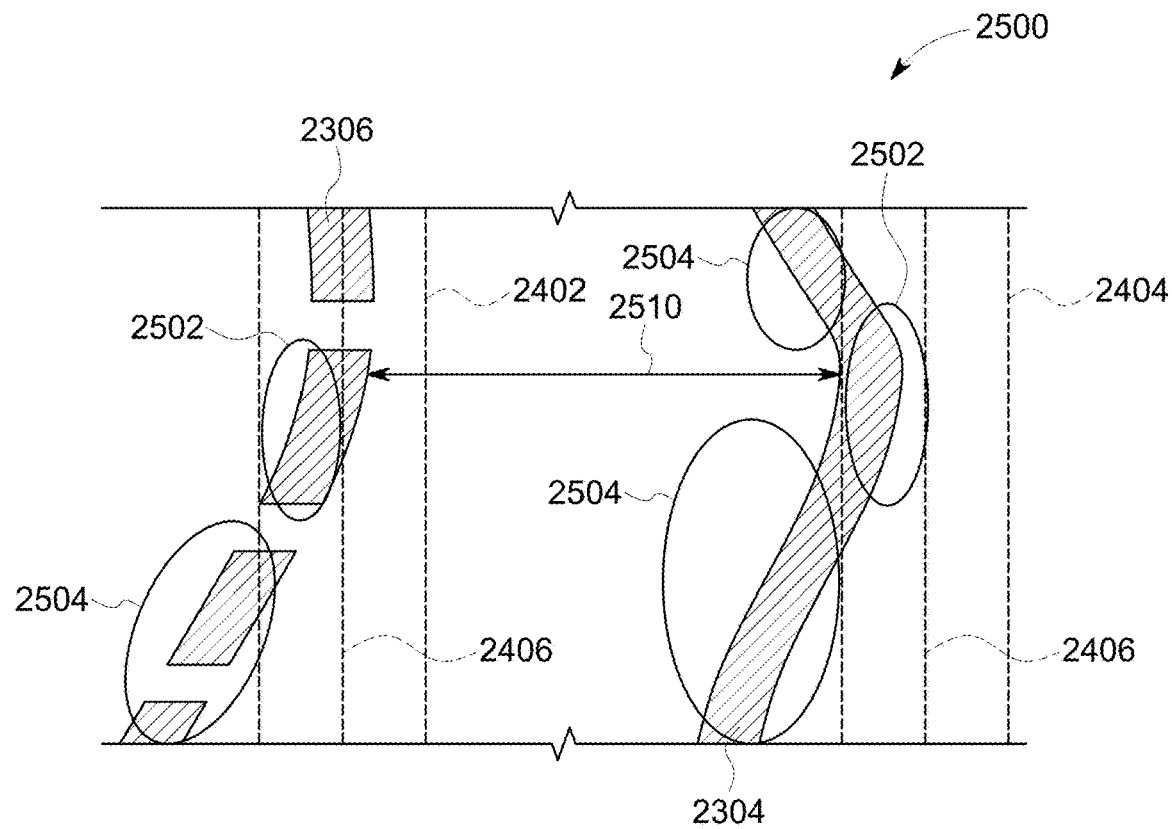
FIG. 25 illustrates a visual mapping diagram of the image shown in FIG. 23 and the benchmark visual profile shown in FIG. 24 according to one example of the inventive subject matter described herein.

FIG. 25 illustrates a visual mapping diagram 2500 of the image 2300 shown in FIG. 23 and the benchmark visual profile 2400 shown in FIG. 24 according to one example of the inventive subject matter described herein. The mapping diagram represents one example of a comparison of the image with the benchmark visual profile that is performed by the image analysis processor. Optionally, the one or more images of the segment of the route may be compared with one or more additional images of the segment of the route obtained by another vehicle at another time to identify degradation of the segment of the route, misalignment of the segment of the route, or the like. The designated areas of the benchmark visual profile can be overlaid onto the image or the image can be overlaid onto the designated areas. The processor identifies differences between the image and the benchmark visual profile. For example, the processor can determine if the pixels representing each guide lane of the route are disposed outside of the designated areas. Optionally, the processor can determine if locations of the pixels representing the route in the image are not located within the designated areas (e.g., are not coordinates located within outer boundaries of the designated areas). Optionally, the processor can also determine if locations of the pixels are not substantially centered about the center axis of each of the designated areas.

If the image analysis process determines that at least a designated amount of the pixels are outside of the designated areas, then the processor can identify the segment of the route that is shown in the image as being misaligned. For example, groups 2504 of the pixels may be identified as being outside of the designated areas. Additionally, the processor may identify groups 2502 of the pixels that may be identified as being inside the designated areas but are not centered about the center axis of each of the designated areas. For example, the groups may be identified as substantially misaligned segments, and the groups may be identified as non-substantially misaligned segments. If the number, fraction, percentage, or other measurement of the pixels that are outside of the designated areas (e.g., groups that are substantially misaligned) or the pixels that are within the designated areas but are off-center of the center axis (e.g., groups that are non-substantially misaligned) exceeds a designated threshold (e.g., 10%, 20%, 30%, or another amount), then the segment of the route shown in the image 2300 is identified as misaligned. On the other hand, if the number, fraction, percentage, or other measurement of the pixels that are outside the designated areas, or that are inside the designated areas but are off-center of the center axis does not exceed the threshold, then the segment of the route is not identified as misaligned.

If a portion of the segment of the route is identified as significantly misaligned, the processors of the vehicle controller may implement a first responsive action. Optionally, if the portion of the segment of the route is identified as non-substantially misaligned, then the processors may implement a second responsive action that may be different than the first responsive action. For example, if a majority or an amount of the segment of the route that is substantially misaligned exceeds a threshold, then the responsive action may be to stop the vehicle. Alternatively, if a majority or an amount of the segment of the route that is non-substantially misaligned exceeds a threshold, then the responsive action may be to reduce the speed of the movement of the vehicle. For example, a segment of the route that is identified as substantially misaligned (e.g., a majority or an amount of the misaligned segment that exceeds the threshold is substantially misaligned and outside of the designated areas) may require a responsive action implemented that has an urgency that may be greater than the urgency of a responsive action if a majority of the misaligned segment of the route is non-substantially misaligned or the amount of the misaligned segment does not exceed the threshold (e.g., inside the designated areas).

In one or more embodiments, the processors of the vehicle controller may respond to the identification of the misaligned segment of the route by implementing a responsive action, by switching operating modes of the vehicle, or the like. The responsive action may include modifying an operating parameter of the vehicle. The responsive action may include shutting down a propulsion system of the vehicle, shutting down an engine of the vehicle, turning or steering the vehicle until the misalignment is no longer identified. Optionally, the responsive action may include reporting the location of the identified misaligned segment, warning an operator of the vehicle that the misaligned segment was identified, notifying other vehicles (e.g., proximate vehicles traveling along the same route) that the misaligned segment was identified, or the like. Optionally, the responsive action may include modifying an operating parameter of the vehicle to adjust steering of the vehicle based on the misalignment of the route. The steering of the vehicle may be adjusted to reduce differences between the image and the benchmark visual profile to zero or about zero (e.g., to align the vehicle within the guide lanes of the segment of the route and within the designated areas of the benchmark visual profile). Optionally, the processors may also stop the response or responsive action based on determining realignment of the route segment images and the benchmark visual profile, based on the differences between the images and the benchmark visual profile reducing to a value less than a determined threshold difference value, or the like.

In one or more embodiments, the image analysis processor may identify a position of one or more wheels of the vehicle relative to the position of the designated areas and/or relative to the position of the guide lanes. For example, the camera disposed at the front of the vehicle in the direction of travel of the vehicle may capture images of the vehicle. The processor may identify if the vehicle is moving along the route closer to one of the guide lanes than the other of the guide lanes. For example, the vehicle may be traveling along the route closer to the center guide lane than the outer guide lane, may be traveling closer to the outer guide lane than the center guide lane, may cross over the center guide lane, may cross over the outer guide lane, or the like.

In one or more embodiments, the image analysis processor may determine a position of the vehicle, or a position of one or more wheels of the vehicle, relative to the guide lanes by measuring a first distance between the vehicle and a first guide lane, and measuring a second distance between the vehicle and a second guide lane. Optionally, the processor may determine the position of a first wheel of the one or more wheels of the vehicle relative to a first guide lane. Optionally, the processor may determine a position of a second wheel of the vehicle relative to at least one of the guide lanes. The first guide lane may be an outer guide lane, and the second guide lane may be a center guide lane. Optionally, the first and second guide lanes may be two outer guide lanes in a route that is devoid a center guide lane.

In one or more embodiments, the benchmark visual profile may include the designated areas corresponding to each of the guide lanes of the route, and a region corresponding to a target position of the vehicle and/or wheel(s). The processor may compare the images with the benchmark visual profile by overlaying the images onto the benchmark visual profile or overlaying the benchmark visual profile onto the images, and determine the position of the vehicle and/or wheel(s) based in part on the overlay. The processor may determine the position of the vehicle and/or the wheel(s) by measuring intensities of pixels in the one or more images. Optionally, the processor may determine the position of the vehicle and/or the wheel(s) of the vehicle by determining a number of pixels of the images corresponding to the vehicle and/or the wheels, and determine if the number of pixels corresponding to the vehicle and/or wheels disposed outside of the benchmark visual profile corresponding to the target position of the vehicle and/or wheels exceeds a threshold value. Optionally, the processor may determine whether the position of the vehicle and/or wheels is to be changed based on the number of pixels in the images disposed outside of the region exceeding the threshold value.

In one or more embodiments, the image analysis processor may identify portions of the images that represent the vehicle by measuring intensities of pixels in the images and distinguishing the portions of the images that represent the vehicle from other portions of the images based on the intensities. For example, the processor may identify a first portion of an image that represents the vehicle based on the intensities of the pixels in the images, and may distinguish the first portion of the image from a different second portion of the image that represent one of the guide lanes.

In one or more embodiments, the processor may determine whether the position of the vehicle is to be changed based on the first and/or second distances measured between the vehicle and the guide lanes. The processor may modify an operating parameter of the vehicle to change the position of the vehicle relative to the guide lanes responsive to determining that the position of the vehicle is to be changed. For example, the processor may adjust steering of the vehicle based on the position of the vehicle relative to the guide lanes.

In one or more embodiments, the processor may obtain the images of the route for a predetermined distance of travel of the vehicle. For example, the images may be over a distance of travel of 5 meters, 25 meters, 50 meters, 150 meters, or the like. The processor may determine whether the position of the vehicle and/or the wheel(s) needs to change based on the position of the vehicle and/or the wheel(s) along the length of the predetermined distance of travel of the vehicle. For example, the processor may determine that a distance between the vehicle and/or the wheel(s) and one of the guide lanes changes by a predetermined threshold, for a predetermined amount or percentage of the distance of travel, or the like. For example, if the distance between the vehicle and a first guide lane is below a predetermined threshold for a predetermined distance of travel of the vehicle, the processor may determine that the position of the vehicle needs to be changed. Alternatively, if the distance between the vehicle and the first guide lane is below a predetermined threshold but for a distance shorter than the predetermined distance of travel of the vehicle, the processor may determine that the position of the vehicle does not need to be changed.

Optionally, a camera may be disposed at a rear end of the vehicle and may capture images as the vehicle moves along the route after the vehicle has traveled along a segment of the route. In alternative embodiments, a camera may be disposed under the vehicle and may capture images of the segment of the route as the vehicle traverses the segment of the route. The optical route examination system 2200 may include two or more cameras disposed at different positions on the vehicle to capture one or more different images of common or different segments of the route as the vehicle moves along the route. These multiple camera inputs may be used so that determinations may be made (e.g., different misaligned segments of the route may be identified) and cross checked against each other. In the event that there is a deviation in the determination between various cameras the controller may respond by alerting an operator, recalibrating the cameras in disagreement, or by assuming a safe operating posture of the vehicle (e.g., slow, slow to a stop or the like). For example, if a first camera captures an image that indicates significant misalignment but a second camera captures an image of the same segment of the route that indicates no misalignment, then the first and second cameras may need to be recalibrated, checked, verified, or the like.

In one or more embodiments, the image analysis processor may compare the image of the segment of the route with additional images (not shown) of the same segment of the route obtained by another vehicle (not shown) at another time, by the same vehicle but at another time, by one or more additional cameras onboard the vehicle, or the like. Optionally, the image may be compared with any alternative stored image data of the image memory or another image data file that may be disposed off-board the vehicle.

In one or more embodiments, the image analysis processor may also measure a gauge 2510 or a gauge distance between the guide lanes by determining a number of the pixels disposed between the two guide lanes of the route in the image 2300. The gauge 2510 may be a distance that is substantially perpendicular to the direction of travel of the vehicle. Optionally, the gauge 2510 may extend between any point of the guide lane 2306 and any other point of the guide lane 2304. If the measured gauge or gauge distance 2510 increases beyond a determined threshold value, then the processors may respond to the identification of the misaligned segment by selecting one of the guide lanes and steering the vehicle to maintain the selected guide lane within its respective designated area. In one or more embodiments, the image analysis processor may also determine an altitude of the vehicle, an altitude of one side of the vehicle relative to the other side of the vehicle, or the like, based in part on the gauge or gauge distance. Optionally, the gauge or gauge distance may be determined by using known altitude of the vehicle.

In one aspect, the image analysis processor 2216 can use a combination of techniques described herein for examining the route. For example, if both guide lanes of a route are bent or misaligned from previous positions, but are still parallel or substantially parallel to each other, then the gauge distance between the guide lanes may remain the same or substantially the same, and/or may not substantially differ from a designated gauge distance 2410 of the route (of FIG. 24). As a result, only looking at the gauge distance in the image data may result in the image analysis processor failing to identify damage (e.g., bending) to the guide lanes. In order to avoid this situation, the image analysis processor additionally can generate the benchmark visual profiles using the image data and compare these profiles to the image data of the route. Bending or other misalignment of the guide lanes may then be identified when the bending in the guide lanes deviates from the benchmark visual profile created from the image data.

Figure 26:
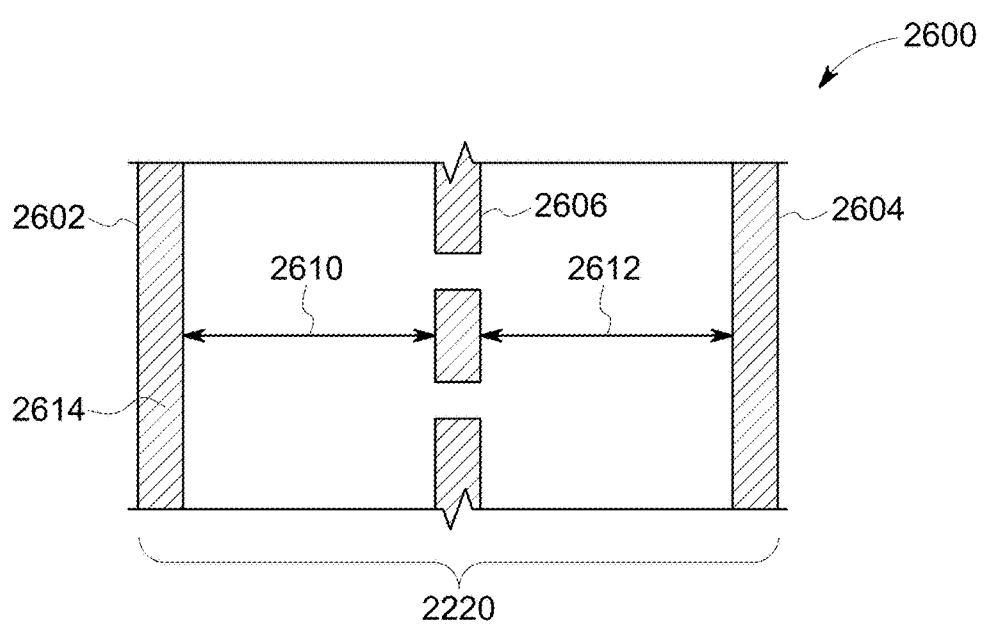
FIG. 26 illustrates an image of a segment of a route in accordance with another embodiment.

FIG. 26 illustrates an image 2600 of a segment of the route in accordance with another embodiment. In the illustrated embodiment, the segment of the route includes three guide lanes 2602, 2604, 2606 of the route. For example, the three guide lanes may represent a left shoulder of the route, a center lane of the route, and a right shoulder of the route, respectively. The vehicle may travel along the route between the left guide lane and the center guide lane, or between the center guide lane and the right guide lane. In one or more embodiments, the vehicle may be large relative to the route, and the vehicle may move along the route between the left guide lane and the right guide lane. The center guide lane is separated from the left guide lane by a distance 2610 and is separated by the right guide lane by a distance 2612 that is substantially equal to the first distance 2610.

Figure 27:
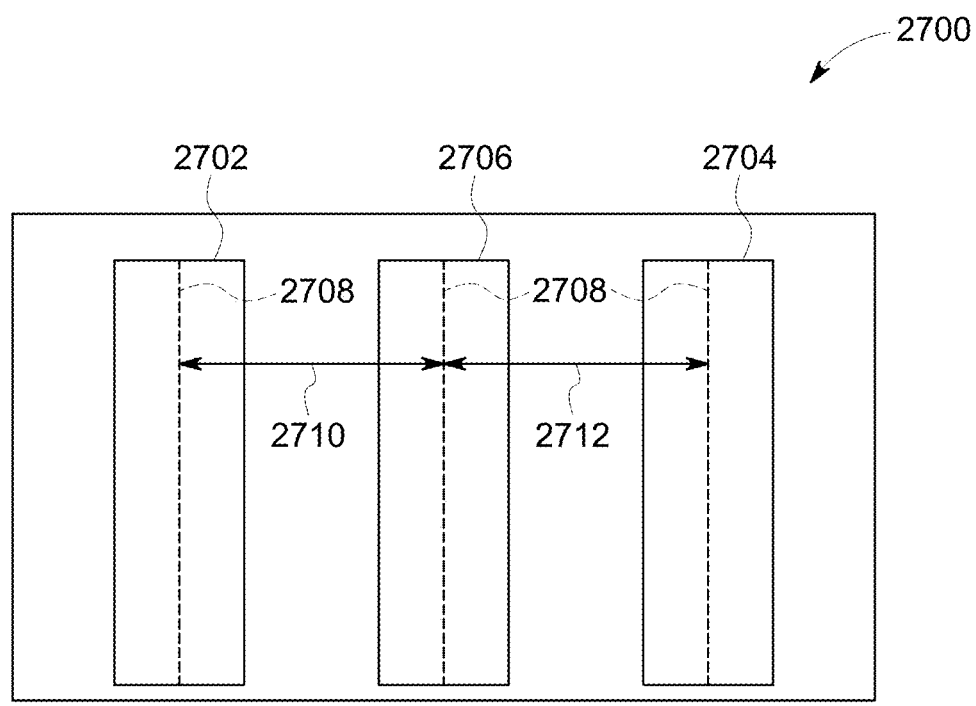
FIG. 27 illustrates a benchmark visual profile of the route of FIG. 26 according to one embodiment.

FIG. 27 illustrates a benchmark visual profile 2700 of the route of FIG. 26 according to one embodiment. The benchmark visual profile includes three designated areas 2702, 2704, 2706, respectively, that represents designated positions of the guide lanes of the route. For example, the designated areas can represent where pixels 2614 (shown in FIG. 26) of the image that represent the guide lanes should be located if the guide lanes are aligned properly. The left designated area represents where the left guide lane should be aligned, the center designated area represents where the center guide lane should be aligned, and the right designated area represents where the right guide lane should be aligned. Each of the designated areas also include a center axis 2708 that represents a substantial center of each of the designated areas. Additionally, the designated area 2702 is separated from the designated area 2706 by a distance 2710, and the designated area 2706 is separated by the designated area 2704 by a distance 2712 that is substantially equal to the distance 2710.

Figure 28:
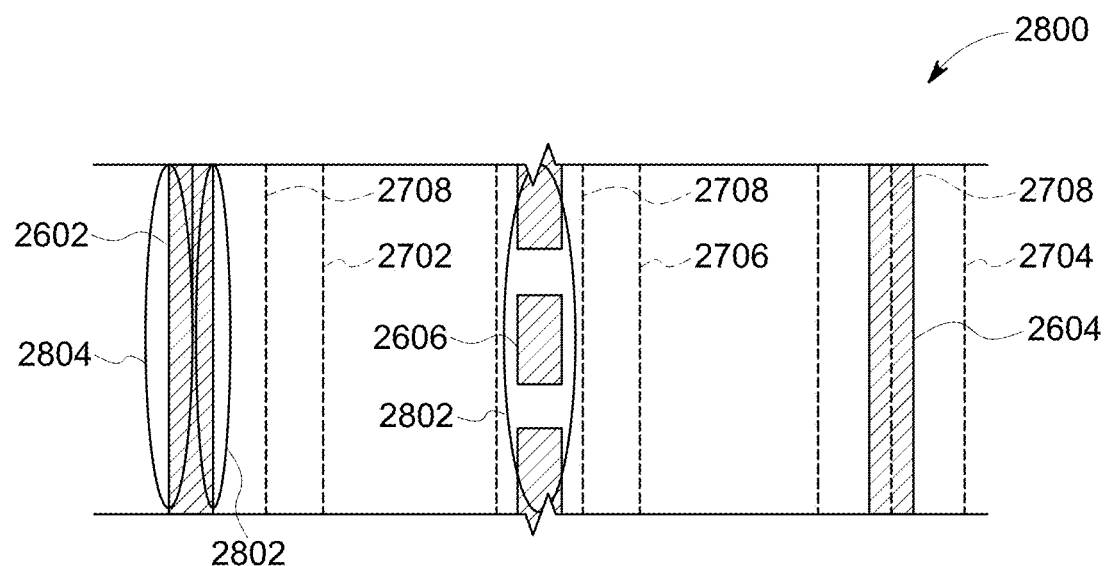
FIG. 28 illustrates a visual mapping diagram of the image shown in FIG. 26 and the benchmark visual profile shown in FIG. 27 according to one example of the inventive subject matter described herein.

FIG. 28 illustrates a visual mapping diagram 2800 of the image 2600 shown in FIG. 26 and the benchmark visual profile 2700 shown in FIG. 27 according to one example of the inventive subject matter described herein. The image of the segment of the route is compared with the designated areas 2702, 2704, 2706 of the benchmark visual profile in part by an overlay of the benchmark visual profile onto the image or an overlay of the image onto the benchmark visual profile. Optionally, the image of the segment of the route and the benchmark visual profile may be compared by alternative methods. The image analysis processor identifies differences between the image and the benchmark visual profile. For example, the processor can determine if any of the pixels 2614 representing each guide lane of the route are disposed outside of the designated areas. Optionally, the processor can determine if locations of the pixels representing the route in the image are not located within the designated areas (e.g., are not coordinates located within outer boundaries of the designated areas). Optionally, the processor can also determine if locations of the pixels are not substantially centered about the center axis of each of the designated areas.

If the image analysis process determines that at least a designated amount of the pixels is outside of the designated areas, then the processor can identify the segment of the route that is shown in the image as being misaligned. For example, group 2804 of the pixels may be identified as being outside of the designated area. Additionally, the processor may identify groups 2802 of the pixels that may be identified as being inside the designated areas, respectively, but are not centered about the center axis of each of the designated areas. For example, the group 2804 may be identified as a substantially misaligned segment, and the groups 2802 may be identified as non-substantially misaligned segments. If the number, fraction, percentage, or other measurement of the pixels that are outside of the designated areas (e.g., group 2804 that is substantially misaligned) or the pixels that are within the designated areas but are off-center of the center axis (e.g., groups 2802 that are non-substantially misaligned) exceeds a designated threshold (e.g., 10%, 20%, 30%, or another amount), then the segment of the route shown in the image is identified as misaligned. On the other hand, if the number, fraction, percentage, or other measurement of the pixels that are outside the designated areas, or that are inside the designated areas but are off-center of each center axis does not exceed the threshold, then the segment of the route is not identified as misaligned.

In one or more embodiments of the subject matter described herein, a method includes obtaining one or more images of a segment of a route from a camera while a vehicle is moving along the route. The segment of the route includes one or more guide lanes. The method also includes comparing, with one or more computer processors, the one or more images of the segment of the route with a benchmark visual profile of the route based at least in part on an overlay of the one or more images onto the benchmark visual profile or an overlay of the benchmark visual profile onto the one or more images. The one or more processors identify a misaligned segment of the route based on one or more differences between the one or more images and the benchmark visual profile and respond to the identification of the misaligned segment of the route by modifying an operating parameter of the vehicle.

Optionally, the benchmark visual profile includes a designated area of the of the segment of the route. Comparing the one or more images of the segment of the route with the benchmark visual profile includes overlaying the one or more images onto the designated area of the benchmark visual profile or overlaying the designated area of the benchmark visual profile onto the one or more images.

Optionally, the method also includes identifying portions of the one or more images that represent the segment of the route by measuring intensities of pixels in the one or more images and distinguishing the portions of the one or more images that represent the one or more guide lanes of the route from other portions of the one or more images based on the intensities of the pixels.

Optionally, modifying the operating parameter of the vehicle includes adjusting steering of the vehicle based at least in part on an aspect of the misaligned segment of the route to reduce the differences between the one or more images and the benchmark visual profile.

Optionally, the segment of the route includes at least two guide lanes. The method also includes measuring a gauge distance between the at least two guide lanes of the segment of the route by determining a number of pixels disposed between the at least two guide lanes of the route in the one or more images.

Optionally, the method also includes responding to the identification of the misaligned segment of the route responsive to the gauge distance increasing beyond a determined threshold value. Responding to the identification of the misaligned segment includes selecting one of the at least two guide lanes and steering the vehicle to maintain a position relative to the selected one of the at least two guide lanes.

Optionally, the method also includes creating a benchmark visual profile from at least one image of the one or more images that are compared to the benchmark visual profile to identify the one or more differences.

Optionally, the method also includes comparing the one or more images of the segment of the route with one or more additional images of the segment of the route obtained by one or more other vehicles at one or more other times in order to identify degradation of the segment of the route.

In one or more embodiments of the subject matter described herein, a system includes a camera configured to be mounted to a vehicle and to obtain one or more images of a segment of a route while the vehicle is moving along the route. The segment of the route includes one or more guide lanes. The system also includes one or more computer processors configured to compare the one or more images of the segment of the route with a benchmark visual profile of the route based at least in part on an overlay of the one or more images onto the benchmark visual profile or an overlay of the benchmark visual profile onto the one or more images of the segment of the route to identify a misaligned segment of the route based on one or more differences between the one or more images and the benchmark visual profile. The one or more computer processors respond to the identification of the misaligned segment of the route by modifying an operating parameter of the vehicle.

Optionally, the benchmark visual profile includes a designated area of the segment of the route. The one or more computer processors compare the one or more images of the segment of the route with the benchmark visual profile by overlaying the one or more images onto the designated area of the benchmark visual profile or overlaying the designated area of the benchmark visual profile onto the one or more images. Optionally, the one or more computer processors can identify portions of the one or more images that represent the segment of the route by measuring intensities of pixels in the one or more images and distinguishing the portions of the one or more images that represent the one or more guide lanes of the route from other portions of the one or more images based on the intensities of the pixels.

Optionally, the system also includes a vehicle controlled coupled to the one or more computer processors that responds to the identification of the misaligned segment of the route by controlling the vehicle to switch operating modes and one or more of shut down a propulsion system of the vehicle, shut down an engine of the vehicle, turn or steer the vehicle until the misalignment is no longer identified, report the location of the misaligned segment identified, warn an operator of the vehicle that the misaligned segment was identified, or notify other vehicles that the misaligned segment was identified.

Optionally, the one or more computer processors also compare the one or more images of the segment of the route with one or more additional images of the segment of the route obtained by one or more other vehicles at one or more other times in order to identify degradation of the segment of the route. Optionally, the one or more computer processors create a benchmark visual profile from at least one image of the one or more images that are compared to the benchmark visual profile to identify the one or more differences.

Optionally, the segment of the route includes at least two guide lanes. The one or more computer processors measure a gauge distance between the at least two guide lanes of the segment of the route by determining a number of pixels disposed between the at least two guide lanes in the one or more images. Optionally, the one or more computer processors determine an altitude of the vehicle based at least in part on the gauge distance.

In one or more embodiments of the subject matter described herein, a method includes obtaining one or more route segment images of a route segment while a vehicle is moving along a route. The route segment includes one or more vehicle guides. The method also includes comparing, with one or more computer processors, the one or more route segment images with a benchmark visual route profile. The benchmark visual route profile includes a designated area of the route segment. The one or more computer processors compare the one or more route segment images with the benchmark visual profile by at least one of overlaying the one or more route segment images onto the designated area of the benchmark visual profile or by overlaying the designated area of the benchmark visual profile onto the one or more route segment images. The one or more computer processors identify a misalignment of the route segment based at least in part on one or more differences between the one or more route segment images and the benchmark visual profile. The method also includes responding to an identification of the misalignment of the route segment by controlling at least one operating parameter of the vehicle.

Optionally, the method also includes stopping a response to the misalignment identification based at least in part on determining a realignment of the one or more route segment images and the benchmark visual route profile or that the one or more differences drop below a determined threshold difference value. Optionally, the method also includes measuring a gauge distance between at least two vehicle guides in the one or more route segment images at least in part by determining a count or number of pixels disposed between the at least two vehicle guides of the route segment.

Optionally, the method also includes at least one of determining an altitude of the vehicle based at least in part on the gauge distance or determining the gauge distance at least in part using a known altitude of the vehicle. Embodiments of the invention may include a distance measuring device, such as Lidar or time-of-flight sensors, to measure a distance from the vehicle to various other features. The device may be mounted to the vehicle, but in some embodiments it may be external to the vehicle and may supply the measurement data wirelessly to the vehicle. These distance measurements, particularly when provided by off-board equipment to the vehicle, may be used to calibrate the cameras and camera controller 2212.

Optionally, in one embodiment of the subject matter described herein, a system is provided that includes one or more processors configured to communicatively link a first operator control unit disposed off-board a vehicle system with a vehicle control system disposed onboard the vehicle system. The vehicle system is formed from at least first and second vehicles. The vehicle control system is configured to remotely control movement of the second vehicle from the first vehicle in the vehicle system, wherein the one or more processors also are configured to receive a control signal communicated from the first operator control unit that is disposed off-board the vehicle system to a communication device that is onboard the first vehicle. The control signal dictates a change in movement operational setting of the second vehicle. The one or more processors are also configured to direct the communication device to communicate the control signal from the first vehicle to the second vehicle via the vehicle control system, wherein movement of the second vehicle is automatically changed responsive to communicating the control signal from the communication device onboard the first vehicle to the second vehicle via the vehicle control system.

Optionally, the vehicle control system is a distributed power system. Optionally, the movement operational setting includes one or more of a speed, throttle, or brake setting. Optionally, the first operator control unit is configured to receive image data. The image data is representative of an area ahead of a direction of travel for the vehicle system, wherein an electronic display of the first operator control unit is configured to visually present the image data.

Optionally, the one or more processors are configured to obtain sensor data from an object detection sensor. The sensor data is indicative of a presence of an object ahead of the vehicle system in a direction of travel of the vehicle system. The vehicle control system is configured to prevent the movement of the vehicle system toward the object based on the sensor data regardless of the control signal sent from the first operator control unit.

Optionally, the vehicle control system is configured to receive a request from one or more of the first operator control unit or a second operator control unit to switch remote control of the movement of the vehicle system to the first operator control unit or the second operator control unit. Responsive to receiving the request, the one or more processors are configured to terminate remote control of the movement of the vehicle system by the first operator control unit, and responsive to terminating the remote control of the vehicle system by the first operator control unit, the one or more processors are configured to automatically change the movement of the second vehicle responsive to receiving an additional control signal that is communicated by the second operator control unit to the communication device onboard the first vehicle and from the communication device to the second vehicle.

Optionally, one or more of the first operator control unit or the second operator control unit is configured to be controlled by an operator off-board the vehicle system.

Optionally, the communication device onboard the first vehicle communicates the control signal to the second vehicle via the vehicle control system for automatic control of the movement of the first vehicle and the movement of the second vehicle. The control signal configured to instruct the first vehicle to move in a first direction and instruct the second vehicle to move in a second direction.

Optionally, in one embodiment of the subject matter described herein, a method is provided that includes communicatively linking a first operator control unit disposed off-board a vehicle system with a vehicle control system disposed onboard the vehicle system. The vehicle system is formed from at least first and second vehicles. The vehicle control system is configured to remotely control movement of the second vehicle from the first vehicle in the vehicle system. The method includes communicating a control signal from the first operator control unit that is off-board the vehicle system to a communication device that is onboard the first vehicle, the control signal dictating a change in a movement operational setting of the second vehicle, and communicating the control signal from the communication device onboard the first vehicle to the second vehicle via the vehicle control system onboard the vehicle system, wherein movement of the second vehicle is automatically changed responsive to communicating the control signal from the communication device onboard the first vehicle to the second vehicle via the vehicle control system.

Optionally, the vehicle control system is a distributed power system. Optionally, the first operator control unit controls movement of the vehicle system. Optionally, the movement operational setting includes one or more of a speed, throttle, or brake setting.

Optionally, the method includes receiving image data at the first operator control unit. The image data is representative of an area ahead of a direction of travel for the vehicle system, and visually presenting the image data on an electronic display of the first operator control unit.

Optionally, the method includes obtaining sensor data from an object detection sensor. The sensor data is indicative of a presence of an object ahead of the vehicle system in a direction of travel of the vehicle system, and preventing the movement of the vehicle system toward the object based on the sensor data regardless of the control signal sent from the first operator control unit.

Optionally, the method includes receiving a request from one or more of the first operator control unit or a second operator control unit to switch remote control of the movement of the vehicle system to the second operator control unit. Responsive to receiving the request, terminating remote control of the movement of the vehicle system by the first operator control unit. Responsive to terminating the remote control of the vehicle system by the first operator control unit, automatically changing the movement of the second vehicle responsive to receiving an additional control signal that is communicated from the second operator control unit to the communication device onboard the first vehicle and from the communication device to the second vehicle.

Optionally, the movement of the first vehicle and the movement of the second vehicle are automatically changed responsive to communicating the control signal from the communication device onboard the first vehicle to the second vehicle via the vehicle control system. The control signal instructing the first vehicle to move in a first direction and instructing the second vehicle to move in a second direction. Optionally, the first vehicle moving in the first direction is disconnected from the second vehicle moving in the second direction.

Optionally, in one embodiment of the subject matter described herein, a system is provided that includes a communication device configured to be onboard a first vehicle of a vehicle system that also includes a second vehicle. The system includes a controller configured to be disposed onboard the first vehicle for controlling movement of the first vehicle. The controller is configured to receive a control signal from an off-board operator control unit via the communication device. The control signal dictates movement of the vehicle system, wherein the communication device is configured to send the control signal from the operator control unit to the second vehicle.

Optionally, the controller is configured to automatically change the movement of the vehicle system responsive to receiving the control signal from the operator control unit.

Optionally, the communication device is configured to send the control signal from the operator control unit to the second vehicle for automatically controlling the movement of the second vehicle.

Optionally, the controller is configured to automatically move the first vehicle in a first direction responsive to receiving the control signal and the communication device is configured to send the control signal to the second vehicle directing the second vehicle to automatically and concurrently move in a second direction.

Optionally, the determining whether the position of the vehicle needs to change may be based on an alertness of an operator of the vehicle. The alertness of the operator, or a change in the operator's alertness, may be determined via an alertness detection system of the vehicle. The alertness of the operator is monitored by an alertness detection system disposed onboard the vehicle system (not shown) as the vehicle system travels along the route. For example, if the detection system determines that the alertness of the operator is below a predetermined threshold, the vehicle control system can be prohibited from following a manual control trip plan, and may automatically modify the operating parameter of the vehicle to change the position of the vehicle relative to one or more guide lanes. Alternatively, if the detection system determines that the alertness of the operator is above a predetermined threshold, the vehicle control system will either automatically modify the operating parameter of the vehicle, or may allow the operator to manually modify the operating parameter of the vehicle to move the vehicle to a position relative to the guide lane(s).

The alertness detection system of the vehicle may have one or more processors that are configured to provide a fully contactless imaging system and a physical and psychophysiological (3P) model for estimating operator parameters and conditions including fatigue and drowsiness in real-time. An imaging system may include a first imaging device that typically is an RGB (Red Blue Green) digital camera, that can be a RGBD (Red, Green, Blue, Depth) camera, and a second imaging device that typically is a thermal camera that both provide data to the one or more processors for creating a physically and psychophysiologically output of the operator in real-time. The one or more processors utilize the data from the RGB camera and thermal camera to passively measure bio-signals emanated, including an operator's face during night or day while the operator is on the job, without asking the operator to indicate vigilance periodically. Thus, alertness detection system is usable during the day or night without additional illuminators depending on imaging device types inside the operator's cabin or surrounding environment, or electrodes affixed to the skin. As a result, this allows for long monitoring functions unobtrusively inside the vehicle.

The first imaging device, while described as an RGB camera, may be of any type, including but not limited to a reflected near infrared (NIR) camera or a shortwave infrared (SWIR) camera. The RGB, NIR and SWIR cameras may be instrumented with suitable illuminators. Similarly, the second imaging device, while described as a thermal camera may of any type, including but not limited to a midwave infrared (MWIR) or a longwave infrared (LWIR) camera which is capable of collecting emitted waves. Other imaging devices of interest suitable for this kind of alerter is ultra-wide band microwave imaging technology. Depth measuring imaging devices such as Kinect, Multi and hyperspectral cameras in the visible and infrared wavelength range are other imaging devices suitable for use in the alerter technology. Any combinations of these imaging devices may be used to extract 3P information about the operator intervention.

Historical data related to physical, physiological or psychophysiological (3P) parameters of the operator in the form of a 3P model is generated through experimentation to be used by the alertness detection system. A 3P model is a relationship between features (or indicators) from non-contact sensor data to cognitive indicators derived from body-worn sensor(s) data responsible for fatigue and alertness. During experiments, an imaging system provides data related to visible physical characteristics (i.e., physical indicators) of the operator. These include, but are not limited to, sagging posture, leaning of head, head nods, gaze direction, expressions, eye-ball motions, pose, gestures, blinking, yawning, and the like.

During experiments, psychophysiological indicators such as pulse rate, respiration rate, heart rate variability, peak-to-peak pulse locations, power in harmonics, knowledge-based/shallow/deep learning features are generated from blood flow data coming from below the skin and can be measured using imaging devices as well as with body-worn devices well-known to the medical community, including: electroencephalographic (EEG), photoplethysmographic (PPG), videoplethysmographic (VPG), electrocardiographic (ECG), ballistocardiographic (BCG), electromyographic (EMG), phonocardiographic (PCG), galvanic skin response (GSR), transcranial Doppler (TCD) sonography, and functional near infrared (fNIR) signals.

During experiments conducted offline in a controlled setting, data from body-worn devices is used not only to validate the measurements from non-contact imaging-based systems, but also are used to extract well-known psychological indicators such as fatigue and drowsiness from EEG signals. Physical characteristics (i.e., physical indicators) are largely associated with the above surface indicators, and can be obtained with imaging devices such as RGB and/thermal imaging device. Combining a subset of both measurements in one device has the potential to provide very accurate results.

While these experiments are occurring the corresponding 3P changes detected by the imaging devices are compared to the psychological parameters that are measured and collected in the form of fatigue and drowsiness. Mathematical modeling is then utilized to construct a 3P model that associates the images and data from images generated by one or more imaging systems (e.g., features) to the corresponding psychological effects experienced by an operator. Health effects of the operator are obtained from measurements such as pulse rate, respiration rate, peak-to-peak pulse locations, and the like. The alertness detection system utilized on the vehicle is then able to detect physical and physchophysiological (3P) changes of an operator using a 3P model based on the images which is developed from human experiments in a controlled laboratory setting. These 3P changes are monitored in real-time without requiring intervention by the operator.

For example, the 3P changes of the operator may be monitored without requiring the operator to actuate a button or switch, provide an answer to a query or test, keep weight on a kill switch, or the like. Because images from the imaging devices contain health parameters, they are also monitored over time. In this manner health parameters as well as psychological parameters, fatigue and drowsiness, are measured unobtrusively and without operator intervention over time or at regular intervals or as and when required while operating the train. In particular, the alertness detection system takes data generated and utilizes an algorithm or look up tables to determine the health parameters of the operator. In this manner, the alertness detection system is a contactless and a passive monitoring system with abilities to record 3P data of the operator inside the cabin at all times without additional illumination depending on the type of imaging device used.

The alertness detection system allows predictive capabilities to be incorporated to provide early warning of impending danger to a vehicle such as a locomotive as a result of operator error. Additional performance hindering behavioral states such as texting, operational compliance functions, and situational awareness external to the cabin is recognized from image analytics and combined with 3P quantities to provide more advanced capabilities. In addition, the alertness detection system can be used to perform postmortem analysis in the event of accidents.

The alertness detection system is unobtrusive and based on physiological cues rather than only behaviors as indicated by physical characteristics, and uses task-relevant knowledge of expected behaviors and workload. The alertness detection system measures psychological data that includes data related to fatigue and drowsiness and other operator based parameters with advanced capabilities. For example, with highly sensitive thermal imagery of the operator's face, one can extract additional information associated with psychophysiology (e.g., emotion, joy, arousal etc.,) by monitoring thermal changes in regions such as nose, cheeks, periorbital/supraorbital regions, forehead, maxillary, neck-carotid, lips/mouth and the like.

Optionally, in one or more embodiments of the subject matter described herein, a system may include one or more processors that may be configured to determine one or more automatic-permissible regions of a trip where automated control of a vehicle system is permitted. The automatic-permissible regions of the trip may be determined based on one or more parameters of a route, a trend of operating parameters of the vehicle system, or a trip plan that designated one or more operational settings of the vehicle system at one or more different locations, different times, or one or more different distances along a route. The processors may control transition of the vehicle system between manual control and automatic control in the automatic-permissible regions by alerting an operating of the vehicle system, automatically switching between the manual control and the automatic control, or modifying one or more conditions on which the transition occurs.

Optionally, the processors may determine the one or more automatic-permissible regions by determining one or more locations where changes in the throttle setting of the vehicle system are smaller than one or more other locations.

Optionally, the parameters of the route may include a speed limit, a grade, a curvature, a cant, notch changes, terrain characteristics, historical alertness data, or transitions in speed limits.

Optionally, the trend of operating parameters may include one or more operational settings, operator alertness, fuel efficiency, weather conditions, terrain, or availability of independent distributed power.

Optionally, the one or more processors may determine a threshold of the one or more parameters of the route, operational parameters, or trip parameters; and may prohibit switching operation between manual control of the vehicle system and automatic control of the vehicle system responsive to the threshold of the one or more parameters of the route, operational parameters, or trip parameters being executed.

Optionally, the processors may determine a threshold of the one or more parameters of the route, operational parameters, or trip parameters; and may switch operation between automatic control of the vehicle system and manual control of the vehicle system responsive to the threshold of one or more of the parameters of the route, operational parameters, or trip parameters being executed.

Optionally, the processors may determine one or more automatic-permissible regions based on an alertness of the operator of the vehicle system.

Optionally, the processors may determine the one or more permissible regions by determining one or more terrain characteristics at one or more different locations, different times, or different distances along one or more routes, and identify one or more locations where changes in one or more terrain characteristics of the route traveled by the vehicle system are reduced relative to one or more other locations.

Optionally, in one or more embodiments, a method may include determining a trip plan including an automatic control trip plan and an expected manual control trip plan based on one or more parameters; determining a region of a trip based on the one or more parameters; and switching control of a vehicle system from automatic control to manual control based on one or more parameters or the region of the trip that are determined.

Optionally, the region of the trip may be determined by determining a difference between fuel consumed by manual control and fuel consumed by automatic control of the vehicle system.

Optionally, the region may be determined by identifying one or more locations where changes in the throttle setting of the vehicle system are smaller than one or more other locations.

Optionally, the method may include monitoring an alertness of an operator of the vehicle system using one or more processors. Control of the vehicle system may be switched based on the alertness of the operator that is monitored.

Optionally, in one or more embodiments, a vehicle control system may include one or more processors that may determine an operating parameter of a vehicle system, and identify one or more permissible regions for either automatic control or manual control of the vehicle system based on the operating parameter. The processors may automatically switch control of the vehicle system between automatic control and manual control based on the operating parameter. The operating parameter may be one or more of a speed limit, a route grade, a route curvature, a cant in the route, a throttle change, an alertness of the operator, fuel efficiency, a weather condition, or an availability of independent distributed power in the vehicle system.

Optionally, the processors may switch control of the vehicle system between automatic control and manual control based on a parameter of the route.

Optionally, the processors may determine an expected plan for manual control of the vehicle system to travel at an upper speed limit of one or more routes. The one or more processors may also determine a consumption plan for automated control of the vehicle system to cause the vehicle system to consume less fuel than the expected plan.

Optionally, the processors may switch between automatic control and manual control of the vehicle system based on a comparison of the expected plan and the consumption plan.

Optionally, the processors may identify a speed difference between traveling according to the expected plan and traveling according to the consumption plan. The processors may switch between automatic control and manual control of the vehicle system based on the speed difference.

Optionally, the processors may identify a fuel consumption difference between traveling according to the expected plan and traveling according to the consumption plan. The processors may switch between automatic control and manual control of the vehicle system based on the fuel consumption difference.

Optionally, embodiments described herein may relate to video units for capturing and communicating video data in a transportation system or network. For example, a camera may be deployed onboard a rail vehicle or other vehicle, and then carried by an operator of the vehicle (e.g., when performing work on the vehicle, inspecting the vehicle or the environs of the vehicle, or the like) to capture video data of the vehicle or its environs, for storage for later use, or for displaying or other use on board the vehicle. Optionally, the camera may be coupleable to a powered camera supporting object, such that the camera may be mobile. That is, the camera and its supporting object may capable of moving independent or separate from movement of the operator or its base vehicle. For example, the camera may be connected or otherwise disposed onboard an aerial device (e.g., a drone, helicopter, or airplane) to allow the camera unit to fly, the camera unit may be connected with or otherwise disposed onboard another ground or aquatic mobile system (e.g., a robot or remote control vehicle) to allow the robot and camera to move relative to the vehicle, or the like. In one embodiment, the camera supporting object is a first ground vehicle capable of at least one of remote control or autonomous movement relative to a second ground vehicle along a route for the second vehicle. The first ground vehicle is intended to travel along the route ahead of the second vehicle and to transmit the image data back to the second ground vehicle. This may provide an operator of the second vehicle a view of the route well in advance of the arrival of the second vehicle. For very high speed second vehicles, the stopping distance may be beyond the visibility provided from the vantage of the second vehicle. The view from the first vehicle, then, may extend or supplement that visible range. In addition, the camera itself may be repositionable and may have the ability to pan left, right, up and down, as well as the ability to zoom in and out.

As used herein, a camera is a device for capturing and/or recording visual images. These images may be in the form of still shots, analog video signals, or digital video signals. The signals, particularly the digital video signals, may be subject to compression/decompression algorithms, such as MPEG or HEVC, for example. A suitable camera may capture and record in a determined band of wavelengths of light or energy. For example, in one embodiment the camera may sense wavelengths in the visible spectrum and in another the camera may sense wavelengths in the infrared spectrum. Multiple sensors may be combined in a single camera and may be used selectively based on the application. Further, stereoscopic and 3D cameras are contemplated for at least some embodiments described herein. These cameras may assist in determining distance, velocity, and vectors to predict (and thereby avoid) collision and damage. The term consist, or vehicle consist, refers to two or more vehicles or items of mobile equipment that are mechanically or logically coupled to each other. By logically coupled, the plural items of mobile equipment are controlled so that controls to move one of the items causes a corresponding movement in the other items in consist, such as by wireless command. An Ethernet over multiple unit (eMU) system may include, for example, a communication system for use transmitting data from one vehicle to another in consist (e.g., an Ethernet network over which data is communicated between two or more vehicles).

The camera may be a digital video camera, such as a camera having a lens, an electronic sensor for converting light that passes through the lens into electronic signals, and a controller for converting the electronic signals output by the electronic sensor into the image data, which may be formatted according to a standard such as MP4. The data storage device, if present, may be a hard disc drive, flash memory (electronic non-volatile non-transitory computer storage medium), or the like. The communication device, if present, may be a wireless local area network (LAN) transmitter (e.g., Wi-Fi transmitter), a radio frequency (RF) transmitter that transmits in and according to one or more commercial cell frequencies/protocols (e.g., 3G or 4G), and/or an RF transmitter that is configured to wirelessly communicate at frequencies used for vehicle communications (e.g., at a frequency compatible with a wireless receiver of a distributed power system of a rail vehicle; distributed power refers to coordinated traction control, such as throttle and braking, of a train or other rail vehicle consist having plural locomotives or other powered rail vehicle units). A suitable energy storage device may be a rechargeable lithium-ion battery, a rechargeable Ni-Mh battery, an alkaline cell, or other device configured for portable energy storage for use in an electronic device. Another suitable energy storage device, albeit more of an energy provider than storage, include a vibration harvester and a solar panel, where energy is generated and then provided to the camera system.

In one embodiment, the vehicle system may include an aerial device configured for at least one of remote control or autonomous flying over a ground route of the vehicle. The aerial device may have one or more camera docks for receiving one or more portable camera units, and may have also a vehicle dock for coupling the aerial device to the vehicle. When the aerial device is in the air, the portable camera units can be positioned for the cameras to view the route, the vehicle, or other areas near the vehicle. The aerial device may be, for example, a scale dirigible, a scale helicopter, or the like (e.g., the aerial device may be smaller than needed for transporting humans, such as $\frac{1}{10}$ scale or smaller). A suitable scale helicopter can include quadcopters and the like.

The one or more processors of the vehicle controller may determine a position of the vehicle relative to one or more guide lanes based on image data obtained by a camera disposed onboard the aerial device. Optionally, the controller may determine a position of the aerial device moving over the route of the vehicle relative to the one or more guide lanes of the route, or one or more guide lanes of a flight path of the aerial device. For example, the guide lanes of the aerial device may be indicated on an onboard output device, or indicated as target areas or lines that the aerial device is to remain between. The controller may determine whether the position of the aerial device needs to change based on a distance between one guide lane and the aerial device, and may modify an operating parameter of the aerial device to change the position of the aerial device relative to the guide lane.

The system also can include an aerial device vehicle dock to attach the aerial device to the vehicle. The aerial device vehicle dock can receive the aerial device for at least one of detachable coupling of the aerial device to the vehicle, charging of a battery of the aerial device from a power source of the vehicle, or the like. The dock can include one or more connectors that mechanically or magnetically coupled with the aerial device to prevent the aerial device from moving relative to the dock, that conductively couple an onboard power source (e.g., battery) of the aerial device with a power source of the vehicle (e.g., generator, alternator, battery, pantograph, or the like) so that the power source of the aerial device can be charged by the power source of the vehicle during movement of the vehicle.

The aerial device can fly off of the vehicle to obtain image data that is communicated from one or more of the cameras onboard the aerial device to one or more receivers onboard the vehicle. The aerial device can fly relative to the vehicle while the vehicle is stationary and/or while the vehicle is moving along a route. The image data may be displayed to an operator on a display device onboard the vehicle and/or may be autonomously examined as described herein. The image data can be examined by the operator and/or an image analysis system of the vehicle, such as to examine the vehicle, to examine other vehicles traveling relative to the vehicle (e.g., to avoid collisions between the vehicles), to examine the route being traveled upon (e.g., to perform route inspection), to warn of upcoming obstructions or other problems along the route ahead of the vehicle, to determine a position of the vehicle within guide lanes of the route, and the like. When the aerial device is coupled into the vehicle dock, one or more cameras can be positioned to view the route during movement of the vehicle.

The image analysis system optionally may examine the image data obtained by the camera unit to identify features of interest and/or designated objects in the image data. By way of example, the features of interest can include gauge distances between two or more portions of the route. With respect to rail vehicles, the features of interest that are identified from the image data can include gauge distances between rails of the route. The designated objects can include wayside assets, such as safety equipment, signs, signals, switches, inspection equipment, or the like. The image data can be inspected automatically by the route examination systems to determine changes in the features of interest, designated objects that are missing, designated objects that are damaged or malfunctioning, and/or to determine locations of the designated objects. This automatic inspection may be performed without operator intervention. Alternatively, the automatic inspection may be performed with the aid and/or at the request of an operator.

The image analysis system can use analysis of the image data to detect damage to the route. For example, misalignment of track traveled by rail vehicles can be identified. Based on the detected misalignment, an operator of the vehicle can be alerted so that the operator can implement one or more responsive actions, such as by slowing down and/or stopping the vehicle. When the damaged section of the route is identified, one or more other responsive actions may be initiated. For example, a warning signal may be communicated (e.g., transmitted or broadcast) to one or more other vehicles to warn the other vehicles of the damage, a warning signal may be communicated to one or more wayside devices disposed at or near the route so that the wayside devices can communicate the warning signals to one or more other vehicles, a warning signal can be communicated to an off-board facility that can arrange for the repair and/or further examination of the damaged segment of the route, or the like.

In another embodiment, the image analysis system can examine the image data to identify text, signs, or the like, along the route. For example, information printed or displayed on signs, display devices, vehicles, or the like, indicating speed limits, locations, warnings, upcoming obstacles, identities of vehicles, or the like, may be autonomously read by the image analysis system. The image analysis system can identify information by the detection and reading of information on signs. In one aspect, the image analysis processor can detect information (e.g., text, images, or the like) based on intensities of pixels in the image data, based on wireframe model data generated based on the image data, or the like. The image analysis processor can identify the information and store the information in the memory device. The image analysis processor can examine the information, such as by using optical character recognition to identify the letters, numbers, symbols, or the like, that are included in the image data. This information may be used to autonomously and/or remotely control the vehicle, such as by communicating a warning signal to the control unit of a vehicle, which can slow the vehicle in response to reading a sign that indicates a speed limit that is slower than a current actual speed of the vehicle. As another example, this information may be used to identify the vehicle and/or cargo carried by the vehicle by reading the information printed or displayed on the vehicle.

In another example, the image analysis system can examine the image data to ensure that safety equipment on the route is functioning as intended or designed. For example, the image analysis processor, can analyze image data that shows crossing equipment. The image analysis processor can examine this data to determine if the crossing equipment is functioning to notify other vehicles at a crossing (e.g., an intersection between the route and another route, such as a road for automobiles) of the passage of the vehicle through the crossing.

In another example, the image analysis system can examine the image data to predict when repair or maintenance of one or more objects shown in the image data is needed. For example, a history of the image data can be inspected to determine if the object exhibits a pattern of degradation over time. Based on this pattern, a services team (e.g., a group of one or more personnel and/or equipment) can identify which portions of the object are trending toward a bad condition or already are in bad condition, and then may proactively perform repair and/or maintenance on those portions of the object. The image data from multiple different camera units acquired at different times of the same objects can be examined to determine changes in the condition of the object. The image data obtained at different times of the same object can be examined in order to filter out external factors or conditions, such as the impact of precipitation (e.g., rain, snow, ice, or the like) on the appearance of the object, from examination of the object. This can be performed by converting the image data into wireframe model data, for example.

In one embodiment, a system (e.g., a camera system) includes a camera, at least one of a data storage device and/or a communication device, a camera supporting object, a locator device, and a control unit. The camera can be configured to capture at least image data. The data storage device can be electrically coupled to the camera and configured to store the image data. The communication device can be electrically coupled to the camera and configured to communicate the image data to a system receiver. The camera supporting object can be coupled to the camera. The locator device can be configured to detect a location of the camera supporting object. The control unit can be configured to communicate with the system receiver and the locator device, and to control the camera based at least in part on the location of the camera supporting object.

In one aspect, the camera supporting object can be coupled to a garment configured to be worn by a worker, and the control unit can be configured to control the camera to a first mode of operation responsive to the location of the worker indicating that the worker is at an operator terminal and to control the camera to a different, second mode of operation responsive to the location of the worker indicating that the worker is not at the operator terminal.

In one aspect, in the first mode of operation, the camera can be disabled from performing at least one of capturing, storing, or communicating the image data, and, in the second mode of operation the camera can be enabled to perform at least one of capturing, storing, or communicating the image data.

In one aspect, the operator terminal can be located in an operator cab of a vehicle.

In one aspect, the system also includes a vehicle control unit configured to control a vehicle based at least in part on the image data, and to prevent movement of the vehicle responsive to a first data content of the image data indicating that the worker wearing the garment is located outside the operator cab of the vehicle and to allow movement of the vehicle responsive to a second data content of the image data indicating that the worker wearing the garment is located inside the operator cab.

In one aspect, the vehicle can be one of a plurality of vehicles that are logically or mechanically coupled to form a consist having plural interconnected vehicle units, with at least one of the plural vehicle units being a powered vehicle unit. The vehicle control unit can be configured to prevent movement of the vehicle consist responsive to a first data content of the image data indicating that the camera is positioned between adjacent vehicle units of the vehicle consist and to allow movement of the vehicle consist responsive to a second data content of the image data indicating that the camera is not positioned between adjacent vehicle units of the vehicle consist.

In one aspect, the vehicle control unit can include an image data analysis system configured to process the image data and thereby to identify the first data content and the second data content. The vehicle control unit can be configured to prevent and allow movement of the vehicle responsive to the first data and the second data, respectively, that is identified by the image data analysis system.

In one aspect, the system also can include a transportation system receiver disposed onboard a vehicle, wherein the transportation system receiver is configured to communicate network data other than the image data to at least one of onboard or off-board the vehicle and to switch to a mode for receiving the image data from the camera responsive to the camera being active to communicate the image data.

In one aspect, the transportation system receiver can be configured to wirelessly transmit the network data off-board of the vehicle.

In one aspect, the transportation system receiver can be configured to transmit one or both of the network data and the image data onboard of the vehicle through an Ethernet network that is configured for the communication of data between the vehicle and one or more other vehicles.

In one aspect, the camera supporting object can include a retractable mast.

In one aspect, the camera supporting object can include an aerial device configured for at least one of remote control or autonomous flying relative to a ground vehicle route for a vehicle.

In one aspect, the aerial device can include a vehicle dock for coupling the aerial device to the vehicle. When the aerial device is in the vehicle dock, the camera can be positioned to view the vehicle route.

In one aspect, the aerial device can include a vehicle dock for coupling the aerial device to the vehicle. The vehicle dock can be configured to charge a battery of the aerial device from a power source of the vehicle when the aerial device is docked in the vehicle dock.

In one aspect, the camera supporting object can include a first ground vehicle configured for at least one of remote control or autonomous movement relative to a second ground vehicle along a route for the second vehicle. The first ground vehicle can be intended to travel along the route ahead of the second vehicle and to transmit the image data back to the second ground vehicle.

In another embodiment, a method (e.g., for obtaining and/or communicating image data) includes obtaining image data from a camera configured to capture image data (where the camera can be supported by a camera supporting object), determining a location of the camera supporting object, and controlling the camera based at least in part on the location of the camera supporting object that is detected by the locator device.

In one aspect, the camera supporting object can include a garment configured to be worn by a worker. The method also can include switching the camera to a first mode of operation responsive to the location of the worker indicating that the worker is at an operator terminal of a vehicle and switching the camera to a different, second mode of operation responsive to the location of the worker that indicating that the worker is not at the operator terminal of the vehicle.

In one aspect, the method also can include disabling the camera from at least one of capturing, storing, or communicating the image data responsive to determining that the camera is in the first mode of operation, and enabling the camera to said at least one of capturing, storing, or communicating the image data responsive to determining that the camera is in the second mode of operation.

In one aspect, the camera supporting object can include a garment configured to be worn by a worker. The method also can include preventing movement of a vehicle responsive to first data content of the image data indicating that the worker is located outside an operator cab of a vehicle and allowing the movement of the vehicle responsive to second data content of the image data indicating that the worker is located inside the operator cab.

In one aspect, the method also can include controlling the camera supporting device to travel relative to a ground vehicle and thereby to observe via the camera one or more of a vehicle, a wayside asset, or a route being traveled upon by the ground vehicle.

In one aspect, the method also can include examining the image data to identify damage to or the condition of one or more of the vehicle, the wayside asset, or the route being traveled upon by the ground vehicle, and/or to predict imminent impact or damage to one or more of the vehicle, the wayside asset, or the route being traveled upon by the ground vehicle.

In one embodiment, a system (e.g., a camera system) includes a portable camera unit and a garment. The portable camera unit includes a camera configured to capture at least image data, at least one of a data storage device electrically connected to the camera and configured to store the image data or a communication device electrically connected to the camera and configured to wirelessly communicate the image data to a transportation system receiver located off-board the portable camera unit. The garment is configured to be worn by a transportation worker. The portable camera unit is attached to the garment.

In one aspect, the garment includes one or more of a hat or an ocular device. In one aspect, the system also can include a locator device configured to detect a location of the transportation worker wearing the garment, and a control unit configured to control the portable camera unit based at least in part on the location of the transportation worker that is detected by the locator device. In one aspect, the control unit is configured to control the portable camera unit to a first mode of operation responsive to the location of the transportation worker that is detected by the locator device indicating that the transportation worker is at an operator terminal of the vehicle and to control the portable camera unit to a different, second mode of operation responsive to the location of the transportation worker that is detected by the locator device indicating that the transportation worker is not at the operator terminal of the vehicle.

In one aspect, in the first mode of operation, the portable camera unit can be disabled from at least one of capturing, storing, or communicating the image data, and, in the second mode of operation, the portable camera unit can be enabled to one or more of capturing, storing, or communicating the image data. In one aspect, the control unit can be configured to control the portable camera unit to a first mode of operation responsive to the location of the transportation worker that is detected by the locator device indicating that the transportation worker is in an operator cab of the vehicle and to control the portable camera unit to a different, second mode of operation responsive to the location of the transportation worker that is detected by the locator device indicating that the transportation worker is not in the operator cab of the vehicle.

In one aspect, the system also can include a vehicle control unit configured to control the vehicle based at least in part on the image data. The vehicle control unit can be configured to prevent movement of the vehicle responsive to first data content of the image data indicating that the portable camera unit is located outside the operator cab of the vehicle and to allow movement of the vehicle responsive to second data content of the image data indicating that the portable camera unit is located inside the operator cab.

In one aspect, the vehicle can include a vehicle consist having plural interconnected vehicle units, with at least one of the plural vehicle units being a powered vehicle unit. The vehicle control unit can be configured to prevent movement of the vehicle consist responsive to the first data content of the image data indicating that the portable camera unit is positioned between adjacent vehicle units of the vehicle consist and to allow movement of the vehicle consist responsive to the second data content of the image data indicating that the portable camera unit is not positioned between adjacent vehicle units of the vehicle consist.

In one aspect, the vehicle control unit can include an image data analysis system configured to automatically process the image data for identifying the first data content and the second data content. The vehicle control unit can be configured to automatically prevent and allow movement of the vehicle responsive to the first data and the second data, respectively, that is identified by the image data analysis system. In one aspect, the system also includes the transportation system receiver configured to be located onboard the vehicle, where the transportation system receiver is configured to wirelessly communicate network data other than the image data at least one of onboard or off-board the vehicle and to automatically switch to a mode for receiving the image data from the portable camera unit responsive to the portable camera unit being active to communicate the image data. In one aspect, the system also includes a retractable mast configured for attachment to a vehicle. The retractable mast can include one or more mast segments deployable from a first position relative to the vehicle to a second position relative to the vehicle. The second position is higher than the first position. The mast also can include a coupler attached to one of the one or more mast segments and configured for detachable coupling of the portable camera unit to said one of the one or more mast segments. The portable camera unit is coupled to the retractable mast by way of the coupler and the retractable mast is deployed to the second position, with the portable camera unit positioned above the vehicle.

In another embodiment, another camera system is provided. The system can include a portable camera unit and an aerial device. The portable camera unit can include a camera configured to capture at least image data and at least one of a data storage device electrically connected to the camera and configured to store the image data or a communication device electrically connected to the camera and configured to wirelessly communicate the image data to a transportation system receiver located off-board the portable camera unit. The aerial device is configured for at least one of remote control or autonomous flying over a ground vehicle route. The aerial device includes a camera dock for receiving the portable camera unit. When in the camera dock, the portable camera unit is positioned for the camera to view the vehicle route.

In one aspect, the system includes an aerial device dock attached to a ground vehicle. The aerial device dock can be configured to receive the aerial device for at least one of detachable coupling of the aerial device to the ground vehicle or charging of a battery of the aerial device from a power source of the vehicle. In one aspect, the aerial device is a scale dirigible or a scale helicopter. In another embodiment, a method (e.g., for obtaining and/or analyzing image data for transportation data communication) is provided. The method includes obtaining image data from a portable camera unit having a camera configured to capture the image data and attached to a garment worn by a transportation worker, communicating the image data to a transportation system receiver located off-board the portable camera unit, determining a location of the transportation worker wearing the garment with a locator device, and autonomously controlling the portable camera unit based at least in part on the location of the transportation worker that is detected by the locator device.

In one aspect, the method also includes switching the portable camera unit to a first mode of operation responsive to the location of the transportation worker that is detected by the locator device indicating that the transportation worker is at an operator terminal of a vehicle and switching the portable camera unit to a different, second mode of operation responsive to the location of the transportation worker that is detected by the locator device indicating that the transportation worker is not at the operator terminal of the vehicle. In one aspect, the method also includes disabling the portable camera unit from at least one of capturing, storing, or communicating the image data responsive to determining that the portable camera unit is in the first mode of operation, and enabling the portable camera unit to said at least one of capturing, storing, or communicating the image data responsive to determining that the portable camera unit is in the second mode of operation.

In one aspect, the method also includes switching the portable camera unit to the first mode of operation responsive to the location of the transportation worker that is detected by the locator device indicating that the transportation worker is in an operator cab of the vehicle and switching the portable camera unit to the second mode of operation responsive to the location of the transportation worker that is detected by the locator device indicating that the transportation worker is not in the operator cab of the vehicle. In one aspect, the method also includes preventing movement of a vehicle responsive to first data content of the image data indicating that the portable camera unit is located outside an operator cab of the vehicle and allowing the movement of the vehicle responsive to second data content of the image data indicating that the portable camera unit is located inside the operator cab.

In one aspect, the method also includes preventing movement of a vehicle consist having plural interconnected vehicle units with at least one of the vehicle units including a powered vehicle unit. The movement of the vehicle consist can be prevented responsive to first data content of the image data indicating that the portable camera unit is positioned between adjacent vehicle units of the vehicle consist. The method may allow the movement of the vehicle consist responsive to the second data content of the image data indicating that the portable camera unit is not positioned between adjacent vehicle units of the vehicle consist. In one aspect, the method also can include autonomously examining the image data to one or more of identify or predict damage to one or more of a vehicle, a wayside asset, or a route being traveled upon by the vehicle.

The description is illustrative and not restrictive. For example, the described embodiments (and/or aspects thereof) may be used in combination with each other. In addition, modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

The description of certain embodiments of the inventive subject matter will be understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

Components of the systems described herein may include or represent hardware circuits or circuitry that include and/or are connected with one or more processors, such as one or more computer microprocessors. The operations of the methods described herein and the systems can be sufficiently complex such that the operations cannot be mentally performed by an average human being or a person of ordinary skill in the art within a commercially reasonable time period. For example, the examination of the image data may take into account a large amount of information, may rely on relatively complex computations, and the like, such that such a person cannot complete the examination of the image data within a commercially reasonable time period to control the vehicle based on the examination of the image data. The hardware circuits and/or processors of the systems described herein may be used to significantly reduce the time needed to obtain and examine the image data such that the image data can be examined and damaged portions of a route can be identified within safe and/or commercially reasonable time periods.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
obtaining one or more images of a route while a vehicle is moving along the route, the route including a first guide lane;
determining a position of the vehicle relative to the first guide lane by measuring a first distance between the vehicle and the first guide lane, the first distance being perpendicular to a direction of movement of the vehicle;
determining whether a number of pixels of the one or more images exceeds a threshold value, the pixels corresponding to one or more wheels of the vehicle and that is disposed outside of a region of a benchmark visual profile of the route corresponding to a target position of the one or more wheels;
determining whether the position of the vehicle is to be changed based on one or more of the first distance or the number of the pixels disposed outside of the region of the benchmark visual profile exceeding the threshold value; and
modifying an operating parameter of the vehicle to change the position of the vehicle relative to the first guide lane responsive to determining that the position of the vehicle is to be changed.

2. The method of claim 1, further comprising determining a position of a first wheel of the one or more wheels relative to the first guide lane.

3. The method of claim 1, further comprising determining the position of the vehicle by measuring an intensity of the pixels in the one or more images.

4. The method of claim 1, further comprising identifying portions of the one or more images that represent the vehicle by measuring intensities of the pixels in the one or more images and distinguishing the portions of the one or more images that represent the vehicle from other portions of the one or more images based on the intensities.

5. The method of claim 1, wherein modifying the operating parameter of the vehicle includes adjusting steering of the vehicle based on the position of the vehicle relative to the first guide lane.

6. The method of claim 1, further comprising obtaining the one or more images of the route for a determined distance of travel of the vehicle, and determining whether the position of the vehicle is to be changed based on the position of the vehicle changing by a threshold value along the determined distance of travel of the vehicle.

7. The method of claim 1, further comprising comparing the one or more images with the benchmark visual profile of the route based at least in part on an overlay of the one or more images onto the benchmark visual profile or an overlay of the benchmark visual profile onto the one or more images, the benchmark visual profile comprising designated areas corresponding to each of the first guide lane and a region corresponding to the target position of the vehicle.

8. The method of claim 7, further comprising determining the position of the vehicle based at least in part on the overlay of the one or more images onto the benchmark visual profile or the overlay of the benchmark visual profile onto the one or more images.

9. The method of claim 1, further comprising:
   determining the position of the vehicle relative to a second guide lane by measuring a second distance between the vehicle and the second guide lane;
   determining whether the position of the vehicle is to be changed based at least in part on the second distance; and
   modifying an operating parameter of the vehicle to change the position of the vehicle relative to the second guide lane responsive to determining that the position of the vehicle is to be changed.

10. A system, comprising:
    a camera configured to be detachably coupled or mounted to a vehicle and to obtain one or more images of a route and the vehicle while the vehicle moves along the route, wherein the route includes a first guide lane; and
    a controller having one or more processors configured to determine a position of the vehicle relative to the first guide lane by measuring a first distance between the vehicle and a first guide lane, the first distance being perpendicular to a direction of movement of the vehicle,
    the one or more processors configured to determine whether a number of pixels of the one or more images exceeds a threshold value, the pixels corresponding to one or more wheels of the vehicle and that is disposed outside of a region of a benchmark visual profile of the route corresponding to a target position of the one or more wheels,
    the one or more processors further configured to determine whether an operating parameter of the vehicle is to be changed based on one or more of the first distance or the number of the pixels disposed outside of the region of the benchmark visual profile exceeding the threshold value, and
    responsive to determining that the operating parameter of the vehicle is to be changed, the one or more processors being further configured to modify the operating parameter of the vehicle to change the position of the vehicle relative to the first guide land.

11. The system of claim 10, wherein the one or more processors are configured to determine a position of a first wheel of the one or more wheels relative to the first guide lane, and determine a position of the vehicle based at least in part on the position of the first wheel.

12. The system of claim 10, wherein the one or more processors are further configured to determine the position of the wheel of the vehicle by measuring intensities of pixels in the one or more images.

13. The system of claim 10, wherein the one or more processors are configured to identify portions of the one or more images that represent the one or more wheels of the vehicle by measuring intensities of the pixels in the one or more images and distinguishing the portions of the one or more images that represent the one or more wheels of the vehicle from other portions of the one or more images based on the intensities.

14. The system of claim 10, wherein the one or more processors are configured to compare the one or more images with the benchmark visual profile of the route based at least in part on an overlay of the one or more images onto the benchmark visual profile or an overlay of the benchmark visual profile onto the one or more images, the benchmark visual profile comprising designated areas corresponding to the first guide lane and a region corresponding to the target position of a wheel.

15. The system of claim 10, wherein the one or more processors are further configured to adjust steering of the vehicle based on the position of the vehicle relative to the first guide lane.

16. A method comprising:
    obtaining one or more images of a route and a wheel of a vehicle while the vehicle is moving along the route, the route including guide lanes;
    comparing the one or more images with a benchmark visual profile of the route based at least in part on an overlay of the one or more images onto the benchmark visual profile or an overlay of the benchmark visual profile onto the one or more images, the benchmark visual profile comprising designated areas corresponding to each of the guide lanes and a region corresponding to a target position of the wheel;
    identifying a position of the wheel of the vehicle relative to the guide lanes based in part on the comparing of the one or more images with the benchmark visual profile of the route;
    determining whether the position of the wheel of the vehicle is to be changed based on a number of pixels of the one or more images corresponding to the wheel disposed outside of the region of the benchmark visual profile exceeding a threshold value; and
    modifying an operating parameter of the vehicle to change the position of the wheel responsive to determining that the position of the wheel of the vehicle is to be changed.

17. The system of claim 10, wherein the one or more processors are configured to determine the position of the vehicle relative to a second guide lane by measuring a second distance between the vehicle and the second guide lane.

18. The system of claim 17, wherein the one or more processors are configured to determine whether the position of the vehicle is to be changed based at least in part on the second distance, the one or more processors configured to modify an operating parameter of the vehicle to change the position of the vehicle relative to the second guide lane responsive to determining that the position of the vehicle is to be changed.

* * * * *